United States Patent
Feldman

(10) Patent No.: US 12,516,376 B2
(45) Date of Patent: Jan. 6, 2026

(54) OPTIMIZING BAG3 GENE THERAPY

(71) Applicant: TEMPLE UNIVERSITY—OF THE COMMONWEALTH SYSTEM OF HIGHER EDUCATION, Philadelphia, PA (US)

(72) Inventor: Arthur M. Feldman, Wynnewood, PA (US)

(73) Assignee: TEMPLE UNIVERSITY—OF THE COMMONWEALTH SYSTEM OF HIGHER EDUCATION, Philadelphia, PA (US)

( * ) Notice: Subject to any disclaimer, the term of this patent is extended or adjusted under 35 U.S.C. 154(b) by 929 days.

(21) Appl. No.: 16/973,353

(22) PCT Filed: Jun. 7, 2019

(86) PCT No.: PCT/US2019/036059
§ 371 (c)(1),
(2) Date: Dec. 8, 2020

(87) PCT Pub. No.: WO2019/237002
PCT Pub. Date: Dec. 12, 2019

(65) Prior Publication Data
US 2021/0254159 A1    Aug. 19, 2021

Related U.S. Application Data

(60) Provisional application No. 62/682,404, filed on Jun. 8, 2018.

(51) Int. Cl.
*C12Q 1/6883* (2018.01)
*A61K 48/00* (2006.01)

(52) U.S. Cl.
CPC .......... *C12Q 1/6883* (2013.01); *A61K 48/005* (2013.01); *C12Q 2600/118* (2013.01); *C12Q 2600/156* (2013.01)

(58) Field of Classification Search
CPC ............ C12Q 1/6883; C12Q 2600/118; C12Q 2600/156; A61K 48/005; A61K 38/00; C07K 14/4747; A61P 9/04
See application file for complete search history.

(56) References Cited

U.S. PATENT DOCUMENTS

| | | | |
|---|---|---|---|
| 11,236,389 B2 * | 2/2022 | Feldman | G01N 33/6887 |
| 11,542,555 B2 * | 1/2023 | Feldman | A61P 9/06 |
| 2017/0016066 A1 | 1/2017 | Feldman et al. | |

FOREIGN PATENT DOCUMENTS

| | | | |
|---|---|---|---|
| RU | 2016107874 A | 9/2017 | |
| RU | 2670133 C2 | 10/2018 | |
| WO | 2012/107580 A1 | 8/2012 | |
| WO | WO 2012/107580 | * 8/2012 | |
| WO | 2014078855 A1 | 5/2014 | |
| WO | WO-2015117010 A2 * | 8/2015 | A61P 17/02 |
| WO | 2017/031182 A2 | 2/2017 | |

OTHER PUBLICATIONS

VCV000178006 (from URL: ClinVar-NCBI); downloaded from the internet Jul. 24, 2024 (Year: 2016).*
VCV000192113 (from URL: ClinVar-NCBI); downloaded from the internet Jul. 24, 2024 (Year: 2015).*
Posafalvi, A. et al. "Clinical utility gene card for: dilated cardiomyopathy (CMD)". European Journal of Human Genetics, vol. 21 (2013), p: doi:10.1038/ejhg.2012.276; published online Dec. 19, 2012. (Year: 2012).*
Chami, N. et al. "Nonsense mutations in BAG3 are associated with Early-Onset Dilated Cardiomyopathy in French Canadians" Canadian Journal of Cardiology, vol. 30 (2014), pp. 1655-1661. (Year: 2014).*
d'Avenia, M. et al. "A novel miR-371a-5p-mediated pathway, leading to BAG3 upregulation in cardiomyocytes in response to epinephrine, is lost in Takotsubo cardiomyopathy". Cell Death and Disease, vol. 6 (2015), p: doi: 10.1038/cddis.280. (Year: 2015).*
Toro, R. et al. "Familial Dilated Cardiomyopathy Caused by a Novel Frameshift in the BAG3 Gene " PLoS ONE, (2016) DOI: 10.1371/jounal.pone.0158730 . (Year: 2016).*
Pei, N. et al. "Gene Expression Profiling Associated with Angiotensin II Type 2 Receptor-Induced Apoptosis in Human Prostate Cancer Cells " PLoS ONE, vol. 9 (3)(2014), p: e92253. (Year: 2014).*
Song,S. et al."Activation of heat shock factor 1 plays a role in pyrrolidine dithiocarbamate-mediated expression of the co-chaperone BAG3."The International Journal of Biochemistry & Cell Biology, vol. 42 (2010), pp. 1856-1863. (Year: 2010).*
Knezevic, T. et al. "Adeno-Associated Virus Serotype 9-Driven Expression of BAG3 Improves Left Ventricular Function in Murine Hearts With Left Ventricular Dysfunction. "JACC: Basic to Translational Science, vol. 1 (2016), pp. 647-656. (Year: 2016).*
Bish, et al., Adeno-Associated Virus (AAV) Serotype 9 Provides Global Cardiac Gene Transfer Superior to AAV1, AAV6, AAV7, and AAV8 in the Mouse and Rat, Human Gene Therapy, Nov. 28, 2008, 19(12):1359-1368.
Ranek, et al., The role of heat shock proteins and co-chaperones in heart failure, Philosophical Transactions of the Royal Society B: Biological Sciences, Jan. 19, 2018, 373(1738):1-18.
NM_004281.4 (BAG3): c468GGC[4] (p.Ala160dup) AND Dilated Cardiomyopathy, Dominant, Accession: RCV000261469.1.
NM_004281.4 (BAG3): c.187C_G (p.Pro63Ala) AND Cardiovascular Phenotype, Accession: RCV000618458.2.

(Continued)

*Primary Examiner* — Neil P Hammell
*Assistant Examiner* — Alexandra Geraldine Dace Denito
(74) *Attorney, Agent, or Firm* — Pillsbury Winthrop Shaw Pittman LLP

(57) ABSTRACT

Identification of BAG3 (Bcl2-associated anthanogene 3) genetic variants were associated with the prevalence non-ischemic or ischemic dilated cardiomyopathy (DCM) and DCM outcomes in individuals of African ancestry.

15 Claims, 11 Drawing Sheets

Specification includes a Sequence Listing.

(56) References Cited

OTHER PUBLICATIONS

NM_004281.4 (BAG3): c.187C_G (p.Pro63Ala), Accession: VCV000178006.28.
NM_004281.4 (BAG3): c.249C_G (p.His83Gln), Accession: VCV000044782.42.
NM_004281.4 (BAG3): c.1138C>T (p.Pro380Ser), Accession: RVC000437120.4.
NM_004281.4 (BAG3)_c.1436C_T (p.Ala479Val) and Myofibrillar Myopathy, Dominant, Accession: RCV000359990.1.
NM_004281.3 (BAG3)_c.1436C_T (p.Ala479Val), Accession: VCV000192113.22.
Ng D., et al., iInterpreting Secondary Cardiac Disease Variants in an Exome Cohort, Circ Cardiovasc Genet, Aug. 2013, 6:337-346 and Supplemental Material, 306 total pages.
Fernlund, E., et al., Novel Genetic Variants in BAG3 and TNNT2 in a Swedish Family with a History of Dilated Cardiomyopathy and Sudden Cardiac Death, Pediatric Cardiology, Feb. 18, 2017, 38:1262-1268. doi:10.1007/s00246-017-1655-0.
Franaszczyk, M., et al., The BAG3 gene variants in Polish patients with dilated cardiomyopathy: four novel mutations and a genotype-phenotype correlation, Journal of Translational Medicine, 2014, 12(192):1-8 [http://www.translational-medicine.com/content/12/1/192] doi:10.1186/1479-5876-12-192.
Myers, Valerie D., Ph.D., The Role of BAG3 in the Failing Heart, Thesis of Temple University Graduate School, May 31, 2018.
Myers, V.D., et al., Association of Variants in BAG3 With Cardiomyopathy Outcomes in African American Individuals. JAMA Cardiology, Oct. 1, 2018, vol. 3, No. 10, pp. 929.
Russian Application No. 2020143890, Office Action dated May 27, 2024 with English Translation of same.

* cited by examiner

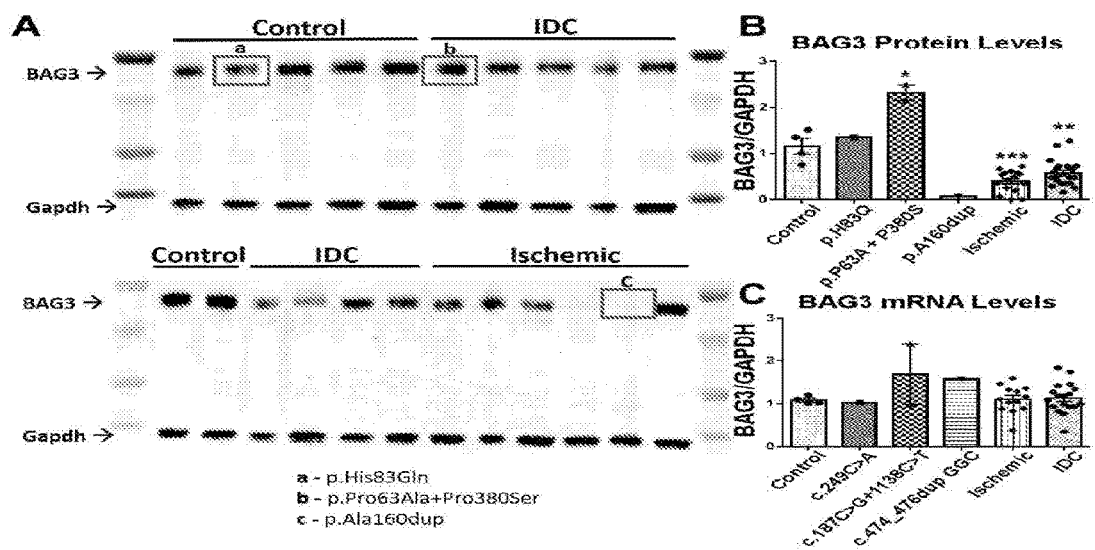
FIGS. 5A-5C
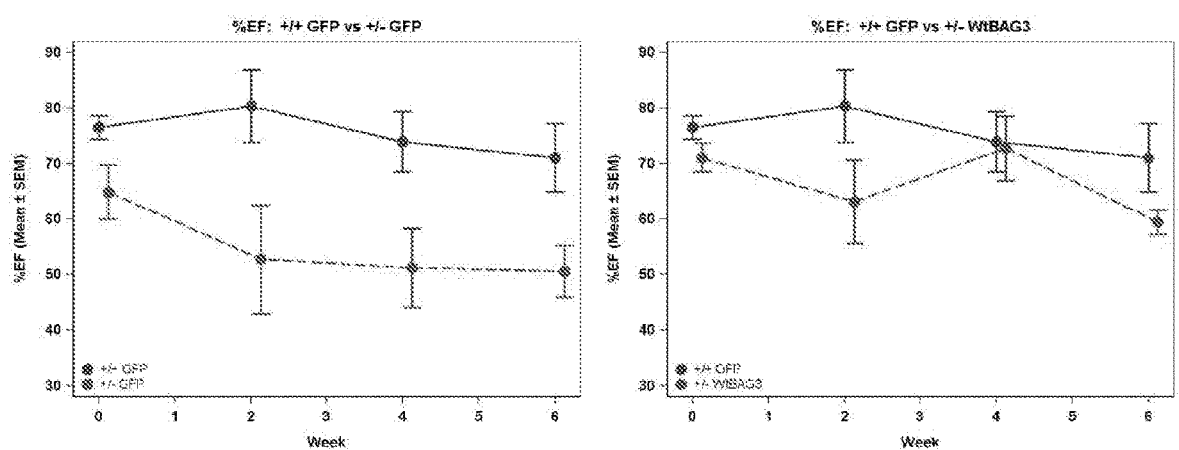
FIG. 6A  FIG. 6B

SEQUENCE LISTING

```
<160> NUMBER OF SEQ ID NOS: 25

<210> SEQ ID NO 1
<211> LENGTH: 5
<212> TYPE: PRT
<213> ORGANISM: Homo sapiens

<400> SEQUENCE: 1

Glu Thr Pro Ser Ser
1               5

<210> SEQ ID NO 2
<211> LENGTH: 5
<212> TYPE: PRT
<213> ORGANISM: Homo sapiens

<400> SEQUENCE: 2

Glu Gly His Pro Val
1               5

<210> SEQ ID NO 3
<211> LENGTH: 5
<212> TYPE: PRT
<213> ORGANISM: Homo sapiens

<400> SEQUENCE: 3

Ala Ala Ala Gln Pro
1               5
```

```
<210> SEQ ID NO 4
<211> LENGTH: 5
<212> TYPE: PRT
<213> ORGANISM: Homo sapiens

<400> SEQUENCE: 4

Pro Pro Pro Ser Pro
1               5

<210> SEQ ID NO 5
<211> LENGTH: 5
<212> TYPE: PRT
<213> ORGANISM: Homo sapiens

<400> SEQUENCE: 5

Gly Arg Ala Asp Val
1               5

<210> SEQ ID NO 6
<211> LENGTH: 5
<212> TYPE: PRT
<213> ORGANISM: Mus musculus

<400> SEQUENCE: 6

Glu Thr Pro Ser Ser
1               5

<210> SEQ ID NO 7
<211> LENGTH: 5
<212> TYPE: PRT
<213> ORGANISM: Mus musculus

<400> SEQUENCE: 7

Glu Gly His Pro Val
1               5

<210> SEQ ID NO 8
<211> LENGTH: 5
<212> TYPE: PRT
<213> ORGANISM: Mus musculus

<400> SEQUENCE: 8

Ala Ala Ala Gln Pro
1               5

<210> SEQ ID NO 9
<211> LENGTH: 5
<212> TYPE: PRT
<213> ORGANISM: Mus musculus

<400> SEQUENCE: 9

Pro Cys Pro Ser Pro
1               5

<210> SEQ ID NO 10
<211> LENGTH: 5
<212> TYPE: PRT
<213> ORGANISM: Mus musculus

<400> SEQUENCE: 10

Gly Arg Ala Asp Val
1               5
```

```
<210> SEQ ID NO 11
<211> LENGTH: 5
<212> TYPE: PRT
<213> ORGANISM: Rattus rattus

<400> SEQUENCE: 11

Glu Thr Ala Ser Ser
1               5

<210> SEQ ID NO 12
<211> LENGTH: 5
<212> TYPE: PRT
<213> ORGANISM: Rattus rattus

<400> SEQUENCE: 12

Glu Gly His Pro Ile
1               5

<210> SEQ ID NO 13
<211> LENGTH: 5
<212> TYPE: PRT
<213> ORGANISM: Rattus rattus

<400> SEQUENCE: 13

Thr Ala Gln Pro Pro
1               5

<210> SEQ ID NO 14
<211> LENGTH: 5
<212> TYPE: PRT
<213> ORGANISM: Rattus rattus

<400> SEQUENCE: 14

Pro Ser Pro Gly Pro
1               5

<210> SEQ ID NO 15
<211> LENGTH: 5
<212> TYPE: PRT
<213> ORGANISM: Rattus rattus

<400> SEQUENCE: 15

Gly Arg Ala Asp Val
1               5

<210> SEQ ID NO 16
<211> LENGTH: 5
<212> TYPE: PRT
<213> ORGANISM: Macaca mulatta

<400> SEQUENCE: 16

Glu Ala Pro Ser Ser
1               5

<210> SEQ ID NO 17
<211> LENGTH: 5
<212> TYPE: PRT
<213> ORGANISM: Macaca mulatta

<400> SEQUENCE: 17

Glu Gly His Ala Val
1               5

<210> SEQ ID NO 18
<211> LENGTH: 5
```

```
<212> TYPE: PRT
<213> ORGANISM: Macaca mulatta

<400> SEQUENCE: 18

Ala Ala Gln Pro Pro
1               5

<210> SEQ ID NO 19
<211> LENGTH: 5
<212> TYPE: PRT
<213> ORGANISM: Macaca mulatta

<400> SEQUENCE: 19

Cys Pro Pro Ser Phe
1               5

<210> SEQ ID NO 20
<211> LENGTH: 5
<212> TYPE: PRT
<213> ORGANISM: Macaca mulatta

<400> SEQUENCE: 20

Gly Arg Ala Asp Val
1               5

<210> SEQ ID NO 21
<211> LENGTH: 5
<212> TYPE: PRT
<213> ORGANISM: Canis familiaris

<400> SEQUENCE: 21

Asp Thr Ala Ser Ser
1               5

<210> SEQ ID NO 22
<211> LENGTH: 5
<212> TYPE: PRT
<213> ORGANISM: Canis familiaris

<400> SEQUENCE: 22

Glu Gly His Pro Ile
1               5

<210> SEQ ID NO 23
<211> LENGTH: 5
<212> TYPE: PRT
<213> ORGANISM: Canis familiaris

<400> SEQUENCE: 23

Ala Ala Ala Gln Pro
1               5

<210> SEQ ID NO 24
<211> LENGTH: 5
<212> TYPE: PRT
<213> ORGANISM: Canis familiaris

<400> SEQUENCE: 24

Pro Ser Pro Ser Pro
1               5
```

```
<210> SEQ ID NO 25
<211> LENGTH: 5
<212> TYPE: PRT
<213> ORGANISM: Canis familiaris

<400> SEQUENCE: 25

Gly Arg Ala Asp Val
1               5
```

OPTIMIZING BAG3 GENE THERAPY

RELATED APPLICATIONS

This patent application is the National Phase of International Application No. PCT/US2019/036059, filed Jun. 7, 2019, which designated the U.S. and that International Application was published under PCT Article 21(2) in English, which claims the benefit of priority to U.S. Provisional Patent Application No. 62/682,404, filed Jun. 8, 2018. The entire contents of the foregoing applications are incorporated herein by reference, including all text, tables, sequence listing and drawings.

GOVERNMENT SUPPORT

This invention was made with government support under Grant Nos.: RO1 HL123093 and HL 091799-01 awarded by the National Institutes of Health. The government has certain rights in the invention.

FIELD OF THE INVENTION

Embodiments of the invention are directed to the identification of genetic variants in BAG3 in individuals of African ancestry which negatively influenced the outcome of patients with cardiac diseases, such as non-ischemic or ischemic dilated cardiomyopathy, through modulation of the function of BAG3. Compositions include agents which normalize Bcl-associated anthanogene 3 (BAG3) expression and/or function.

REFERENCE TO SEQUENCE LISTING

This application incorporates by reference a Computer Readable Form (CRF) of a Sequence Listing in ASCII text format submitted with this application, entitled 055211-0516472_SEQUENCE_LISTING_ST25.txt, created on May 22, 2024, and which is 3,315 bytes in size.

BACKGROUND

Heart failure (HF) secondary to dilated cardiomyopathy (DCM) affects an estimated 2.5 million Americans twenty years or older.[1] The epidemiology of DCM differs by race and ethnicity with Americans of African ancestry having the highest incidence and prevalence of HF and a preponderance of idiopathic dilated cardiomyopathy (IDC).[2,3] This contrasts with patients of European ancestry who most commonly have DCM secondary to ischemic heart disease.[4-7] Consistent with the epidemiology of IDC in Americans of African ancestry, IDC is far more common and the age at which the disease is first recognized is substantially lower in Sub-Saharan Africa than in the U.S. or in Europe.[8,9]

The increased prevalence of DCM in Americans of African ancestry has been attributed to a diverse set of medical and sociologic factors including neighborhood[10] and a higher burden of cardiovascular risk factors: diabetes mellitus, hypertension, cholesterol, smoking status, and ventricular hypertrophy.[11] Several observations, however, suggest that the increased incidence of IDC may also be attributed to genetic risk factors. For example, HF hot spots are found in geographic regions across Sub-Saharan Africa.[12] There is not a strong correlation between the presence of hypertension and DCM in Sub-Saharan Africans.[13] Truncating variants in TTN, the gene most commonly associated with DCM,[14] are more prevalent in women of African ancestry with post-partum cardiomyopathy than in women of European ancestry with post-partum cardiomyopathy.[15]

SUMMARY

Identification of BAG3 (Bcl2-associated anthanogene 3) genetic variants were associated with the prevalence of non-ischemic or ischemic dilated cardiomyopathy (DCM) and DCM outcomes in individuals of African ancestry. A significant increase in the risk of death or heart failure hospitalization was found in patients with the mutations.

Accordingly, in certain embodiments, a method of treating a patient having cardiac disease, wherein said patient has at least one Bcl2-associated anthanogene 3 (BAG3) nucleotide variant (NV) in-frame insertion as compared to a control BAG3 nucleic acid sequence, comprises administering to the patient a therapeutically effective amount of an agent wherein the agent modulates expression or amount of BAG3 molecules, proteins or peptides thereof in a target cell or tissue.

In certain embodiments, the in-frame insertion encodes an amino acid. In certain embodiments, the in-frame insertion encodes a nonpolar amino acid. In certain embodiments, the in-frame insertion comprises a 3 nucleotide insertion that adds an alanine at position 160 (p.Ala160dup, 10:121429647 A/AGCG; rs139438727).

In certain embodiments, a method of diagnosing and treating a patient having cardiac disease, comprises identifying in a patient sample, at least one Bcl2-associated anthanogene 3 (BAG3) genetic variant as compared to a control BAG3 nucleic acid sequence, wherein detection of certain variants are predictive of whether an increase in BAG3 levels is therapeutic for the patient, and, administering to the patient identified as having such a variant, a therapeutically effective amount of an agent wherein the agent modulates expression or amount of BAG3 molecules, proteins or peptides thereof in a target cell or tissue, as compared to a normal control. The genetic variants in BAG3 found almost exclusively in individuals of African ancestry were not causative of disease but negatively influenced the outcome of patients with non-ischemic or ischemic dilated cardiomyopathy through modulation of the function of BAG3.

In certain embodiments, a method of diagnosing and treating a patient having cardiac disease, comprises identifying in a patient sample, at least one Bcl2-associated anthanogene 3 (BAG3) genetic variant as compared to a control BAG3 nucleic acid sequence; and administering to the patient identified as having a BAG3 genetic variation a therapeutically effective amount of an agent wherein the agent modulates expression or amount of BCL2-associated athanogene 3 (BAG3) molecules, proteins or peptides thereof in a target cell or tissue, as compared to a normal control.

In certain embodiments, the genetic variant is an in-frame insertion. In certain embodiments, the in-frame insertion encodes an amino acid. In certain embodiments, the in-frame insertion encodes a nonpolar amino acid. In certain embodiments, the in-frame insertion comprises a three nucleotide insertion that adds an alanine at position 160 (p.Ala160dup, 10:121429647 A/AGCG; rs139438727).

In certain embodiments a method of treating a subject at risk of or suffering from heart failure comprises administering to the subject a pharmaceutical composition comprising a therapeutically effective amount of at least one agent which modulates expression or amount of a BCL2-associated athanogene 3 (BAG3) molecule, wherein the subject has at least one BAG3 genetic variant as compared to a control BAG3 nucleic acid sequence, wherein said BAG3 genetic variant is an in-frame insertion, and wherein the agent comprises an expression vector encoding a BCL2-associated athanogene 3 (BAG3) molecule.

In certain embodiments, the in-frame insertion encodes an amino acid. In certain embodiments, the in-frame insertion encodes a nonpolar amino acid. In certain embodiments, the in-frame insertion comprises a 3 nucleotide insertion that adds an alanine at position 160 (p.Ala160dup, 10:121429647 A/AGCG; rs139438727).

In certain embodiments, the genetic variant is a single nucleotide variant (SNV) in-frame insertion, deletions, substitutions or combinations thereof. In certain embodiments, the SNVs comprise: p.Pro63Ala (10:121429369 C/G; rs133031999); p.His83Gln (10:151331972; rs151331972); Pro380Ser (10:121436204 C/T; rs144692954); Ala479Val (10:121436502 C/T, rs34656239) or combinations thereof. In certain embodiments, the in-frame insertion encodes an amino acid. In certain embodiments, the in-frame insertion encodes a nonpolar amino acid. In certain embodiments, the in-frame insertion encodes an alanine at position 160.

In certain embodiments, an agent for treating a patient identified as having a genetic variant in a BCL2-associated athanogene 3 (BAG3) gene, wherein the genetic variant is a single nucleotide variant (SNV) comprising in-frame insertions, in-frame-deletions, truncation, substitutions or combinations thereof.

In certain embodiments, an agent modulates expression or amount of BCL2-associated athanogene 3 (BAG3) molecules, proteins or peptides thereof in a target cell or tissue, as compared to a normal control, comprising an expression vector expressing a BAG3 protein or active fragments thereof, oligonucleotides or combinations thereof.

In certain embodiments, a method of treating a subject at risk of or suffering from heart failure comprises identifying in a biological sample, BAG3 variants which are predictive of whether an increase in BAG3 levels is therapeutic for the subject, and, administering to the patient identified as having such a variant, a therapeutically effective amount of an agent. In certain embodiments, the agent modulates expression or amount of BAG3 molecules, proteins or peptides thereof in a target cell or tissue, as compared to a normal control.

In certain embodiments, a method of identifying a heart disease patient having a worse prognosis, comprises screening a patient sample for the presence of a Bcl2-associated anthanogene 3 (BAG3) nucleotide variant (NV) in-frame insertion as compared to a control BAG3 nucleic acid sequence, wherein detection of the BAG3 nucleotide variant (NV) in-frame insertion identifies the heart disease patient as having a worse prognosis.

In certain embodiments, a method of identifying a patient at risk of heart disease, comprises screening a patient sample for the presence of a Bcl2-associated anthanogene 3 (BAG3) nucleotide variant (NV) in-frame insertion as compared to a control BAG3 nucleic acid sequence, wherein detection of the BAG3 nucleotide variant (NV) in-frame insertion identifies the patient as being at risk of heart disease.

In certain embodiments, the in-frame insertion encodes an amino acid. In certain embodiments, the in-frame insertion encodes a nonpolar amino acid. In certain embodiments, the in-frame insertion comprises a 3 nucleotide insertion that adds an alanine at position 160 (p.Ala160dup, 10:121429647 A/AGCG; rs139438727).

In certain embodiments, a method of identifying a patient at risk of heart disease, comprises screening a patient sample for the presence of a Bcl2-associated anthanogene 3 (BAG3) genetic variant, wherein the BAG3 genetic variant comprises p.Ala160dup (10:121429647 A/AGCG; rs139438727); p.Pro63Ala (10:121429369 C/G; rs133031999); p.His83Gln (10:151331972; rs151331972); Pro380Ser (10:121436204 C/T; rs144692954); Ala479Val (10:121436502 C/T, rs34656239) or combinations thereof.

In certain embodiments, a kit comprising one or more probes conjugated to a detectable label for identifying BCL2-associated athanogene 3 (BAG3) variants in a biological sample. Detection of certain variants are predictive of whether a subject will benefit from a treatment.

All genes, gene names, and gene products disclosed herein are intended to correspond to homologs from any species for which the compositions and methods disclosed herein are applicable. Thus, the terms include, but are not limited to genes and gene products from humans and mice. It is understood that when a gene or gene product from a particular species is disclosed, this disclosure is intended to be exemplary only, and is not to be interpreted as a limitation unless the context in which it appears clearly indicates. Thus, for example, for the genes or gene products disclosed herein, which in some embodiments relate to mammalian nucleic acid and amino acid sequences, are intended to encompass homologous and/or orthologous genes and gene products from other animals including, but not limited to other mammals, fish, amphibians, reptiles, and birds. In certain embodiments, the genes, nucleic acid sequences, amino acid sequences, peptides, polypeptides and proteins are human.

Other aspects are described infra.

Definitions

Unless defined otherwise, all technical and scientific terms used herein have the same meaning as commonly understood by one of ordinary skill in the art to which the invention pertains. Although any methods and materials similar or equivalent to those described herein can be used in the practice for testing of the present invention, certain materials and methods are described herein. In describing and claiming the present invention, the following terminology will be used.

The articles "a" and "an" are used herein to refer to one or to more than one (i.e., to at least one) of the grammatical object of the article. By way of example, "an element" means one element or more than one element. Thus, recitation of "a cell", for example, includes a plurality of the cells of the same type. Furthermore, to the extent that the terms "including", "includes", "having", "has", "with", or variants thereof are used in either the detailed description and/or the claims, such terms are intended to be inclusive in a manner similar to the term "comprising."

As used herein, the terms "comprising," "comprise" or "comprised," and variations thereof, in reference to defined or described elements of an item, composition, apparatus, method, process, system, etc. are meant to be inclusive or open ended, permitting additional elements, thereby indicating that the defined or described item, composition, apparatus, method, process, system, etc. includes those specified elements—or, as appropriate, equivalents thereof—and that other elements can be included and still fall within the scope/definition of the defined item, composition, apparatus, method, process, system, etc.

"About" as used herein when referring to a measurable value such as an amount, a temporal duration, and the like, is meant to encompass variations of +/−20%, +/−10%, +/−5%, +/−1%, or +/−0.1% from the specified value, as such variations are appropriate to perform the disclosed methods. Alternatively, particularly with respect to biological systems or processes, the term can mean within an order of magnitude within 5-fold, and also within 2-fold, of a value. Where particular values are described in the application and claims, unless otherwise stated the term "about" meaning within an acceptable error range for the particular value should be assumed.

As used herein "BAG3", "BAG3 molecules", "BCL2-associated athanogene 3 (BAG3) genes", "BCL2-associated athanogene 3 (BAG3) molecules" are inclusive of all family members, mutants, cDNA sequences, alleles, fragments, species, coding and noncoding sequences, sense and antisense polynucleotide strands, etc. (HGNC (939) Entrez Gene (9531) Ensembl (ENSG00000151929) OMIM (603883) UniProtKB (095817)). Similarly, "BAG3", "BAG3 molecules", "BCL2-associated athanogene 3 (BAG3) molecules" also refer to BAG3 polypeptides or fragment thereof, proteins, variants, derivatives etc. The term "molecule", thus encompasses both the nucleic acid sequences and amino acid sequences of BAG3.

As used herein, "biological samples" include solid and body fluid samples. The biological samples used in the present invention can include cells, protein or membrane extracts of cells, blood or biological fluids such as ascites fluid or brain fluid (e.g., cerebrospinal fluid). Examples of solid biological samples include, but are not limited to, samples taken from tissues of the central nervous system, bone, breast, kidney, cervix, endometrium, head/neck, gallbladder, parotid gland, prostate, pituitary gland, muscle, esophagus, stomach, small intestine, colon, liver, spleen, pancreas, thyroid, heart, lung, bladder, adipose, lymph node, uterus, ovary, adrenal gland, testes, tonsils, thymus and skin, or samples taken from tumors. Examples of "body fluid samples" include, but are not limited to blood, serum, semen, prostate fluid, seminal fluid, urine, feces, saliva, sputum, mucus, bone marrow, lymph, and tears.

As used herein, "cardiac disease" refers to any type of heart disease including heart failure, heart muscle disease, cardiomyopathy, hypertrophic cardiomyopathy, dilated cardiomyopathy, atherosclerosis, coronary artery disease, non-ischemic heart disease, ischemic heart disease, myocarditis, viral infection, wounds, hypertensive heart disease, valvular disease, congenital heart disease, myocardial infarction, congestive heart failure, arrhythmias, diseases resulting in remodeling of the heart, etc. Diseases of the heart can be due to any reason, such as for example, damage to cardiac tissue such as a loss of contractility (e.g., as might be demonstrated by a decreased ejection fraction). Cardiac damage or disorder characterized by insufficient cardiac function includes any impairment or absence of a normal cardiac function or presence of an abnormal cardiac function. Abnormal cardiac function can be the result of disease, injury, and/or aging. As used herein, "abnormal cardiac function" includes morphological and/or functional abnormality of a cardiomyocyte, a population of cardiomyocytes, or the heart itself. Non-limiting examples of morphological and functional abnormalities include physical deterioration and/or death of cardiomyocytes, abnormal growth patterns of cardiomyocytes, abnormalities in the physical connection between cardiomyocytes, under- or over-production of a substance or substances by cardiomyocytes, failure of cardiomyocytes to produce a substance or substances which they normally produce, and transmission of electrical impulses in abnormal patterns or at abnormal times. Abnormalities at a more gross level include dyskinesis, reduced ejection fraction, changes as observed by echocardiography (e.g., dilatation), changes in EKG, changes in exercise tolerance, reduced capillary perfusion, and changes as observed by angiography. Abnormal cardiac function is seen with many disorders including, for example, non-ischemic or ischemic heart disease, e.g., angina pectoris, myocardial infarction, chronic ischemic heart disease, hypertensive heart disease, pulmonary heart disease (cor pulmonale), valvular heart disease, e.g., rheumatic fever, mitral valve prolapse, calcification of mitral annulus, carcinoid heart disease, infective endocarditis, congenital heart disease, myocardial disease, e.g., myocarditis, dilated cardiomyopathy, hypertensive cardiomyopathy, cardiac disorders which result in congestive heart failure, and tumors of the heart, e.g., primary sarcomas and secondary tumors. Heart damage also includes wounds, such as for example, knife wound; biological (e.g. viral; autoimmune diseases) or chemical (e.g. chemotherapy, drugs); surgery; transplantation and the like.

As used herein the phrase "diagnosing" refers to classifying a disease or a symptom, determining a severity of the disease, monitoring disease progression, forecasting an outcome of a disease and/or prospects of recovery. The term "detecting" may also optionally encompass any of the above. Diagnosis of a disease according to the present invention can be effected by determining a level of a polynucleotide or a polypeptide of the present invention in a biological sample obtained from the subject, wherein the level determined can be correlated with predisposition to, or presence or absence of the disease. It should be noted that a "biological sample obtained from the subject" may also optionally comprise a sample that has not been physically removed from the subject.

As used herein the phrase "diagnostic" means identifying the presence or nature of a pathologic condition. Diagnostic methods differ in their sensitivity and specificity. The "sensitivity" of a diagnostic assay is the percentage of diseased individuals who test positive (percent of "true positives"). Diseased individuals not detected by the assay are "false negatives." Subjects who are not diseased and who test negative in the assay are termed "true negatives." The "specificity" of a diagnostic assay is 1 minus the false positive rate, where the "false positive" rate is defined as the proportion of those without the disease who test positive. While a particular diagnostic method may not provide a definitive diagnosis of a condition, it suffices if the method provides a positive indication that aids in diagnosis.

An "effective amount" as used herein, means an amount which provides a therapeutic or prophylactic benefit.

"Encoding" refers to the inherent property of specific sequences of nucleotides in a polynucleotide, such as a gene, a cDNA, or an mRNA, to serve as templates for synthesis of other polymers and macromolecules in biological processes having either a defined sequence of nucleotides (i.e., rRNA, tRNA and mRNA) or a defined sequence of amino acids and the biological properties resulting therefrom. Thus, a gene encodes a protein if transcription and translation of mRNA corresponding to that gene produces the protein in a cell or other biological system. Both the coding strand, the nucleotide sequence of which is identical to the mRNA sequence and is usually provided in sequence listings, and the non-coding strand, used as the template for transcription of a gene or cDNA, can be referred to as encoding the protein or other product of that gene or cDNA.

The term "expression" as used herein is defined as the transcription and/or translation of a particular nucleotide sequence driven by its promoter.

"Expression vector" refers to a vector comprising a recombinant polynucleotide comprising expression control sequences operatively linked to a nucleotide sequence to be expressed. An expression vector comprises sufficient cis-acting elements for expression; other elements for expression can be supplied by the host cell or in an in vitro expression system. Expression vectors include all those known in the art, such as cosmids, plasmids (e.g., naked or contained in liposomes) and viruses (e.g., lentiviruses, retroviruses, adenoviruses, and adeno-associated viruses) that incorporate the recombinant polynucleotide.

By "inhibitory nucleic acid" is meant a double-stranded RNA, siRNA, shRNA, or antisense RNA, or a portion thereof, or a mimetic thereof, that when administered to a mammalian cell results in a decrease (e.g., by 10%, 25%, 50%, 75%, or even 90-100%) in the expression of a target gene. Typically, a nucleic acid inhibitor comprises at least a portion of a target nucleic acid molecule, or an ortholog thereof, or comprises at least a portion of the complementary strand of a target nucleic acid molecule. For example, an inhibitory nucleic acid molecule comprises at least a portion of any or all of the nucleic acids delineated herein.

"Isolated" means altered or removed from the natural state. For example, a nucleic acid or a peptide naturally present in a living animal is not "isolated," but the same nucleic acid or peptide partially or completely separated from the coexisting materials of its natural state is "isolated." An isolated nucleic acid or protein can exist in substantially purified form, or can exist in a non-native environment such as, for example, a host cell.

An "isolated nucleic acid" refers to a nucleic acid segment or fragment which has been separated from sequences which flank it in a naturally occurring state, i.e., a DNA fragment which has been removed from the sequences which are normally adjacent to the fragment, i.e., the sequences adjacent to the fragment in a genome in which it naturally occurs. The term also applies to nucleic acids which have been substantially purified from other components which naturally accompany the nucleic acid, i.e., RNA or DNA or proteins, which naturally accompany it in the cell. The term therefore includes, for example, a recombinant DNA which is incorporated into a vector, into an autonomously replicating plasmid or virus, or into the genomic DNA of a prokaryote or eukaryote, or which exists as a separate molecule (i.e., as a cDNA or a genomic or cDNA fragment produced by PCR or restriction enzyme digestion) independent of other sequences. It also includes: a recombinant DNA which is part of a hybrid gene encoding additional polypeptide sequence, complementary DNA (cDNA), linear or circular oligomers or polymers of natural and/or modified monomers or linkages, including deoxyribonucleosides, ribonucleosides, substituted and alpha-anomeric forms thereof, peptide nucleic acids (PNA), locked nucleic acids (LNA), phosphorothioate, methylphosphonate, and the like.

The nucleic acid sequences may be "chimeric," that is, composed of different regions. In the context of this invention "chimeric" compounds are oligonucleotides, which contain two or more chemical regions, for example, DNA region(s), RNA region(s), PNA region(s) etc. Each chemical region is made up of at least one monomer unit, i.e., a nucleotide. These sequences typically comprise at least one region wherein the sequence is modified in order to exhibit one or more desired properties.

As used herein, the term "kit" refers to any delivery system for delivering materials. In the context of reaction assays, such delivery systems include systems that allow for the storage, transport, or delivery of reaction reagents (e.g., oligonucleotides, enzymes, etc. in the appropriate containers) and/or supporting materials (e.g., buffers, written instructions for performing the assay etc.) from one location to another. For example, kits include one or more enclosures (e.g., boxes) containing the relevant reaction reagents and/or supporting materials. As used herein, the term "fragmented kit" refers to a delivery systems comprising two or more separate containers that each contain a sub-portion of the total kit components. The containers may be delivered to the intended recipient together or separately. For example, a first container may contain an enzyme for use in an assay, while a second container contains oligonucleotides. The term "fragmented kit" is intended to encompass kits containing Analyte specific reagents (ASR's) regulated under section 520(e) of the Federal Food, Drug, and Cosmetic Act, but are not limited thereto. Indeed, any delivery system comprising two or more separate containers that each contains a sub-portion of the total kit components are included in the term "fragmented kit." In contrast, a "combined kit" refers to a delivery system containing all of the components of a reaction assay in a single container (e.g., in a single box housing each of the desired components). The term "kit" includes both fragmented and combined kits.

The term "target nucleic acid" sequence refers to a nucleic acid (often derived from a biological sample), to which the oligonucleotide is designed to specifically hybridize. It is either the presence or absence of the target nucleic acid that is to be detected, or the amount of the target nucleic acid that is to be quantified. The target nucleic acid has a sequence that is complementary to the nucleic acid sequence of the corresponding oligonucleotide directed to the target. The term target nucleic acid may refer to the specific subsequence of a larger nucleic acid to which the oligonucleotide is directed or to the overall sequence (e.g., gene or mRNA). The difference in usage will be apparent from context.

In the context of the present invention, the following abbreviations for the commonly occurring nucleic acid bases are used, "A" refers to adenosine, "C" refers to cytosine, "G" refers to guanosine, "T" refers to thymidine, and "U" refers to uridine.

Unless otherwise specified, a "nucleotide sequence encoding" an amino acid sequence includes all nucleotide sequences that are degenerate versions of each other and that encode the same amino acid sequence. The phrase nucleotide sequence that encodes a protein or an RNA may also include introns to the extent that the nucleotide sequence encoding the protein may in some version contain an intron(s).

"Parenteral" administration of an immunogenic composition includes, e.g., subcutaneous (s.c.), intravenous (i.v.), intramuscular (i.m.), or intrasternal injection, or infusion techniques.

The terms "patient" or "individual" or "subject" are used interchangeably herein, and refers to a mammalian subject to be treated, with human patients one example. In some cases, the methods of the invention find use in experimental animals, in veterinary application, and in the development of animal models for disease, including, but not limited to, rodents including mice, rats, and hamsters, and primates.

The term "percent sequence identity" or having "a sequence identity" refers to the degree of identity between any given query sequence and a subject sequence.

The terms "pharmaceutically acceptable" (or "pharmacologically acceptable") refer to molecular entities and compositions that do not produce an adverse, allergic or other untoward reaction when administered to an animal or a human, as appropriate. The term "pharmaceutically acceptable carrier," as used herein, includes any and all solvents, dispersion media, coatings, antibacterial, isotonic and absorption delaying agents, buffers, excipients, binders, lubricants, gels, surfactants and the like, that may be used as media for a pharmaceutically acceptable substance.

The term "polynucleotide" is a chain of nucleotides, also known as a "nucleic acid" or "nucleic acid sequence" and include, but are not limited to, all nucleic acid sequences which are obtained by any means available in the art, both naturally occurring and synthetic nucleic acids, complementary DNA (cDNA), linear or circular oligomers or polymers of natural and/or modified monomers or linkages, including deoxyribonucleosides, ribonucleosides, substituted and alpha-anomeric forms thereof, peptide nucleic acids (PNA), locked nucleic acids (LNA), phosphorothioate, methylphosphonate, and the like. The nucleic acid sequences may be "chimeric," that is, composed of different regions. In the context of this invention "chimeric" compounds are oligonucleotides, which contain two or more chemical regions, for example, DNA region(s), RNA region(s), PNA region(s) etc. Each chemical region is made up of at least one monomer unit, i.e., a nucleotide. These sequences typically comprise at least one region wherein the sequence is modified in order to exhibit one or more desired properties.

The terms "peptide," "polypeptide," and "protein" are used interchangeably, and refer to a compound comprised of amino acid residues covalently linked by peptide bonds. A protein or peptide must contain at least two amino acids, and no limitation is placed on the maximum number of amino acids that can comprise a protein's or peptide's sequence. Polypeptides include any peptide or protein comprising two or more amino acids joined to each other by peptide bonds. As used herein, the term refers to both short chains, which also commonly are referred to in the art as peptides, oligopeptides and oligomers, for example, and to longer chains, which generally are referred to in the art as proteins, of which there are many types. "Polypeptides" include, for example, biologically active fragments, substantially homologous polypeptides, oligopeptides, homodimers, heterodimers, variants of polypeptides, modified polypeptides, derivatives, analogs, fusion proteins, among others. The polypeptides include natural peptides, recombinant peptides, synthetic peptides, or a combination thereof.

The term "transfected" or "transformed" or "transduced" means to a process by which exogenous nucleic acid is transferred or introduced into the host cell. A "transfected" or "transformed" or "transduced" cell is one which has been transfected, transformed or transduced with exogenous nucleic acid. The transfected/transformed/transduced cell includes the primary subject cell and its progeny.

To "treat" a disease as the term is used herein, means to reduce the frequency or severity of at least one sign or symptom of a disease or disorder experienced by a subject. Treatment of a disease or disorders includes the eradication of a virus.

"Treatment" is an intervention performed with the intention of preventing the development or altering the pathology or symptoms of a disorder. Accordingly, "treatment" refers to both therapeutic treatment and prophylactic or preventative measures. "Treatment" may also be specified as palliative care. Those in need of treatment include those already with the disorder as well as those in which the disorder is to be prevented. Accordingly, "treating" or "treatment" of a state, disorder or condition includes: (1) eradicating the virus; (2) preventing or delaying the appearance of clinical symptoms of the state, disorder or condition developing in a human or other mammal that may be afflicted with or predisposed to the state, disorder or condition but does not yet experience or display clinical or subclinical symptoms of the state, disorder or condition; (3) inhibiting the state, disorder or condition, i.e., arresting, reducing or delaying the development of the disease or a relapse thereof (in case of maintenance treatment) or at least one clinical or subclinical symptom thereof; or (4) relieving the disease, i.e., causing regression of the state, disorder or condition or at least one of its clinical or subclinical symptoms. The benefit to an individual to be treated is either statistically significant or at least perceptible to the patient or to the physician.

The term "variant," when used in the context of a polynucleotide sequence, may encompass a polynucleotide sequence related to a wild type gene. This definition may also include, for example, "allelic," "splice," "species," or "polymorphic" variants. A splice variant may have significant identity to a reference molecule, but will generally have a greater or lesser number of polynucleotides due to alternate splicing of exons during mRNA processing. The corresponding polypeptide may possess additional functional domains or an absence of domains. Species variants are polynucleotide sequences that vary from one species to another. Of particular utility in the invention are variants of wild type gene products. Variants may result from at least one mutation in the nucleic acid sequence and may result in altered mRNAs or in polypeptides whose structure or function may or may not be altered. Any given natural or recombinant gene may have none, one, or many allelic forms. Common mutational changes that give rise to variants are generally ascribed to natural deletions, additions, or substitutions of nucleotides. Each of these types of changes may occur alone, or in combination with the others, one or more times in a given sequence.

A "vector" is a composition of matter which comprises an isolated nucleic acid and which can be used to deliver the isolated nucleic acid to the interior of a cell. Examples of vectors include but are not limited to, linear polynucleotides, polynucleotides associated with ionic or amphiphilic compounds, plasmids, and viruses. Thus, the term "vector" includes an autonomously replicating plasmid or a virus. The term is also construed to include non-plasmid and non-viral compounds which facilitate transfer of nucleic acid into cells, such as, for example, polylysine compounds, liposomes, and the like. Examples of viral vectors include, but are not limited to, adenoviral vectors, adeno-associated virus vectors, retroviral vectors, and the like.

Ranges: throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Where any a nucleic acid sequence or an amino acid sequence is specifically referred to by a Swiss Prot. or GENBANK Accession number, the sequence is incorporated herein by reference. Information associated with the accession number, such as identification of signal peptide, extracellular domain, transmembrane domain, promoter sequence and translation start, is also incorporated herein in its entirety by reference.

BRIEF DESCRIPTION OF THE DRAWINGS

FIG. 2A shows event-free survival in all patients with or without a BAG3 variant. FIG. 2B shows event-free survival in patients with non-ischemic HF with or without a BAG3 variant. FIG. 2C shows event-free survival in patients with ischemic dilated cardiomyopathy. Statistical significance is indicated for each comparison. The number of patients in each group is indicated along the x-axis.

FIG. 3D is the quantification of images from approximately 200 cells per condition that represents the number of cells that were neither green nor red.

FIGS. 5A-5C show representative western blot of BAG3 levels in human failing heart (FIG. 5A), quantification of multiple western blots (FIG. 5B), quantification of mRNA levels in human failing heart (FIG. 5C). The data show that in patients without a BAG3 mutation and either idiopathic dilated cardiomyopathy or ischemic cardiomyopathy the levels of BAG3 are consistently lower than non-failing human heart. In the case of the A160Adup in-frame insertion, BAG3 levels are also low. By contrast, levels of BAG3 are actually elevated in both P63A+P380S (double heterozygote with variants in cis) and the Ala479Val—suggesting that the addition of exogenous BAG3 via gene therapy might not have a beneficial effect with this genotype.

FIGS. 6A, 6B are graphs showing cardiac function with BAG3 haploinsufficiency and reconstitution of WtBAG3. To evaluate the functional effects of common (>1%) BAG3 genetic variants mice were infected with haplo-insufficiency of BAG3, secondary to deletion of on allele of BAG3, with an adeno-associated virus (AAV) serotype 9, driving the transfection of either wild type or a mutated form of BAG3. Because the mice with deletion of one allele of BAG3 had half the amount of BAG3 found in wild-type mice, normal levels of BAG3 were replete when infected with the AAV-BAG3 and to ameliorate the left ventricular dysfunction found in the mice lacking one BAG3 allele (cBAG3$^{+/-}$). The same mice were also injected with an AAV9-MUTANT allele. Mice were followed with bi-weekly echocardiograms to determine left ventricular function. FIG. 6A shows serial measures of left ventricular function after injection of AAV9-GFP (control) into cBAG3$^{+/+}$ or cBAG3$^{+/-}$ mice. cBAG3$^{+/+}$ mice showed normal contractility in the presence of AAV9-GFP whereas the cBAG3$^{+/-}$ mice demonstrated a progressive decrease in left ventricular function consistent with an earlier report from our group. FIG. 6B shows the effects of infection with AAV9-BAG3 in cBAG3$^{+/-}$ mice as compared with normal cBAG3$^{+/+}$ mice. Here it is shown for the first time that restitution of normal levels of BAG3 with AAV9-BAG3 could ameliorate the decrease in BAG3 levels seen in cBAG3$^{+/-}$ minus mice that lack a single BAG3 allele.

FIG. 7A shows the effects of aAV9-BAG3-63/380 on left ventricular function in cBAG3$^{+/-}$ mice when compared with cBAG3$^{+/+}$ mice (controls). Injection of AAV9-BAG3-63/380 resulted in a dramatic decrease in left ventricular function—a decrease that was greater than that caused by deletion of the single BAG3 allele alone. FIG. 7B shows that injection of cBAG3-63/380 into mice with a normal BAG3 genotype (+/+) results in a left ventricular function that is worse than that seen in wild-type mice but significantly better than that seen in cBAG3$^{+/-}$ mice injected with AAV9-BAG3-63/380. Taken together, these results strongly support the hypothesis that administration of AAV9-BAG3-WT to mice harboring a cBAG3-63/380 mutation would likely result in a dominant negative effect and would heighten the decrease in left ventricular function. Thus, the take home message is that patients undergoing BAG3 gene therapy should have their BAG3 gene sequenced in order to optimize therapy.

FIG. 8A: By contrast with AAV9-BAG3-63/380, retro-orbital injection of AAV9-BAG3-A479V had no untoward effects in mice with either the normal genotype (BAG3$^{+/+}$) or in mice with the 479 mutation (A479V). FIG. 8B: Similarly, injection of cBAG3-A479V, by contrast with AAV9-BAG3-63/380, did not have an untoward effect on left ventricular function. Thus, A479V is unlikely to have a dominant negative effect when used to treat patients with heart failure and diminished levels of BAG3.

DETAILED DESCRIPTION

Figure 1:
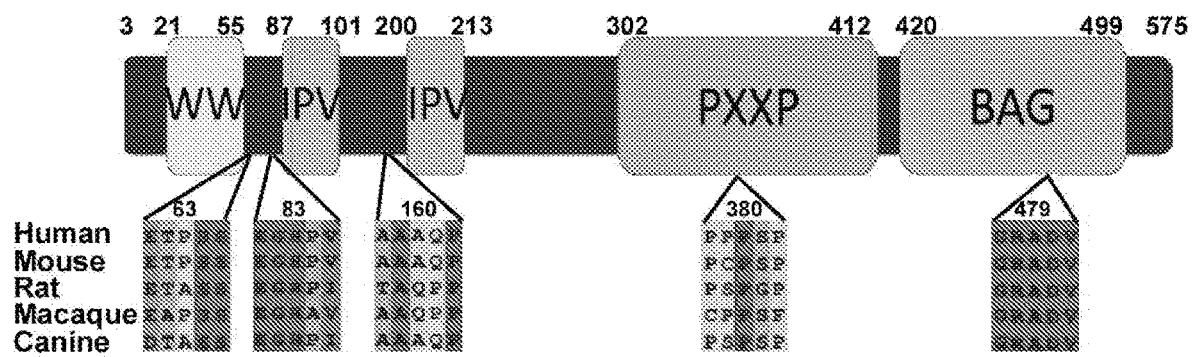
FIG. 1 is a schematic representation of BAG3 showing protein binding domains and sites of single non-synonymous variants, the single 3 nucleotide insertion and the double heterozygote non-synonymous variants. Blocks indicate conservation of amino acids across multiple mammalian species. The WW domain interacts with the PXXP region to modify the 3-dimensional structure of BAG3 and is also involved in chaperone-assisted selective autophagy (CASA); IPV motifs interact with small heat shock proteins HspB8 and HspB6 to support macroautophagy; the PXXP region facilitates binding to Src homology 3 (SH3) domain to promote migration and metastasis of cancer cells and also binds dynein complex to facilitate intracellular protein transport to perinuclear aggresomes; and the BAG domain interacts with Bcl-2 resulting in inhibition of apoptosis. In this drawing, the sequences shown are, from left to right and top to bottom, ETPSS (SEQ ID NO:1), EGHPV (SEQ ID NO:2), AAAQP (SEQ ID NO:3), PPPSP (SEQ ID NO:4), GRADV (SEQ ID NO:5), ETPSS (SEQ ID NO:6), EGHPV (SEQ ID NO:7), AAAQP (SEQ ID NO:8), PCPSP (SEQ ID NO:9), GRADV (SEQ ID NO:10), ETASS (SEQ ID NO:11), EGHPI (SEQ ID NO:12), TAQPP (SEQ ID NO:13), PSPGP (SEQ ID NO:14), GRADV (SEQ ID NO:15), EAPSS (SEQ ID NO:16), EGHAV (SEQ ID NO:17), AAQPP (SEQ ID NO:18), CPPSF (SEQ ID NO:19), GRADV (SEQ ID NO:20), DTASS (SEQ ID NO:21), EGHPI (SEQ ID NO:22), AAAQP (SEQ ID NO:23), PSPSP (SEQ ID NO:24), GRADV (SEQ ID NO:25). SEQ ID NOS:1-5 are human sequences, SEQ ID NOS:6-10 are mouse sequences, SEQ ID NOS:11-15 are rat sequences, SEQ ID NOS:16-20 are macaque sequences, and SEQ ID NOS:21-25 are canine sequences.

The following description of certain embodiments is merely exemplary in nature and is in no way intended to limit the invention, its application or uses. Embodiments of the invention may be practiced without the theoretical aspects presented. Moreover, the theoretical aspects are presented with the understanding that Applicants do not seek to be bound by the theory presented.

The invention is based, in part, on the finding that the presence of unique genetic variants in BAG3 found almost exclusively in African Americans predict a near 2-fold greater risk of having an adverse outcome. In addition, the importance of assessing the pathogenicity of genetic variants is shown and where possible their relationship to protein levels in human heart. Accordingly, BAG3 mutations play an important role in cardiovascular pathobiology in individuals of African ancestry.

Bcl-2 associated anthanogene-3 (BAG3), also known as BCL2-Associated Athanogene 3; MFM6; Bcl-2-Binding Protein Bis; CAIR-1; Docking Protein CAIR-1; BAG Family Molecular Chaperone Regulator 3; BAG-3; BCL2-Binding Athanogene 3; or BIS, is a cytoprotective polypeptide that competes with Hip-1 for binding to HSP 70. The NCBI reference amino acid sequence for BAG3 can be found at Genbank under accession number NP_004272.2; Public GI:14043024. The amino acid sequence of Genbank accession number NP_004272.2; Public GI:14043024 is referred to herein as SEQ ID NO: 1. The NCBI reference nucleic acid sequence for BAG3 can be found at Genbank under accession number NM_004281.3 GI:62530382. The nucleic acid sequence of Genbank accession number NM_004281.3 GI:62530382 is referred as SEQ ID NO: 2. Other BAG3 amino acid sequences include, for example, without limitation, O95817.3 GI:12643665 (SEQ ID NO: 3); EAW49383.1 GI:119569768 (SEQ ID NO: 4); EAW49382.1 GI:119569767 (SEQ ID NO: 5); and CAE55998.1 GI:38502170 (SEQ ID NO: 6). The BAG3 polypeptide of the invention can be a can be a variant of a polypeptide described herein, provided it retains functionality.

Compositions

Genetic variants in over 40 genes have been linked with DCM. One such gene encodes BAG3 (Bcl-2 associated athanogene 3), an evolutionarily conserved protein that is expressed predominantly in the heart, the skeletal muscle and in many cancers. BAG3 has pleotropic effects in the heart: it inhibits apoptosis, facilitates autophagy, mediates excitation-contraction coupling, maintains the integrity of the sarcomere[17-18] and has emerged as a major DCM locus.[19] Several observations suggest that BAG3 mutations might be prevalent in African Americans: 1) BAG3 genetic variants are most prevalent in isolated populations[20]; and 2) The Genome Aggregation Database (gnomAD) shows marked differences between the allele frequency of BAG3 variants found commonly in individuals of African ancestry when compared to the allele frequency of BAG3 variants in individuals of European ancestry.[21] Without wishing to be bound by any particular theory it was hypothesized that BAG3 variants might contribute to the increased prevalence of IDC in African Americans. As described in detail in the examples section, it was found, for the first time, that a group of functional BAG3 variants found with rare exception in individuals of African ancestry are associated with poor outcomes in patients with IDC and may provide a precise target for therapeutic intervention.

Accordingly, in certain embodiments, a method of diagnosing and treating a patient having cardiac disease, comprises identifying in a patient sample, at least one Bcl2-associated anthanogene 3 (BAG3) genetic variant as compared to a control BAG3 nucleic acid sequence, wherein detection of certain variants are predictive of whether an increase in BAG3 levels is therapeutic for the patient, and, administering to the patient identified as having such a variant, a therapeutically effective amount of an agent wherein the agent modulates expression or amount of BAG3 molecules, proteins or peptides thereof in a target cell or tissue, as compared to a normal control.

In certain embodiments, the genetic variant is a single nucleotide variant (SNV) in-frame insertion, deletions, substitutions or combinations thereof. In certain embodiments, the SNVs comprise: p.Pro63Ala (10:121429369 C/G; rs133031999); p.His83Gln (10:151331972; rs151331972); Pro380Ser (10:121436204 C/T; rs144692954); Ala479Val (10:121436502 C/T, rs34656239) or combinations thereof. In certain embodiments, the in-frame insertion encodes for an amino acid. In certain embodiments, the in-frame insertion encodes for a nonpolar amino acid. In certain embodiments, the in-frame insertion encodes for an alanine at position 160.

In further embodiments, a method of treating a patient having cardiac disease, wherein the patient has at least one Bcl2-associated anthanogene 3 (BAG3) nucleotide variant (NV) in-frame insertion as compared to a control BAG3 nucleic acid sequence, comprises administering to the patient a therapeutically effective amount of an agent wherein the agent modulates expression or amount of BAG3 molecules, proteins or peptides thereof in a target cell or tissue.

In certain embodiments, the in-frame insertion encodes an amino acid. In certain embodiments, the in-frame insertion encodes a nonpolar amino acid. In certain embodiments, the in-frame insertion comprises a 3 nucleotide insertion that adds an alanine at position 160 (p.Ala160dup, 10:121429647 A/AGCG; rs139438727).

In certain embodiments, an agent for treating a patient having IDC and identified as having a genetic variant in a BCL2-associated athanogene 3 (BAG3) gene, wherein the genetic variant wherein detection of certain variants are predictive of whether an increase in BAG3 levels is therapeutic for the patient.

In certain embodiments, a therapeutic agent for treatment of diseases associated with BAG3 and associated molecules and pathways thereof, in subjects modulates the expression or amounts of BAG3 in a cell. In some embodiments, compositions comprise nucleic acid sequences of BCL2-associated athanogene 3 (BAG3), including without limitation, cDNA, sense and/or antisense sequences of BAG3.

In certain embodiments, the agent comprises one or more gene-editing or nuclease systems to delete or edit the genetic variants in subjects wherein an increase in BAG3 would not be therapeutic or may even be detrimental to the subject.

Any suitable nuclease system can be used including, for example, clustered regularly interspaced short palindromic repeat (CRISPR) nucleases, Argonaute family of endonucleases, zinc-finger nucleases (ZFNs), transcription activator-like effector nucleases (TALENs), meganucleases, other endo- or exo-nucleases, or combinations thereof. See Schiffer, 2012, *J Virol* 88(17):8920-8936, incorporated by reference. In certain embodiments, the system is an Argonaute nuclease system.

CRISPR/Cas: In certain embodiments, the gene editing agent comprises a Clustered Regularly Interspaced Short Palindromic Repeat (CRISPR)-associated endonuclease/Cas (CRISPR/Cas).

In certain embodiments, the CRISPR/Cas comprises catalytically deficient Cas protein (dCas), orthologs, homologs, mutants variants or fragments thereof.

The compositions disclosed herein may include nucleic acids encoding a CRISPR-associated endonuclease, such as Cas9. In bacteria, the CRISPR/Cas loci encode RNA-guided adaptive immune systems against mobile genetic elements (viruses, transposable elements and conjugative plasmids). Three types (I-III) of CRISPR systems have been identified. CRISPR clusters contain spacers, the sequences complementary to antecedent mobile elements. CRISPR clusters are transcribed and processed into mature CRISPR RNA (crRNA). The CRISPR-associated endonuclease, Cas9, belongs to the type II CRISPR/Cas system and has strong endonuclease activity to cut target DNA. Cas9 is guided by a mature crRNA that contains about 20 base pairs (bp) of unique target sequence (called spacer) and a trans-activated small RNA (tracrRNA) that serves as a guide for ribonuclease III-aided processing of pre-crRNA. The crRNA:tracrRNA duplex directs Cas9 to target DNA via complementary base pairing between the spacer on the crRNA and the complementary sequence (called protospacer) on the target DNA. Cas9 recognizes a trinucleotide (NGG) protospacer adjacent motif (PAM) to specify the cut site (the 3rd nucleotide from PAM). The crRNA and tracrRNA can be expressed separately or engineered into an artificial fusion small guide RNA (sgRNA) via a synthetic stem loop (AGAAAU) to mimic the natural crRNA/tracrRNA duplex. Such sgRNA, like shRNA, can be synthesized or in vitro transcribed for direct RNA transfection or expressed from U6 or H1-promoted RNA expression vector, although cleavage efficiencies of the artificial sgRNA are lower than those for systems with the crRNA and tracrRNA expressed separately.

In embodiments, the CRISPR/Cas system can be a type I, a type II, or a type III system. Non-limiting examples of suitable CRISPR/Cas proteins include Cas9, CasX, CasY.1, CasY.2, CasY.3, CasY.4, CasY.5, CasY.6, spCas, eSpCas, SpCas9-HF1, SpCas9-HF2, SpCas9-HF3, SpCas9-HF4, ARMAN 1, ARMAN 4, Cas3, Cas4, Cas5, Cas5e (or CasD), Cas6, Cas6e, Cas6f, Cas7, Cas8a1, Cas8a2, Cas8b, Cas8c, Cas9, Cas10, Cas10d, CasF, CasG, CasH, Csy1, Csy2, Csy3, Cse1 (or CasA), Cse2 (or CasB), Cse3 (or CasE), Cse4 (or CasC), Csc1, Csc2, Csa5, Csn2, Csm2, Csm3, Csm4, Csm5, Csm6, Cmr1, Cmr3, Cmr4, Cmr5, Cmr6, Csb1, Csb2, Csb3, Csx17, Csx14, Csx10, Csx16, CsaX, Csx3, Csz1, Csx15, Csf1, Csf2, Csf3, Csf4, and Cu1966.

The Cas9 can be an orthologous. Six smaller Cas9 orthologues have been used and reports have shown that Cas9 from *Staphylococcus aureus* (SaCas9) can edit the genome with efficiencies similar to those of SpCas9, while being more than 1 kilobase shorter.

In addition to the wild type and variant Cas9 endonucleases described, embodiments of the invention also encompass CRISPR systems including newly developed "enhanced-specificity" *S. pyogenes* Cas9 variants (eSpCas9), which dramatically reduce off target cleavage. These variants are engineered with alanine substitutions to neutralize positively charged sites in a groove that interacts with the non-target strand of DNA. This aim of this modification is to reduce interaction of Cas9 with the non-target strand, thereby encouraging re-hybridization between target and non-target strands. The effect of this modification is a requirement for more stringent Watson-Crick pairing between the gRNA and the target DNA strand, which limits off-target cleavage (Slaymaker, I. M. et al. (2015) DOI: 10.1126/science.aad5227).

In certain embodiments, three variants found to have the best cleavage efficiency and fewest off-target effects: SpCas9 (K855A), SpCas9 (K810A/K1003A/R1060A) (a.k.a. eSpCas9 1.0), and SpCas9 (K848A/K1003A/R1060A) (a.k.a. eSPCas9 1.1) are employed in the compositions. The invention is by no means limited to these variants, and also encompasses all Cas9 variants (Slaymaker, I. M. et al. (2015)). The present invention also includes another type of enhanced specificity Cas9 variant, "high fidelity" spCas9 variants (HF-Cas9). Examples of high fidelity variants include SpCas9-HF1 (N497A/R661A/Q695A/Q926A), SpCas9-HF2 (N497A/R661A/Q695A/Q926A/D1135E), SpCas9-HF3 (N497A/R661A/Q695A/Q926A/L169A), SpCas9-HF4 (N497A/R661A/Q695A/Q926A/Y450A). Also included are all SpCas9 variants bearing all possible single, double, triple and quadruple combinations of N497A, R661A, Q695A, Q926A or any other substitutions (Kleinstiver, B. P. et al., 2016, Nature. DOI: 10.1038/nature16526).

As used herein, the term "Cas" is meant to include all Cas molecules comprising variants, mutants, orthologues, high-fidelity variants and the like.

In one embodiment, the endonuclease is derived from a type II CRISPR/Cas system. In other embodiments, the endonuclease is derived from a Cas9 protein and includes Cas9, CasX, CasY.1, CasY.2, CasY.3, CasY.4, CasY.5, CasY.6, spCas, eSpCas, SpCas9-HF1, SpCas9-HF2, SpCas9-HF3, SpCas9-HF4, ARMAN 1, ARMAN 4, mutants, variants, high-fidelity variants, orthologs, analogs, fragments, or combinations thereof. The Cas9 protein can be from *Streptococcus pyogenes, Streptococcus thermophilus, Streptococcus sp., Nocardiopsis dassonvillei, Streptomyces pristinaespiralis, Streptomyces viridochromogenes, Streptomyces viridochromogenes, Streptosporangium roseum, Alicyclobacillus acidocaldarius, Bacillus pseudomycoides, Bacillus selenitireducens, Exiguobacterium sibiricum, Lactobacillus delbrueckii, Lactobacillus salivarius, Microscilla marina, Burkholderiales bacterium, Polaromonas naphthalenivorans, Polaromonas sp., Crocosphaera watsonii, Cyanothece sp., Microcystis aeruginosa, Synechococcus sp., Acetohalobium arabaticum, Ammonifex degensii, Caldicelulosiruptor becscii, Candidatus Desulforudis, Clostridium botulinum, Clostridium difficile, Finegoldia magna, Natra-* naerobius thermophilus, Pelotomaculum thermopropionicum, Acidithiobacillus caldus, Acidithiobacillus ferrooxidans, Allochromatium vinosum, Marinobacter sp., Nitrosococcus halophilus, Nitrosococcus watsoni, Pseudoalteromonas haloplanktis, Ktedonobacter racemifer, Methanohalobium evestigatum, Anabaena variabilis, Nodularia spumigena, Nostoc sp., Arthrospira maxima, Arthrospira platensis, Arthrospira sp., Lyngbya sp., Microcoleus chthonoplastes, Oscillatoria sp., Petrotoga mobilis, Thermosipho africanus, or Acaryochloris marina. Included are Cas9 proteins encoded in genomes of the nanoarchaea ARMAN-1 (Candidatus Micrarchaeum acidiphilum ARMAN-1) and ARMAN-4 (Candidatus Parvarchaeum acidiphilum ARMAN-4), CasY (Kerfeldbacteria, Vogelbacteria, Komeilibacteria, Katanobacteria), CasX (Planctomycetes, Deltaproteobacteria).

In general, CRISPR/Cas proteins comprise at least one RNA recognition and/or RNA binding domain. RNA recognition and/or RNA binding domains interact with guide RNAs. CRISPR/Cas proteins can also comprise nuclease domains (i.e., DNase or RNase domains), DNA binding domains, helicase domains, RNAse domains, protein-protein interaction domains, dimerization domains, as well as other domains. Active DNA-targeting CRISPR-Cas systems use 2 to 4 nucleotide protospacer-adjacent motifs (PAMs) located next to target sequences for self versus non-self discrimination. ARMAN-1 has a strong 'NGG' PAM preference. Cas9 also employs two separate transcripts, CRISPR RNA (crRNA) and trans-activating CRISPR RNA (tracrRNA), for RNA-guided DNA cleavage. Putative tracrRNA was identified in the vicinity of both ARMAN-1 and ARMAN-4 CRISPR-Cas9 systems.

Embodiments of the invention also include a new type of class 2 CRISPR-Cas system found in the genomes of two bacteria recovered from groundwater and sediment samples. This system includes Cas1, Cas2, Cas4 and an approximately ~980 amino acid protein that is referred to as CasX. The high conservation (68% protein sequence identity) of this protein in two organisms belonging to different phyla, Deltaproteobacteria and Planctomycetes, suggests a recent cross-phyla transfer. The CRISPR arrays associated with each CasX has highly similar repeats (86% identity) of 37 nucleotides (nt), spacers of 33-34 nt, and a putative tracrRNA between the Cas operon and the CRISPR array. Distant homology detection and protein modeling identified a RuvC domain near the CasX C-terminal end, with organization reminiscent of that found in type V CRISPR-Cas systems. The rest of the CasX protein (630 N-terminal amino acids) showed no detectable similarity to any known protein, suggesting this is a novel class 2 effector. The combination of tracrRNA and separate Cas1, Cas2 and Cas4 proteins is unique among type V systems, and phylogenetic analyses indicate that the Cas1 from the CRISPR-CasX system is distant from those of any other known type V. Further, CasX is considerably smaller than any known type V proteins: 980 aa compared to a typical size of about 1,200 amino acids for Cpf1, C2c1 and C2c3 (Burstein, D. et al., 2016 supra).

In some embodiments, a nucleic acid sequence of BAG3 comprises at least about a 50% sequence identity to wild type BAG3 or cDNA sequences thereof. In other embodiments, the BAG3 nucleic acid sequence comprises at least about 75%, 80%, 85%, 90%, 95%, 96%, 97%, 98%, 99% sequence identity to wild type BAG3 or cDNA sequences thereof.

In some embodiments, a nucleic acid sequence of BAG3 further comprises one or more mutations, substitutions, deletions, variants or combinations thereof.

In some embodiments, the homology, sequence identity or complementarity, between a BAG3 nucleic acid sequence comprising one or more mutations, substitutions, deletions, variants or combinations thereof and the native or wild type or cDNA sequences of BAG3 is from about 50% to about 60%. In some embodiments, homology, sequence identity or complementarity, is from about 60% to about 70%. In some embodiments, homology, sequence identity or complementarity, is from about 70% to about 80%. In some embodiments, homology, sequence identity or complementarity, is from about 80% to about 90%. In some embodiments, homology, sequence identity or complementarity, is about 90%, about 92%, about 94%, about 95%, about 96%, about 97%, about 98%, about 99% or about 100%.

In those cases where the variants detected in a sample are predictive that an increase of BAG3 levels or activity would be therapeutic, an agent comprising BAG3 molecules are administered to that subject. In one embodiment, an expression vector encodes a BCL2-associated athanogene 3 (BAG3) gene or cDNA sequences thereof, or modified sequences thereof. In one embodiment, the expression vector encodes a nucleic acid sequence comprising at least about 50% sequence identity to wild type BCL2-associated athanogene 3 (BAG3) or cDNA sequences thereof. In other embodiments, the nucleic acid sequence comprises at least about 75%, 80%, 85%, 90%, 95%, 96%, 97%, 98%, 99% sequence identity to wild type BCL2-associated athanogene 3 (BAG3) or cDNA sequences thereof.

Suitable nucleic acid delivery systems include viral vector, typically sequence from at least one of an adenovirus, adenovirus-associated virus (AAV), helper-dependent adenovirus, retrovirus, or hemagglutinating virus of Japan-liposome (HVJ) complex. In a particular example, the viral vector comprises a strong eukaryotic promoter operably linked to the polynucleotide e.g., a cytomegalovirus (CMV) promoter.

If desired, the polynucleotides of the invention may also be used with a microdelivery vehicle such as cationic liposomes and adenoviral vectors. For a review of the procedures for liposome preparation, targeting and delivery of contents, see Mannino and Gould-Fogerite, BioTechniques, 6:682 (1988). See also, Felgner and Holm, Bethesda Res. Lab. Focus, 11(2):21 (1989) and Maurer, R. A., Bethesda Res. Lab. Focus, 11(2):25 (1989).

Replication-defective recombinant adenoviral vectors, can be produced in accordance with known techniques. See, Quantin, et al., Proc. Natl. Acad. Sci. USA, 89:2581-2584 (1992); Stratford-Perricadet, et al., J. Clin. Invest., 90:626-630 (1992); and Rosenfeld, et al., Cell, 68:143-155 (1992).

Another delivery method is to use single stranded DNA producing vectors which can produce the BAG3 intracellularly, for example, cardiac tissues. See for example, Chen et al, BioTechniques, 34: 167-171 (2003), which is incorporated herein, by reference, in its entirety.

Expression of BAG3 may be controlled by any promoter/enhancer element known in the art, but these regulatory elements must be functional in the host selected for expression. In some embodiments, the promoter is a tissue specific promoter. Of particular interest are muscle specific promoters, and more particularly, cardiac specific promoters. These include the myosin light chain-2 promoter (Franz et al. (1994) Cardioscience, Vol. 5(4):235-43; Kelly et al. (1995) J. Cell Biol., Vol. 129(2):383-396), the alpha actin promoter (Moss et al. (1996) Biol. Chem., Vol. 271(49):31688-

31694), the troponin 1 promoter (Bhaysar et al. (1996) Genomics, Vol. 35(1):11-23); the $Na^+/Ca^{2+}$ exchanger promoter (Barnes et al. (1997) J. Biol. Chem., Vol. 272(17): 11510-11517), the dystrophin promoter (Kimura et al. (1997) Dev. Growth Differ., Vol. 39(3):257-265), the alpha7 integrin promoter (Ziober and Kramer (1996) J. Bio. Chem., Vol. 271(37):22915-22), the brain natriuretic peptide promoter (LaPointe et al. (1996) Hypertension, Vol. 27 (3 Pt 2):715-22) and the alpha B-crystallin/small heat shock protein promoter (Gopal-Srivastava (1995) J. Mol. Cell. Biol., Vol. 15(12):7081-7090), alpha myosin heavy chain promoter (Yamauchi-Takihara et al. (1989) Proc. Natl. Acad. Sci. USA, Vol. 86(10):3504-3508) and the ANF promoter (LaPointe et al. (1988) J. Biol. Chem., Vol. 263(19):9075-9078).

Yeast expression systems can also be used according to the invention to express BAG3. For example, the non-fusion pYES2 vector (XbaI, SphI, ShoI, NotI, GstXI, EcoRI, BstXI, BamH1, SacI, Kpn1, and HindIII cloning sites; Invitrogen) or the fusion pYESHisA, B, C (XbaI, SphI, ShoI, NotI, BstXI, EcoRI, BamH1, SacI, KpnI, and HindIII cloning sites, N-terminal peptide purified with ProBond resin and cleaved with enterokinase; Invitrogen), to mention just two, can be employed according to the invention. A yeast two-hybrid expression system can be prepared in accordance with the invention.

One exemplary delivery system is a recombinant viral vector that incorporates one or more of the polynucleotides therein, for example, about one polynucleotide. An exemplary viral vector used in the invention methods has a pfu (plague forming units) of from about $10^8$ to about $5 \times 10^{10}$ pfu. In embodiments in which the polynucleotide is to be administered with a non-viral vector, use of between from about 0.1 nanograms to about 4000 micrograms will often be useful e.g., about 1 nanogram to about 100 micrograms.

In some embodiments, the vector is an adenovirus-associated viral vector (AAV), for example, AAV9. The term "AAV vector" means a vector derived from an adeno-associated virus serotype, including without limitation, AAV-1, AAV-2, AAV-3, AAV-4, AAV-5, AAV-6, AAV-7 and AAV-8. AAV vectors can have one or more of the AAV wild-type genes deleted in whole or part, such as the rep and/or cap genes, but retain functional flanking ITR sequences. Despite the high degree of homology, the different serotypes have tropisms for different tissues. The receptor for AAV1 is unknown; however, AAV1 is known to transduce skeletal and cardiac muscle more efficiently than AAV2. Since most of the studies have been done with pseudotyped vectors in which the vector DNA flanked with AAV2 ITR is packaged into capsids of alternate serotypes, it is clear that the biological differences are related to the capsid rather than to the genomes. Recent evidence indicates that DNA expression cassettes packaged in AAV 1 capsids are at least 1 log 10 more efficient at transducing cardiomyocytes than those packaged in AAV2 capsids. In one embodiment, the viral delivery system is an adeno-associated viral delivery system. The adeno-associated virus can be of serotype 1 (AAV 1), serotype 2 (AAV2), serotype 3 (AAV3), serotype 4 (AAV4), serotype 5 (AAV5), serotype 6 (AAV6), serotype 7 (AAV7), serotype 8 (AAV8), or serotype 9 (AAV9).

Some skilled in the art have circumvented some of the limitations of adenovirus-based vectors by using adenovirus "hybrid" viruses, which incorporate desirable features from adenovirus as well as from other types of viruses as a means of generating unique vectors with highly specialized properties. For example, viral vector chimeras were generated between adenovirus and adeno-associated virus (AAV). These aspects of the invention do not deviate from the scope of the invention described herein.

Nucleic acids encoding the BAG3 proteins of the invention may be delivered to cardiac muscle by methods known in the art. For example, cardiac cells of a large mammal may be transfected by a method that includes dilating a blood vessel of the coronary circulation by administering a vasodilating substance to said mammal prior to, and/or concurrent with, administering the nucleic acids. In some embodiments, the method includes administering the nucleic acids into a blood vessel of the coronary circulation in vivo, wherein nucleic acids are infused into the blood vessel over a period of at least about three minutes, wherein the coronary circulation is not isolated or substantially isolated from the systemic circulation of the mammal, and wherein the nucleic acids transfect cardiac cells of the mammal.

In some embodiments, the subject can be a human, an experimental animal, e.g., a rat or a mouse, a domestic animal, e.g., a dog, cow, sheep, pig or horse, or a non-human primate, e.g., a monkey. The subject may be suffering from a cardiac disorder, such as heart failure, ischemia, myocardial infarction, congestive heart failure, arrhythmia, transplant rejection and the like. In one embodiment, the subject is suffering from heart failure. In another particular embodiment, the subject is suffering from arrhythmia. In one embodiment, the subject is a human. For example, the subject is between ages 18 and 65. In another embodiment, the subject is a non-human animal.

In one embodiment, the subject has or is at risk for heart failure, e.g. a non-ischemic cardiomyopathy, mitral valve regurgitation, ischemic cardiomyopathy, or aortic stenosis or regurgitation.

In some embodiments, transfection of cardiac cells with nucleic acid molecules encoding a BAG3 protein or BAG3 protein fused to an effector domain increases lateral ventricle fractional shortening. In some embodiments, the mammal is human and the disease is congestive heart failure. In some embodiments, the transfection of the cardiac cells increases lateral ventricle fractional shortening when measured about 4 months after said infusion by at least 25% as compared to lateral ventricle fractional shortening before infusion of the polynucleotide. In some embodiments, the transfection of the cardiac cells results in an improvement in a measure of cardiac function selected from the group consisting of expression of BAG3 protein, fractional shortening, ejection fraction, cardiac output, time constant of ventricular relaxation, and regurgitant volume.

A treatment can be evaluated by assessing the effect of the treatment on a parameter related to contractility. For example, SR $Ca^{2+}$ ATPase activity or intracellular $Ca^{2+}$ concentration can be measured. Furthermore, force generation by hearts or heart tissue can be measured using methods described in Strauss et al., Am. J. Physiol., 262:1437-45, 1992, the contents of which are incorporated herein by reference.

Modified Nucleic Acid Sequences: It is not intended that the present invention be limited by the nature of the nucleic acid employed. The nucleic acid may be DNA or RNA and may exist in a double-stranded, single-stranded or partially double-stranded form.

Nucleic acids useful in the present invention include, by way of example and not limitation, oligonucleotides and polynucleotides such as antisense DNAs and/or RNAs; ribozymes; shRNAs; inhibitory nucleic acids; DNA for gene therapy; viral fragments including viral DNA and/or RNA; DNA and/or RNA chimeras; mRNA; plasmids; cosmids;

genomic DNA; cDNA; gene fragments; various structural forms of DNA including single-stranded DNA, double-stranded DNA, supercoiled DNA and/or triple-helical DNA; Z-DNA; and the like. The nucleic acids may be prepared by any conventional means typically used to prepare nucleic acids in large quantity. For example, DNAs and RNAs may be chemically synthesized using commercially available reagents and synthesizers by methods that are well-known in the art (see, e.g., Gait, 1985, Oligonucleotide Synthesis: A Practical Approach (IRL Press, Oxford, England)). RNAs may be produce in high yield via in vitro transcription using plasmids such as pGEM™ T vector or SP65 (Promega Corporation, Madison, Wis.).

Accordingly, certain nucleic acid sequences of this invention are chimeric nucleic acid sequences. "Chimeric nucleic acid sequences" or "chimeras," in the context of this invention, contain two or more chemically distinct regions, each made up of at least one nucleotide. These sequences typically contain at least one region of modified nucleotides that confers one or more beneficial properties (such as, for example, increased nuclease resistance, increased uptake into cells, increased binding affinity for the target).

Chimeric nucleic acid sequences of the invention may be formed as composite structures of two or more oligonucleotides, modified oligonucleotides, oligonucleosides and/or oligonucleotide mimetics. Such compounds have also been referred to in the art as hybrids or gapmers. Representative United States patents that teach the preparation of such hybrid structures comprise, but are not limited to, U.S. Pat. Nos. 5,013,830; 5,149,797; 5,220,007; 5,256,775; 5,366,878; 5,403,711; 5,491,133; 5,565,350; 5,623,065; 5,652,355; 5,652,356; and 5,700,922, each of which is herein incorporated by reference.

Specific examples of some modified nucleic acid sequences envisioned for this invention include those comprising modified backbones, for example, phosphorothioates, phosphotriesters, methyl phosphonates, short chain alkyl or cycloalkyl intersugar linkages or short chain heteroatomic or heterocyclic intersugar linkages. In some embodiments, modified oligonucleotides comprise those with phosphorothioate backbones and those with heteroatom backbones, $CH_2$—NH—O—$CH_2$, CH, —N($CH_3$)—O—$CH_2$ [known as a methylene(methylimino) or MMI backbone], $CH_2$—O—N($CH_3$)—$CH_2$, $CH_2$—N($CH_3$)—N($CH_3$)—$CH_2$ and O—N($CH_3$)—$CH_2$—$CH_2$ backbones, wherein the native phosphodiester backbone is represented as O—P—O—CH). The amide backbones disclosed by De Mesmaeker et al. *Acc. Chem. Res.* 1995, 28:366-374) are also embodied herein. In some embodiments, the nucleic acid sequences having morpholino backbone structures (Summerton and Weller, U.S. Pat. No. 5,034,506), peptide nucleic acid (PNA) backbone wherein the phosphodiester backbone of the oligonucleotide is replaced with a polyamide backbone, the nucleobases being bound directly or indirectly to the aza nitrogen atoms of the polyamide backbone (Nielsen et al. *Science* 1991, 254, 1497). The nucleic acid sequences may also comprise one or more substituted sugar moieties. The nucleic acid sequences may also have sugar mimetics such as cyclobutyls in place of the pentofuranosyl group.

Exemplary modified oligonucleotide backbones comprise, but are not limited to, phosphorothioates, chiral phosphorothioates, phosphorodithioates, phosphotriesters, aminoalkylphosphotriesters, methyl and other alkyl phosphonates comprising 3' alkylene phosphonates and chiral phosphonates, phosphinates, phosphoramidates comprising 3'-amino phosphoramidate and aminoalkylphosphoramidates, thionophosphoramidates, thionoalkylphosphonates, thionoalkylphosphotriesters, and boranophosphates having normal 3'-5' linkages, 2'-5' linked analogs of these, and those having inverted polarity wherein the adjacent pairs of nucleoside units are linked 3'-5' to 5'-3' or 2'-5' to 5'-2'. Various salts, mixed salts and free acid forms are also included.

Exemplary modified oligonucleotide backbones that do not include a phosphorus atom therein have backbones that are formed by short chain alkyl or cycloalkyl internucleoside linkages, mixed heteroatom and alkyl or cycloalkyl internucleoside linkages, or one or more short chain heteroatomic or heterocyclic internucleoside linkages. These comprise those having morpholino linkages (formed in part from the sugar portion of a nucleoside); siloxane backbones; sulfide, sulfoxide and sulfone backbones; formacetyl and thioformacetyl backbones; methylene formacetyl and thioformacetyl backbones; alkene containing backbones; sulfamate backbones; methyleneimino and methylenehydrazino backbones; sulfonate and sulfonamide backbones; amide backbones; and others having mixed N, O, S and $CH_2$ component parts.

The nucleic acid sequences may also include, additionally or alternatively, nucleobase (often referred to in the art simply as "base") modifications or substitutions. As used herein, "unmodified" or "natural" nucleotides include adenine (A), guanine (G), thymine (T), cytosine (C) and uracil (U). Modified nucleotides include nucleotides found only infrequently or transiently in natural nucleic acids, e.g., hypoxanthine, 6-methyladenine, 5-Me pyrimidines, particularly 5-methylcytosine (also referred to as 5-methyl-2' deoxycytosine and often referred to in the art as 5-Me-C), 5-hydroxymethylcytosine (HMC), glycosyl HMC and gentobiosyl HMC, as well as synthetic nucleotides, e.g., 2-aminoadenine, 2-(methylamino)adenine, 2-(imidazolylalkyl)adenine, 2-(aminoalklyamino)adenine or other heterosubstituted alkyladenines, 2-thiouracil, 2-thiothymine, 5-bromouracil, 5-hydroxymethyluracil, 8-azaguanine, 7-deazaguanine, N6 (6-aminohexyl)adenine and 2,6-diaminopurine. (Kornberg, A., DNA Replication, W.H. Freeman & Co., San Francisco, 1980, pp 75-77; Gebeyehu, G., (1987) et al. Nucl. Acids Res. 15:4513). A "universal" base known in the art, e.g., inosine, may be included.

Another modification involves chemically linking to the oligonucleotide one or more moieties or conjugates which enhance the activity or cellular uptake of the oligonucleotide. Such moieties include but are not limited to lipid moieties such as a cholesterol moiety, a cholesteryl moiety, cholic acid, a thioether, e.g., hexyl-5-tritylthiol, an aliphatic chain, e.g., dodecandiol or undecyl residues, a phospholipid, e.g., di-hexadecyl-rac-glycerol or triethylammonium 1,2-di-O-hexadecyl-rac-glycero-3-H-phosphonate, a polyamine or a polyethylene glycol chain, or adamantane acetic acid. Nucleic acid sequences comprising lipophilic moieties, and methods for preparing such oligonucleotides are known in the art, for example, U.S. Pat. Nos. 5,138,045, 5,218,105 and 5,459,255.

It is not necessary for all positions in a given nucleic acid sequence to be uniformly modified, and in fact more than one of the aforementioned modifications may be incorporated in a single nucleic acid sequence or even at within a single nucleoside within an such sequences. The present invention also includes oligonucleotides which are chimeric oligonucleotides as hereinbefore defined.

In another embodiment, the BAG3 nucleic acid molecule of the present invention is conjugated with another moiety including but not limited to abasic nucleotides, polyether, polyamine, polyamides, peptides, carbohydrates, lipid, or polyhydrocarbon compounds. Those skilled in the art will recognize that these molecules can be linked to one or more of any nucleotides comprising the nucleic acid molecule at several positions on the sugar, base or phosphate group.

In another embodiment, the BAG3 nucleic acid sequences comprise one or more nucleotides substituted with locked nucleic acids (LNA). The LNA modified nucleic acid sequences may have a size similar to the parent or native sequence or may be larger or smaller. Such LNA-modified oligonucleotides may contain less than about 70%, or less than about 60%, or less than about 50% LNA monomers and that their sizes are between about 1 and 25 nucleotides.

Antisense BAG3-Oligonucleotides: In another embodiment, it may be necessary to decrease the expression of BAG3 comprising one or more variants that would be predictive of a therapeutic outcome in a cell or patient by oligonucleotides modulate the expression of BAG3, for example, transcriptional regulator elements.

In one embodiment, an oligonucleotide comprises at least five consecutive bases complementary to a nucleic acid sequence, wherein the oligonucleotide specifically hybridizes to and modulates expression of BAG3 in vivo or in vitro. In another embodiment, the oligomeric compounds of the present invention also include variants in which a different base is present at one or more of the nucleotide positions in the compound. For example, if the first nucleotide is an adenosine, variants may be produced which contain thymidine, guanosine or cytidine at this position. This may be done at any of the positions of the oligonucleotide. These compounds are then tested using the methods described herein to determine their ability to inhibit expression of a target nucleic acid.

In some embodiments, homology, sequence identity or complementarity, between the oligonucleotide and target is from about 50% to about 60%. In some embodiments, homology, sequence identity or complementarity, is from about 60% to about 70%. In some embodiments, homology, sequence identity or complementarity, is from about 70% to about 80%. In some embodiments, homology, sequence identity or complementarity, is from about 80% to about 90%. In some embodiments, homology, sequence identity or complementarity, is about 90%, about 92%, about 94%, about 95%, about 96%, about 97%, about 98%, about 99% or about 100%.

In another embodiment, an oligonucleotide comprises combinations of phosphorothioate internucleotide linkages and at least one internucleotide linkage selected from the group consisting of: alkylphosphonate, phosphorodithioate, alkylphosphonothioate, phosphoramidate, carbamate, carbonate, phosphate triester, acetamidate, carboxymethyl ester, and/or combinations thereof.

In another embodiment, an oligonucleotide optionally comprises at least one modified nucleobase comprising, peptide nucleic acids, locked nucleic acid (LNA) molecules, analogues, derivatives and/or combinations thereof.

An oligonucleotide is specifically hybridizable when binding of the compound to the target nucleic acid interferes with the normal function of the target nucleic acid to cause a loss of activity, and there is a sufficient degree of complementarity to avoid non-specific binding of the oligonucleotide to non-target nucleic acid sequences under conditions in which specific binding is desired. Such conditions include, i.e., physiological conditions in the case of in vivo assays or therapeutic treatment, and conditions in which assays are performed in the case of in vitro assays.

An oligonucleotide, whether DNA, RNA, chimeric, substituted etc., is specifically hybridizable when binding of the compound to the target DNA or RNA molecule interferes with the normal function of the target DNA or RNA to cause a loss of utility, and there is a sufficient degree of complementarily to avoid non-specific binding of the oligonucleotide to non-target sequences under conditions in which specific binding is desired, i.e., under physiological conditions in the case of in vivo assays or therapeutic treatment, and in the case of in vitro assays, under conditions in which the assays are performed.

The specificity and sensitivity of antisense is also harnessed by those of skill in the art for therapeutic uses. Antisense oligonucleotides have been employed as therapeutic moieties in the treatment of disease states in animals and man. Antisense oligonucleotides have been safely and effectively administered to humans and numerous clinical trials are presently underway. It is thus established that oligonucleotides can be useful therapeutic modalities that can be configured to be useful in treatment regimens for treatment of cells, tissues and animals, especially humans.

In embodiments of the present invention oligomeric oligonucleotides, particularly oligonucleotides, bind to target nucleic acid molecules and modulate the expression of molecules encoded by a BAG3 gene comprising one or more variants that would either benefit from an increase in BAG3 or whether deletion, substitution or some other mechanism wherein the agent used would be therapeutically beneficial to that particular subject. The functions of DNA to be interfered comprise, for example, replication and transcription. The functions of RNA to be interfered comprise all vital functions such as, for example, translocation of the RNA to the site of protein translation, translation of protein from the RNA, splicing of the RNA to yield one or more mRNA species, and catalytic activity which may be engaged in or facilitated by the RNA. The functions may be up-regulated or inhibited depending on the functions desired.

The oligonucleotides, include, antisense oligomeric compounds, antisense oligonucleotides, external guide sequence (EGS) oligonucleotides, alternate splicers, primers, probes, and other oligomeric compounds that hybridize to at least a portion of the target nucleic acid. As such, these compounds may be introduced in the form of single-stranded, double-stranded, partially single-stranded, or circular oligomeric compounds.

Targeting an oligonucleotide to a particular nucleic acid molecule, in the context of this invention, can be a multistep process. The process usually begins with the identification of a target nucleic acid whose function is to be modulated. This target nucleic acid may be, for example, a cellular gene (or mRNA transcribed from the gene) whose expression is associated with a particular disorder or disease state.

The targeting process usually also includes determination of at least one target region, segment, or site within the target nucleic acid for the antisense interaction to occur such that the desired effect, e.g., modulation of expression, will result. Within the context of the present invention, the term "region" is defined as a portion of the target nucleic acid having at least one identifiable structure, function, or characteristic. Within regions of target nucleic acids are segments. "Segments" are defined as smaller or sub-portions of regions within a target nucleic acid. "Sites," as used in the present invention, are defined as positions within a target nucleic acid.

In another embodiment, the antisense oligonucleotides bind to coding and/or non-coding regions of a target polynucleotide and modulate the expression and/or function of the target molecule.

In another embodiment, the antisense oligonucleotides bind to natural antisense polynucleotides and modulate the expression and/or function of the target molecule. An example of a "function" can be one which inhibits a negative regulator of transcription, thus allowing for an increased expression of a desired molecule, such as, for example, BAG3.

In another embodiment, the antisense oligonucleotides bind to sense polynucleotides and modulate the expression and/or function of the target molecule.

In embodiments of the invention the oligonucleotides bind to an antisense strand of a particular target. The oligonucleotides are at least 5 nucleotides in length and can be synthesized so each oligonucleotide targets overlapping sequences such that oligonucleotides are synthesized to cover the entire length of the target polynucleotide. The targets also include coding as well as non-coding regions.

According to the present invention, antisense compounds include antisense oligonucleotides, ribozymes, external guide sequence (EGS) oligonucleotides, siRNA compounds, single- or double-stranded RNA interference (RNAi) compounds such as siRNA compounds, and other oligomeric compounds which hybridize to at least a portion of the target nucleic acid and modulate its function. As such, they may be DNA, RNA, DNA-like, RNA-like, or mixtures thereof, or may be mimetics of one or more of these. These compounds may be single-stranded, double-stranded, circular or hairpin oligomeric compounds and may contain structural elements such as internal or terminal bulges, mismatches or loops. Antisense compounds are routinely prepared linearly but can be joined or otherwise prepared to be circular and/or branched. Antisense compounds can include constructs such as, for example, two strands hybridized to form a wholly or partially double-stranded compound or a single strand with sufficient self-complementarity to allow for hybridization and formation of a fully or partially double-stranded compound. The two strands can be linked internally leaving free 3' or 5' termini or can be linked to form a continuous hairpin structure or loop. The hairpin structure may contain an overhang on either the 5' or 3' terminus producing an extension of single stranded character. The double stranded compounds optionally can include overhangs on the ends. Further modifications can include conjugate groups attached to one of the termini, selected nucleobase positions, sugar positions or to one of the internucleoside linkages. Alternatively, the two strands can be linked via a non-nucleic acid moiety or linker group. When formed from only one strand, dsRNA can take the form of a self-complementary hairpin-type molecule that doubles back on itself to form a duplex. Thus, the dsRNAs can be fully or partially double stranded. Specific modulation of gene expression can be achieved by stable expression of dsRNA hairpins in transgenic cell lines, however, in certain embodiments, the gene expression is up regulated. When formed from two strands, or a single strand that takes the form of a self-complementary hairpin-type molecule doubled back on itself to form a duplex, the two strands (or duplex-forming regions of a single strand) are complementary RNA strands that base pair in Watson-Crick fashion.

In another embodiment, the desired oligonucleotides or antisense compounds, comprise at least one of: antisense RNA, antisense DNA, chimeric antisense oligonucleotides, antisense oligonucleotides comprising modified linkages, interference RNA (RNAi), short interfering RNA (siRNA); a micro, interfering RNA (miRNA); a small, temporal RNA (stRNA); or a short, hairpin RNA (shRNA); small RNA-induced gene activation (RNAa); small activating RNAs (saRNAs), or combinations thereof.

dsRNA can also activate gene expression, a mechanism that has been termed "small RNA-induced gene activation" or RNAa. dsRNAs targeting gene promoters induce potent transcriptional activation of associated genes. RNAa was demonstrated in human cells using synthetic dsRNAs, termed "small activating RNAs" (saRNAs).

Small double-stranded RNA (dsRNA) may also act as small activating RNAs (saRNA). Without wishing to be bound by theory, by targeting sequences in gene promoters, saRNAs would induce target gene expression in a phenomenon referred to as dsRNA-induced transcriptional activation (RNAa).

In some embodiments, the ribonucleic acid sequence is specific for regulatory segments of the genome that control the transcription of BAG3. Thus a candidate therapeutic agent can be a dsRNA that activates the expression of BAG3 in a cell and is administered to a patient in need of treatment.

Peptides: In another embodiment, a BAG3 peptide is encoded by a nucleic acid comprising a BCL2-associated athanogene 3 (BAG3) wild type, chimeric or cDNA sequences thereof. The peptide can also be a synthetic peptide of BCL2-associated athanogene 3 (BAG3).

It is to be understood that the peptide sequences are not limited to the native or cDNA sequences thereof, of BCL2-associated athanogene 3 (BAG3) molecules. The skilled artisan will recognize that conservative amino acid changes may be made, which although they alter the primary sequence of the protein or peptide, do not normally alter its function. Conservative amino acid substitutions typically include substitutions within the following groups: glycine, alanine, valine, isoleucine, leucine; aspartic acid, glutamic acid, asparagine, glutamine, serine, threonine, lysine, arginine, phenylalanine, tyrosine.

Conservative substitutions may also be made based on types of amino acids: aliphatic (valine, isoleucine, leucine, and alanine); charged (aspartic acid, glutamic acid, lysine, arginine, and histidine); aromatic residues (phenylalanine, tyrosine and tryptophan); and sulfur-containing (methionine and cysteine). Polypeptide sequences having at least about 68% identity, at least about 70% identity, or at least about 71% identity to a BCL2-associated athanogene 3 (BAG3) nucleic acid sequence, or cDNA sequences thereof.

The determination of percent identity between two nucleotide or amino acid sequences can be accomplished using a mathematical algorithm. For example, a mathematical algorithm useful for comparing two sequences is the algorithm of Karlin and Altschul (1990, Proc. Natl. Acad. Sci. USA 87:2264-2268), modified as in Karlin and Altschul (1993, Proc. Natl. Acad. Sci. USA 90:5873-5877). This algorithm is incorporated into the NBLAST and XBLAST programs of Altschul, et al. (1990, J. Mol. Biol. 215:403-410), and can be accessed, for example at the National Center for Biotechnology Information (NCBI) world wide web site having the universal resource locatorblast(dot)ncbi (dot)nlm(dot)nih(dot)gov/blast.cgi. BLAST nucleotide searches can be performed with the NBLAST program (designated "blastn" at the NCBI web site), using the following parameters: gap penalty=5; gap extension penalty=2; mismatch penalty=3; match reward=1; expectation value 10.0; and word size=11 to obtain nucleotide sequences homologous to a nucleic acid described herein. BLAST protein searches can be performed with the XBLAST program or the NCBI "blastp" program, using the following parameters: expectation value 10.0, BLOSUM62 scoring matrix to obtain amino acid sequences homologous to a protein molecule described herein. To obtain gapped alignments for comparison purposes, Gapped BLAST can be utilized as described in Altschul et al. (1997, Nucleic Acids Res. 25:3389-3402). Alternatively, PSI-Blast or PHI-Blast can be used to perform an iterated search which detects distant relationships between molecules and relationships between molecules which share a common pattern. When utilizing BLAST, Gapped BLAST, PSI-Blast, and PHI-Blast programs, the default parameters of the respective programs (e.g., XBLAST and NBLAST) can be used. In calculating percent identity, exact matches are typically counted.

Embodiments of the invention also include polynucleotides encoding hybrid proteins comprising BCL2-associated athanogene 3 (BAG3) polypeptide operatively fused directly or indirectly via peptide linker, to a second polypeptide sequence. Linker sequences are well known in the art. In one embodiment, a hybrid protein comprises a BAG3 polypeptide or a BAG3 polypeptide operatively fused to a detectable moiety, such as, a reporter polypeptide, wherein the reporter polypeptide is fused to the N- or C-terminal of the BAG3 polypeptide, directly or indirectly. Exemplary reporter polypeptides include luciferase (LUC), green fluorescent protein (GFP), and GFP derivatives.

Hybrid proteins comprising a BAG3 polypeptide or fragment thereof may be linked to other types of polypeptides, in addition to a reporter polypeptide, or in lieu of a reporter polypeptide. These additional polypeptides may be any amino acid sequence useful for the purification, identification, and/or therapeutic or prophylactic application of the peptide. In addition, the additional polypeptide can be a signal peptide, or targeting peptide, etc.

In some cases, the other additions, substitutions or deletions may increase the stability (including but not limited to, resistance to proteolytic degradation) of the polypeptide or increase affinity of the polypeptide for its appropriate receptor, ligand and/or binding proteins. In some cases, the other additions, substitutions or deletions may increase the solubility of the polypeptide. In some embodiments sites are selected for substitution with a naturally encoded or non-natural amino acid in addition to another site for incorporation of a non-natural amino acid for the purpose of increasing the polypeptide solubility following expression in recombinant host cells. In some embodiments, the polypeptides comprise another addition, substitution, or deletion that modulates affinity for the associated ligand, binding proteins, and/or receptor, modulates (including but not limited to, increases or decreases) receptor dimerization, stabilizes receptor dimers, modulates circulating half-life, modulates release or bio-availability, facilitates purification, or improves or alters a particular route of administration. Similarly, the non-natural amino acid polypeptide can comprise chemical or enzyme cleavage sequences, protease cleavage sequences, reactive groups, antibody-binding domains (including but not limited to, FLAG or poly-His) or other affinity based sequences (including but not limited to, FLAG, poly-His, GST, etc.) or linked molecules (including but not limited to, biotin) that improve detection (including but not limited to, GFP), purification, transport through tissues or cell membranes, prodrug release or activation, size reduction, or other traits of the polypeptide.

The methods and compositions described herein include incorporation of one or more non-natural amino acids into a polypeptide. One or more non-natural amino acids may be incorporated at one or more particular positions which does not disrupt activity of the polypeptide. This can be achieved by making "conservative" substitutions, including but not limited to, substituting hydrophobic amino acids with non-natural or natural hydrophobic amino acids, bulky amino acids with non-natural or natural bulky amino acids, hydrophilic amino acids with non-natural or natural hydrophilic amino acids) and/or inserting the non-natural amino acid in a location that is not required for activity.

A variety of biochemical and structural approaches can be employed to select the desired sites for substitution with a non-natural amino acid within the polypeptide. Any position of the polypeptide chain is suitable for selection to incorporate a non-natural amino acid, and selection may be based on rational design or by random selection for any or no particular desired purpose. Selection of desired sites may be based on producing a non-natural amino acid polypeptide (which may be further modified or remain unmodified) having any desired property or activity, including but not limited to agonists, super-agonists, partial agonists, inverse agonists, antagonists, receptor binding modulators, receptor activity modulators, modulators of binding to binder partners, binding partner activity modulators, binding partner conformation modulators, dimer or multimer formation, no change to activity or property compared to the native molecule, or manipulating any physical or chemical property of the polypeptide such as solubility, aggregation, or stability. For example, locations in the polypeptide required for biological activity of a polypeptide can be identified using methods including, but not limited to, point mutation analysis, alanine scanning or homolog scanning methods. Residues other than those identified as critical to biological activity by methods including, but not limited to, alanine or homolog scanning mutagenesis may be good candidates for substitution with a non-natural amino acid depending on the desired activity sought for the polypeptide. Alternatively, the sites identified as critical to biological activity may also be good candidates for substitution with a non-natural amino acid, again depending on the desired activity sought for the polypeptide. Another alternative would be to make serial substitutions in each position on the polypeptide chain with a non-natural amino acid and observe the effect on the activities of the polypeptide. Any means, technique, or method for selecting a position for substitution with a non-natural amino acid into any polypeptide is suitable for use in the methods, techniques and compositions described herein.

Candidate Agents and Screening Assays

The compositions embodied herein, can also be applied in the areas of drug discovery and target validation. The present invention comprehends the use of the nucleic acid sequences and peptides embodied herein, in drug discovery efforts to elucidate relationships that exist between Bcl-2 associated anthanogene-3 (BAG3) polynucleotides and a disease state, phenotype, or condition. The method comprises identifying in a patient sample, at least one Bcl2-associated anthanogene 3 (BAG3) genetic variant as compared to a control BAG3 nucleic acid sequence; and administering to the patient identified as having a BAG3 genetic variation a therapeutically effective amount of an agent wherein the agent modulates expression or amount of BCL2-associated athanogene 3 (BAG3) molecules, proteins or peptides thereof in a target cell or tissue, as compared to a normal control. In certain embodiments, the genetic variant is a single nucleotide variant (SNV) in-frame insertion, deletions, substitutions or combinations thereof. In certain embodiments, the SNVs comprise: p.Pro63Ala (10: 121429369 C/G; rs133031999); p.His83Gln (10:

151331972; rs151331972); Pro380Ser (10:121436204 C/T; rs144692954); Ala479Val (10:121436502 C/T, rs34656239) or combinations thereof. In certain embodiments, the in-frame insertion encodes for an amino acid. In certain embodiments, the in-frame insertion encodes for a nonpolar amino acid. In certain embodiments, the in-frame insertion encodes for an alanine at position 160.

The screening assays of the invention suitably include and embody, animal models, cell-based systems and non-cell based systems. The nucleic acid sequences and peptides embodied herein, are used for identifying agents of therapeutic interest, e.g. by screening libraries of compounds or otherwise identifying compounds of interest by any of a variety of drug screening or analysis techniques, or synthesis of novel compounds. The gene, allele, fragment, or oligopeptide thereof employed in such screening may be free in solution, affixed to a solid support, borne on a cell surface, or located intracellularly. The measurements are conducted as described in detail in the examples section which follows. In embodiments, screening candidate agents is performed to identify those which modulate the translation of BAG3.

The assays can be of an in vitro or in vivo format. In vitro formats of interest include cell-based formats, in which contact occurs e.g., by introducing the substrate in a medium, such as an aqueous medium, in which the cell is present. In yet other embodiments, the assay may be in vivo, in which a multicellular organism that includes the cell is employed. Contact of a targeting vector encoding the nucleic acid sequences embodied herein, with the target cell(s) may be accomplished using any convenient protocol. In those embodiments where the target cells are present as part of a multicellular organism, e.g., an animal, the vector is conveniently administered to (e.g., injected into, fed to, etc.) the multicellular organism, e.g., a whole animal, where administration may be systemic or localized, e.g., directly to specific tissue(s) and/or organ(s) of the multicellular organism.

Multicellular organisms of interest include, but are not limited to: insects, vertebrates, such as avian species, e.g., chickens; mammals, including rodents, e.g., mice, rates; ungulates, e.g., pigs, cows, horses; dogs, cats, primates, e.g., monkeys, apes, humans; and the like. As such, the target cells of interest include, but are not limited to: insects cells, vertebrate cells, particularly avian cells, e.g., chicken cells; mammalian cells, including murine, porcine, ungulate, ovine, equine, rat, dog, cat, monkey, and human cells; and the like.

In certain embodiments, the subject methods are performed in a high throughput (HT) format. In the subject HT embodiments of the subject invention, a plurality of different cells are simultaneously assayed or tested. By simultaneously tested is meant that each of the cells in the plurality are tested at substantially the same time. In general, the number of cells that are tested simultaneously in the subject HT methods ranges from about 10 to 10,000, usually from about 100 to 10,000 and in certain embodiments from about 1000 to 5000. A variety of high throughput screening assays for determining the activity of candidate agent are known in the art and are readily adapted to the present invention, including those described in e.g., Schultz (1998) Bioorg Med Chem Lett 8:2409-2414; Fernandes (1998) Curr Opin Chem Biol 2:597-603; as well as those described in U.S. Pat. No. 6,127,133; the disclosures of which are herein incorporated by reference.

In embodiments, the detectable moiety is conjugated to an agent of interest wherein the detectable moiety comprises: a luminescent moiety, a chemiluminescent moiety, a fluorescence moiety, a bioluminescent moiety, an enzyme, a natural or synthetic moiety.

Candidate Agents: The methods can be practiced with any test compounds as candidate agents. Test compounds useful in practicing the inventive method may be obtained using any of the numerous approaches in combinatorial library methods known in the art, including biological libraries, spatially-addressable parallel solid phase or solution phase libraries, synthetic library methods requiring deconvolution, the "one-bead one-compound" library method, and synthetic library methods using affinity chromatography selection. The biological library approach is limited to peptide libraries, while the other four approaches are applicable to peptide, nonpeptide oligomer, or small molecule libraries of compounds (Lam, 1997, Anticancer Drug Des. 12:145).

Examples of methods for the synthesis of molecular libraries may be found in the art, for example, in: DeWitt et al., 1993, Proc. Natl. Acad. Sci. USA 90:6909-6913; Erb et al., 1994, Proc. Natl. Acad. Sci. USA 91:11422-11426; Zuckermann et al., 1994, J. Med. Chem. 37:2678-2685; Cho et al., 1992, Science 261:1303-1305; Carell et al., 1994, Angew. Chem. Int. Ed. Engl. 33:2059-2061; Carell et al., 1994, Angew. Chem. Int. Ed. Engl. 33:2061-2064; and Gallop et al., 1994, J. Med. Chem. 37:1233-1251.

Libraries of compounds may be presented in solution (e.g., Houghten, 1992, Bio/Techniques 13:412-421), or on beads (Lam, 1991, Nature 354:82-84), chips (Fodor, 1993, Nature 364:555-556), bacteria (U.S. Pat. No. 5,223,409), spores (U.S. Pat. Nos. 5,571,698; 5,403,484; and 5,223, 409), plasmids (Cull et al., 1992, Proc. Natl. Acad. Sci. USA 89:1865-1869), or phage (Scott and Smith, 1990, Science 249:386-390; Devlin, 1990, Science 249:404-406; Cwirla et al., 1990, Proc. Natl. Acad. Sci. USA 87:6378-6382; and Felici, 1991, J Mol. Biol. 222:301-310).

Commercially available libraries that may be screened include, but are not limited to, the TimTec Natural Product Library (NPL), NPL-640, and TimTec NDL-3000 library. Libraries comprising compounds modeled on polyamines (i.e., polyamine analogs) may also be screened.

In certain embodiments, the candidate agent is a small molecule or large molecule ligand. By small molecule ligand is meant a ligand ranging in size from about 50 to about 10,000 daltons, usually from about 50 to about 5,000 daltons and more usually from about 100 to about 1000 daltons. By large molecule is meant a ligand ranging in size from about 10,000 daltons or greater in molecular weight.

The method may be practiced iteratively using different concentrations of a test candidate and/or different testing conditions, such as duration of reaction time. Test candidates that are identified by the method can be further tested by conventional methods in the art to verify specificity, dose dependency, efficacy in vivo, and the like. Test candidates may serve as lead compounds for developing additional test candidates.

A prototype compound or agent may be believed to have therapeutic activity on the basis of any information available to the artisan. For example, a prototype agent may be believed to have therapeutic activity on the basis of information contained in the Physician's Desk Reference. In addition, by way of non-limiting example, a compound may be believed to have therapeutic activity on the basis of experience of a clinician, structure of the compound, structural activity relationship data, $EC_{50}$, assay data, $IC_{50}$ assay data, animal or clinical studies, or any other basis, or combination of such bases.

A therapeutically-active compound or agent is an agent that has therapeutic activity, including for example, the ability of the agent to induce a specified response when administered to a subject or tested in vitro. Therapeutic activity includes treatment of a disease or condition, including both prophylactic and ameliorative treatment. Treatment of a disease or condition can include improvement of a disease or condition by any amount, including prevention, amelioration, and elimination of the disease or condition. Therapeutic activity may be conducted against any disease or condition, including in one embodiment against any disease or disorder associated with damage by reactive oxygen intermediates. In order to determine therapeutic activity any method by which therapeutic activity of a compound may be evaluated can be used. For example, both in vivo and in vitro methods can be used, including for example, clinical evaluation, $EC_{50}$, and $IC_{50}$ assays, and dose response curves.

Candidate compounds for use with an assay of the present invention or identified by assays of the present invention as useful pharmacological agents can be pharmacological agents already known in the art or variations thereof or can be compounds previously unknown to have any pharmacological activity. The candidate compounds can be naturally occurring or designed in the laboratory. Candidate compounds can comprise a single diastereomer, more than one diastereomer, or a single enantiomer, or more than one enantiomer.

Candidate compounds can be isolated, from microorganisms, animals or plants, for example, and can be produced recombinantly, or synthesized by chemical methods known in the art. If desired, candidate compounds of the present invention can be obtained using any of the numerous combinatorial library methods known in the art, including but not limited to, biological libraries, spatially addressable parallel solid phase or solution phase libraries, synthetic library methods requiring deconvolution, the "one-bead one-compound" library method, and synthetic library methods using affinity chromatography selection. The biological library approach is limited to polypeptide libraries. The other four approaches are applicable to polypeptide, non-peptide oligomers, or small molecule libraries of compounds and are exemplary approaches in the present invention. See Lam, Anticancer Drug Des. 12: 145-167 (1997).

In an embodiment, the present invention provides a method of identifying a candidate compound as a suitable prodrug. A suitable prodrug includes any prodrug that may be identified by the methods of the present invention. Any method apparent to the artisan may be used to identify a candidate compound as a suitable prodrug.

In another aspect, the present invention provides methods of screening candidate compounds for suitability as therapeutic agents. Screening for suitability of therapeutic agents may include assessment of one, some or many criteria relating to the compound that may affect the ability of the compound as a therapeutic agent. Factors such as, for example, efficacy, safety, efficiency, retention, localization, tissue selectivity, degradation, or intracellular persistence may be considered. In an embodiment, a method of screening candidate compounds for suitability as therapeutic agents is provided, where the method comprises providing a candidate compound identified as a suitable prodrug, determining the therapeutic activity of the candidate compound, and determining the intracellular persistence of the candidate compound. Intracellular persistence can be measured by any technique apparent to the skilled artisan, such as for example by radioactive tracer, heavy isotope labeling, or LCMS.

In screening compounds for suitability as therapeutic agents, intracellular persistence of the candidate compound is evaluated. In one embodiment, the agents are evaluated for their ability to modulate the translation of compositions embodied herein, over a period of time in response to a candidate therapeutic agent.

In another embodiment, soluble and/or membrane-bound forms of compositions embodied herein, e.g. proteins, mutants or biologically active portions thereof, can be used in the assays for screening candidate agents. When membrane-bound forms of the protein are used, it may be desirable to utilize a solubilizing agent. Examples of such solubilizing agents include non-ionic detergents such as n-octylglucoside, n-dodecylglucoside, n-dodecylmaltoside, octanoyl-N-methylglucamide, decanoyl-N-methylglucamide, TRITON™ X-100, TRITON™ X-114, THESIT™, Isotridecypoly(ethylene glycol ether)n, 3-[(3-cholamidopropyl)dimethylamminio]-1-propane sulfonate (CHAPS), 3-[(3-cholamidopropyl)dimethylamminio]-2-hydroxy-1-propane sulfonate (CHAPSO), or N-dodecyl=N,N-dimethyl-3-ammonio-1-propane sulfonate.

Cell-free assays can also be used and involve preparing a reaction mixture which includes BAG3 molecules (nucleic acids or peptides) comprising a bioluminescent moiety and the test compound under conditions and time periods to allow the measurement of the translational and/or transcriptional activity over time, and concentrations of test agents.

Microarrays: Identification of a nucleic acid sequence or peptide capable of binding to a target molecule can be achieved by immobilizing a library of nucleic acids onto the substrate surface so that each unique nucleic acid is located at a defined position to form an array. In general, the immobilized library of nucleic acids or peptides are exposed to a biomolecule or candidate agent under conditions which favored binding of the biomolecule to the nucleic acids or peptides. The array would then be analyzed by the methods embodied herein to determine which nucleic acid sequences or peptides are bound to the biomolecule. Such biomolecules may carry a pre-determined label for use in detection of the location of the bound nucleic acids or peptides.

An assay using an immobilized array of BAG3 nucleic acid sequences may be used for determining the sequence of an unknown nucleic acid; single nucleotide polymorphism (SNP) analysis; analysis of BAG3 gene expression patterns from a particular species, tissue, cell type, etc.; gene identification; etc.

In further embodiments, oligonucleotides or longer fragments derived from any of the BAG3 polynucleotide sequences, may be used as targets in a microarray. The microarray can be used to monitor the identity and/or expression level of large numbers of genes and gene transcripts simultaneously to identify genes with which target genes or its product interacts and/or to assess the efficacy of candidate therapeutic agents in regulating expression products of genes that mediate, for example, neurological disorders. This information may be used to determine gene function, and to develop and monitor the activities of therapeutic agents.

Microarrays may be prepared, used, and analyzed using methods known in the art (see, e.g., Brennan et al., 1995, U.S. Pat. No. 5,474,796; Schena et al., 1996, Proc. Natl. Acad. Sci. U.S.A. 93: 10614-10619; Heller et al., 1997, Proc. Natl. Acad. Sci. U.S.A. 94: 2150-2155; and Heller et al., 1997, U.S. Pat. No. 5,605,662). In other embodiments, a microarray comprises BAG3 peptides, or other desired molecules which can be assayed to identify a candidate agent.

In another embodiment a method for screening candidate agents for the treatment or prevention of a cardiac disease or disorder comprises contacting a sample with a candidate therapeutic agent and measuring the effects the agent has on a target. For example, the agent may regulate BAG3 expression and the agent can then be further studied for any possible therapeutic effects (increase or decrease parameter being monitored e.g. expression). An abnormal expression state may be caused by pathology such as heart failure, disease, cancer, genetic defects and/or a toxin.

Antibodies. Useful diagnostic assays can include one or more antibodies that specifically bind BAG3. In some embodiments, the antibody specifically binds a mutant BAG3, The term antibody is used to broadly refer to immunoglobulin-based binding molecules, and the term encompasses conventional antibodies (e.g., the tetrameric antibodies of the G class (e.g., an IgG1)), fragments thereof that retain the ability to bind their intended target (e.g., an Fab' fragment), and single chain antibodies (scFvs). The antibody may be polyclonal or monoclonal and may be produced by human, mouse, rabbit, sheep or goat cells, or by hybridomas derived from these cells. The antibody can be humanized, chimeric, or bi-specific.

The antibodies can assume various configurations and encompass proteins consisting of one or more polypeptides substantially encoded by immunoglobulin genes. Any one of a variety of antibody structures can be used, including the intact antibody, antibody multimers, or antibody fragments or other variants thereof that include functional, antigen-binding regions of the antibody. We may use the term "immunoglobulin" synonymously with "antibody." The antibodies may be monoclonal or polyclonal in origin. Regardless of the source of the antibody, suitable antibodies include intact antibodies, for example, IgG tetramers having two heavy (H) chains and two light (L) chains, single chain antibodies, chimeric antibodies, humanized antibodies, complementary determining region (CDR)-grafted antibodies as well as antibody fragments, e.g., Fab, Fab', F(ab')2, scFv, Fv, and recombinant antibodies derived from such fragments, e.g., camelbodies, microantibodies, diabodies and bispecific antibodies.

An intact antibody is one that comprises an antigen-binding variable region ($V_H$ and $V_L$) as well as a light chain constant domain ($C_L$) and heavy chain constant domains, $C_{H1}$, $C_{H2}$ and $C_{H3}$. The constant domains may be native sequence constant domains (e.g. human native sequence constant domains) or amino acid sequence variants thereof As is well known in the art, the $V_H$ and $V_L$ regions are further subdivided into regions of hypervariability, termed "complementarity determining regions" (CDRs), interspersed with the more conserved framework regions (FRs).

An anti-BAG3 antibody can be from any class of immunoglobulin, for example, IgA, IgG, IgE, IgD, IgM (as well as subtypes thereof (e.g., IgG1, IgG2, IgG3, and IgG4)), and the light chains of the immunoglobulin may be of types kappa or lambda. The recognized human immunoglobulin genes include the kappa, lambda, alpha (IgA1 and IgA2), gamma (IgG1, IgG2, IgG3, IgG4), delta, epsilon, and mu constant region genes, as well as the many immunoglobulin variable region genes.

The term "antigen-binding portion" of an immunoglobulin or antibody refers generally to a portion of an immunoglobulin that specifically binds to a target, in this case, an epitope comprising amino acid residues on a BAG3 polypeptide. An antigen-binding portion of an immunoglobulin is therefore a molecule in which one or more immunoglobulin chains are not full length, but which specifically binds to a cellular target. Examples of antigen-binding portions or fragments include: (i) an Fab fragment, a monovalent fragment consisting of the VLC, VHC, CL and CH1 domains; (ii) a F(ab')2 fragment, a bivalent fragment comprising two Fab fragments linked by a disulfide bridge at the hinge region; (iii) a Fv fragment consisting of the VLC and VHC domains of a single arm of an antibody, and (v) an isolated CDR having sufficient framework to specifically bind, e.g., an antigen binding portion of a variable region. An antigen-binding portion of a light chain variable region and an antigen binding portion of a heavy chain variable region, e.g., the two domains of the Fv fragment, VLC and VHC, can be joined, using recombinant methods, by a synthetic linker that enables them to be made as a single protein chain in which the VLC and VHC regions pair to form monovalent molecules (known as single chain Fv (scFv). Such scFvs can be a target agent of the present invention and are encompassed by the term "antigen-binding portion" of an antibody.

An "Fv" fragment is the minimum antibody fragment that contains a complete antigen-recognition and binding site. This region consists of a dimer of one heavy chain and one light chain variable domain in tight, con-covalent association. It is in this configuration that three hypervariable regions of each variable domain interact to define an antigen-binding site on the surface of the $V_H$-$V_L$ dimer. While six hypervariable regions confer antigen-binding specificity, even a single variable domain (or half of an Fv comprising only three hypervariable regions specific for an antigen) has the ability to recognize and bind antigen, although at a lower affinity than the entire binding site. To improve stability, the $V_H$-$V_L$ domains may be connected by a flexible peptide linker such as $(Gly_4Ser)_3$ to form a single chain Fv or scFV antibody fragment or may be engineered to form a disulfide bond by introducing two cysteine residues in the framework regions to yield a disulfide stabilized Fv (dsFv). Fragments of antibodies are suitable for use in the methods provided so long as they retain the desired specificity of the full-length antibody and/or sufficient specificity to specifically bind to a BAG3 polypeptide.

The compositions of the present invention include antibodies that (1) exhibit a threshold level of binding activity; and/or (2) do not significantly cross-react with known related polypeptide molecules. The binding affinity of an antibody can be readily determined by one of ordinary skill in the art, for example, by Scatchard analysis (Scatchard, Ann. NY Acad, Sci. 51:660-672 (1949)).

In some embodiments, the anti-BAG3 antibodies can bind to their target epitopes or mimetic decoys at least 1.5-fold, 2-fold, 5-fold 10-fold, 100-fold, $10^3$-fold, $10^4$-fold, $10^5$-fold, $10^6$-fold or greater for the target anti-BAG3 than to other proteins predicted to have some homology to BAG3.

In some embodiments the anti-BAG3 antibodies bind with high affinity of $10^{-4}$M or less, $10^{-7}$M or less, $10^{-9}$M or less or with subnanomolar affinity (0.9, 0.8, 0.7, 0.6, 0.5, 0.4, 0.3, 0.2, 0.1 nM or even less). In some embodiments the binding affinity of the anti-BAG3 antibodies for their respective targets is at least $1\times10^6$ Ka. In some embodiments the binding affinity of the anti-BAG3 antibodies for BAG3 is at least $5\times10^6$ Ka, at least $1\times10^7$ Ka, at least $2\times10^7$ Ka, at least $1\times10^8$ Ka, or greater. Antibodies may also be described or specified in terms of their binding affinity to BAG3. In some embodiments binding affinities include those with a Kd less than $5\times10^{-2}$ M, $10^{-2}$ M, $5\times10^{-3}$ M, $10^{-3}$ M, $5\times10^{-3}$M, $10^{-4}$ M, $5\times10^{-5}$ M, $10^{-6}$ M, $5\times10^{-6}$ M, $10^{-6}$ M, $5\times10^{-7}$M, $10^{-7}$ M, $5\times10^{-8}$M, $10^{-8}$M, $5\times10^{-9}$ M, $5\times10^{-10}$ M, $10^{-10}$ M, $5\times10^{-11}$ M, $10^{-11}$M, $5\times10^{-12}$M, $10^{-12}$M, $5\times10^{-13}$ M, $10^{-13}$ M, $5\times10^{-14}$M, $10^{-14}$M, $5\times10^{-15}$M, or $10^{-15}$M, or less.

In some embodiments, the antibodies do not bind to known related polypeptide molecules; for example, they bind BAG3, but not known related polypeptides. In some embodiments, the antibodies specifically bind to a mutant BAG3 polypeptide, for example a BAG3 polypeptide having the ten base pair deletion, but not to a wild type BAG3 polypeptide. Antibodies may be screened against known related polypeptides to isolate an antibody population that specifically binds BAG3.

The diagnostic assays of the invention can include concurrent immunoelectrophoresis, radioimmunoassay (RIA), radioimmunoprecipitation, enzyme-linked immunosorbent assay (ELISA), dot blot or Western blot assay, inhibition or competition assay, and sandwich assay. The anti-BAG3 antibodies can include a tag, which may also be referred to as a reporter or marker (e.g., a detectable marker). A detectable marker can be any molecule that is covalently linked to the anti-BAG3 antibody or a biologically active fragment thereof that allows for qualitative and/or quantitative assessment of the expression or activity of the tagged peptide. The activity can include a biological activity, a physico-chemical activity, or a combination thereof. Both the form and position of the detectable marker can vary, as long as the labeled antibody retains biological activity. Many different markers can be used, and the choice of a particular marker will depend upon the desired application. Labeled anti-BAG3 antibodies can be used, for example, for assessing the levels of BAG3 or a mutant BAG3 in a biological sample, e.g., urine, saliva, cerebrospinal fluid, blood or a biopsy sample or for evaluation the clinical response to a cardiovascular therapeutic, for example, the BAG3 constructs described above.

Exemplary detectable labels which can be conjugated to an agent, include, a radiopaque or contrast agents such as barium, diatrizoate, ethiodized oil, gallium citrate, iocarmic acid, iocetamic acid, iodamide, iodipamide, iodoxamic acid, iogulamide, iohexol, iopamidol, iopanoic acid, ioprocemic acid, iosefamic acid, ioseric acid, iosulamide meglumine, iosemetic acid, iotasul, iotetric acid, iothalamic acid, iotroxic acid, ioxaglic acid, ioxotrizoic acid, ipodate, meglumine, metrizamide, metrizoate, propyliodone, and thallous chloride. Alternatively or in addition, the detectable label can be a fluorescent label, for example, fluorescein isothiocyanate, rhodamine, phycoerytherin, phycocyanin, allophycocyanin, o-phthaldehyde and fluorescamine; a chemiluminescent compound selected from the group consisting of luminol, isoluminol, an aromatic acridinium ester, an imidazole, an acridinium salt and an oxalate ester; a liposome or dextran; or a bioluminescent compound such as luciferin, luciferase and aequorin.

Suitable markers include, for example, enzymes, photoaffinity ligands, radioisotopes, and fluorescent or chemiluminescent compounds. Methods of introducing detectable markers into peptides are well known in the art. Markers can be added during synthesis or post-synthetically. Recombinant anti-BAG3 antibodies or biologically active variants thereof can also be labeled by the addition of labeled precursors (e.g., radiolabeled amino acids) to the culture medium in which the transformed cells are grown. In some embodiments, analogues or variants of peptides can be used in order to facilitate incorporation of detectable markers. For example, any N-terminal phenylalanine residue can be replaced with a closely related aromatic amino acid, such as tyrosine, that can be easily labeled with 125I. In some embodiments, additional functional groups that support effective labeling can be added to the fragments of an anti-BAG3 antibody or biologically active variant thereof. For example, a 3-tributyltinbenzoyl group can be added to the N-terminus of the native structure; subsequent displacement of the tributyltin group with $^{125}$I will generate a radiolabeled iodobenzoyl group.

Any art-known method can be used for detecting such labels, for example, positron-emission tomography (PET), SPECT imaging, magnetic resonance imaging, X-ray; or is detectable by ultrasound.

Diagnostics, Therapeutics, Kits

The compositions herein and compounds of the present invention can be utilized for diagnostics, therapeutics, and prophylaxis, and as research reagents and components of kits.

The compositions disclosed herein are generally and variously useful for treatment of a subject having a cardiac disease or disorder, for example, heart failure or dilated cardiomyopathy. The terms "subject", "patient" or "individual" are referred to interchangeably. A subject is effectively treated whenever a clinically beneficial result ensues. This may mean, for example, a complete resolution of the symptoms of a disease, a decrease in the severity of the symptoms of the disease, or a slowing of the disease's progression. These methods can further include identifying in a biological sample, BAG3 variants which are predictive of whether an increase in BAG3 levels is therapeutic for the subject, and, administering to the patient identified as having such a variant, a therapeutically effective amount of an agent.

In certain embodiments, a kit comprises one or more probes conjugated to a detectable label for identifying BCL2-associated athanogene 3 (BAG3) variants in a biological sample. Detection of certain variants are predictive of whether a subject will benefit from a treatment.

Cardiovascular disorders amenable to the therapeutic, and/or prognostic methods of the invention can be disorders that are responsive to the modulation of BAG3 or in treating those subjects which may not be responsive to BAG3 modulating agents. The compositions of the present invention are not limited to those that work by affecting any particular cellular mechanism. Any form of cardiovascular disorder which is associated with misregulation of BAG3 is within the scope of the invention.

The methods of the invention can be expressed in terms of the preparation of a medicament. Accordingly, the invention encompasses the use of the agents and compositions described herein in the preparation of a medicament. The compounds described herein are useful in therapeutic compositions and regimens or for the manufacture of a medicament for use in treatment of diseases or conditions as described herein (e.g., a cardiovascular disorder disclosed herein).

Any composition described herein can be administered to any part of the host's body for subsequent delivery to a target cell. A composition can be delivered to, without limitation, the brain, the cerebrospinal fluid, joints, nasal mucosa, blood, lungs, intestines, muscle tissues, skin, or the peritoneal cavity of a mammal. In terms of routes of delivery, a composition can be administered by intravenous, intracranial, intraperitoneal, intramuscular, subcutaneous, intramuscular, intrarectal, intravaginal, intrathecal, intratracheal, intradermal, or transdermal injection, by oral or nasal administration, or by gradual perfusion over time. In a further example, an aerosol preparation of a composition can be given to a host by inhalation.

The dosage required will depend on the route of administration, the nature of the formulation, the nature of the patient's illness, the patient's size, weight, surface area, age, and sex, other drugs being administered, and the judgment of the attending clinicians. Suitable dosages are in the range of 0.01-1,000 mg/kg. Wide variations in the needed dosage are to be expected in view of the variety of cellular targets and the differing efficiencies of various routes of administration. Variations in these dosage levels can be adjusted using standard empirical routines for optimization, as is well understood in the art. Administrations can be single or multiple (e.g., 2- or 3-, 4-, 6-, 8-, 10-, 20-, 50-, 100-, 150-, or more fold). Encapsulation of the compounds in a suitable delivery vehicle (e.g., polymeric microparticles or implantable devices) may increase the efficiency of delivery.

The duration of treatment with any composition provided herein can be any length of time from as short as one day to as long as the life span of the host (e.g., many years). For example, a compound can be administered once a week (for, for example, 4 weeks to many months or years); once a month (for, for example, three to twelve months or for many years); or once a year for a period of 5 years, ten years, or longer. It is also noted that the frequency of treatment can be variable. For example, the present compounds can be administered once (or twice, three times, etc.) daily, weekly, monthly, or yearly.

An effective amount of any composition provided herein can be administered to an individual in need of treatment. The term "effective" as used herein refers to any amount that induces a desired response while not inducing significant toxicity in the patient. Such an amount can be determined by assessing a patient's response after administration of a known amount of a particular composition. In addition, the level of toxicity, if any, can be determined by assessing a patient's clinical symptoms before and after administering a known amount of a particular composition. It is noted that the effective amount of a particular composition administered to a patient can be adjusted according to a desired outcome as well as the patient's response and level of toxicity. Significant toxicity can vary for each particular patient and depends on multiple factors including, without limitation, the patient's disease state, age, and tolerance to side effects.

Any method known to those in the art can be used to determine if a particular response is induced. Clinical methods that can assess the degree of a particular disease state can be used to determine if a response is induced. The particular methods used to evaluate a response will depend upon the nature of the patient's disorder, the patient's age, and sex, other drugs being administered, and the judgment of the attending clinician.

Concurrent administration of two or more therapeutic agents does not require that the agents be administered at the same time or by the same route, as long as there is an overlap in the time period during which the agents are exerting their therapeutic effect. Simultaneous or sequential administration is contemplated, as is administration on different days or weeks. The compositions may also be administered with another standard therapeutic agent for treatment of cardiovascular disease. Examples of such diseases or disorders associated comprise: cardiac diseases or disorders, skeletal muscle diseases or disorders, multiple sclerosis, senile plaques, cerebral amyloid angiopathy, atherosclerosis, glioblastoma, amyloid deposition, neurodegenerative diseases, neurofibrillary tangles, dementia, choriocarcinoma, astrocytoma, amyloidosis, hyperlipidemia, neurodegeneration, neoplastic transformation, prostate cancer, atherosclerotic plaque, obstruction, AIDS, metastasis, myocardial infarction, pulmonary fibrosis, necrosis, shock, melanoma, colorectal carcinoma, genetic susceptibility, psoriasis, cancer, inflammation, glioma, carcinoma, breast cancer, neuropathology, tumors, prostate carcinoma, vascular diseases, cell damage, brain tumors, Non-small cell lung carcinomas (NSCLCs), hypercholesterolemia. Examples of skeletal muscles diseases include, primary (genetic) diseases of muscle (e.g., muscular dystrophies and congenital myopathies, metabolic myopathies); acquired diseases (e.g. myositis, toxic myopathy); secondary diseases of muscle (e.g. neurogenic atrophy, atrophy from chronic pulmonary, heart, kidney disease, HIV/AIDs, cancer, sarcopenia and the like.

Kits: The present invention further provides systems and kits (e.g., commercial therapeutic, diagnostic, or research products, reaction mixtures, etc.) that contain one or more or all components sufficient, necessary, or useful to practice any of the methods described herein. These systems and kits may include buffers, detection/imaging components, positive/negative control reagents, instructions, software, hardware, packaging, or other desired components.

The kits provide useful tools for screening test compounds capable of modulating the effects of a compound on a target molecule. The kits can be packaged in any suitable manner to aid research, clinical, and testing labs, typically with the various parts, in a suitable container along with instructions for use.

In certain embodiments, the kits may further comprise lipids and/or solvents. In certain embodiments, the kits may further comprise buffers and reagents needed for the procedure, and instructions for carrying out the assay. In certain embodiments, the kits may further comprise, where necessary, agents for reducing the background interference in a test, positive and negative control reagents, apparatus for conducting a test, and the like.

Also provided are kits for determining whether a subject has a mutation in a BAG3 polypeptide, to diagnose patients having cardiovascular disease or a predisposition to developing cardiovascular disease. The kits can also be utilized to monitor the efficiency of agents used for treatment of cardiovascular disease.

Administration of Compositions

The agents identified by the methods embodied herein can be formulated and compositions of the present invention may be administered in conjunction with one or more additional active ingredients, pharmaceutical compositions, or other compounds. The therapeutic agents of the present invention may be administered to an animal, such as a mammal, including a human.

In other embodiments, a pharmaceutical composition comprises at least one or more agents and/or candidate therapeutic agents embodied herein.

The pharmaceutical formulations may be for administration by oral (solid or liquid), parenteral (intramuscular, intraperitoneal, intravenous (IV) or subcutaneous injection), intracardial, transdermal (either passively or using ionophoresis or electroporation), transmucosal and systemic (nasal, vaginal, rectal, or sublingual), or inhalation routes of administration, or using bioerodible inserts and can be formulated in dosage forms appropriate for each route of administration.

The agents may be formulated in pharmaceutically acceptable carriers or diluents such as physiological saline or a buffered salt solution. Suitable carriers and diluents can be selected on the basis of mode and route of administration and standard pharmaceutical practice. A description of exemplary pharmaceutically acceptable carriers and diluents, as well as pharmaceutical formulations, can be found in Remington's Pharmaceutical Sciences, a standard text in this field, and in USP/NF. Other substances may be added to the compositions to stabilize and/or preserve the compositions.

The compositions of the invention may be administered to animals by any conventional technique. The compositions may be administered directly to a target site by, for example, surgical delivery to an internal or external target site, or by catheter to a site accessible by a blood vessel. Other methods of delivery, e.g., liposomal delivery or diffusion from a device impregnated with the composition, are known in the art. The compositions may be administered in a single bolus, multiple injections, or by continuous infusion (e.g., intravenously). For parenteral administration, the compositions are for example formulated in a sterilized pyrogen-free form.

The compounds identified by this invention may also be administered orally to the patient, in a manner such that the concentration of drug is sufficient to inhibit bone resorption or to achieve any other therapeutic indication as disclosed herein. Typically, a pharmaceutical composition containing the compound is administered at an oral dose of between about 0.1 to about 50 mg/kg in a manner consistent with the condition of the patient. An exemplary oral dose would be about 0.5 to about 20 mg/kg.

An intravenous infusion of the compound in 5% dextrose in water or normal saline, or a similar formulation with suitable excipients, is most effective, although an intramuscular bolus injection is also useful. Typically, the parenteral dose will be about 0.01 to about 100 mg/kg; such as between 0.1 and 20 mg/kg, in a manner to maintain the concentration of drug in the plasma at a concentration effective to increase BAG3 expression. The compounds may be administered one to four times daily at a level to achieve a total daily dose of about 0.4 to about 400 mg/kg/day. The precise amount of an inventive compound which is therapeutically effective, and the route by which such compound is best administered, is readily determined by one of ordinary skill in the art by comparing the blood level of the agent to the concentration required to have a therapeutic effect. Prodrugs of compounds of the present invention may be prepared by any suitable method.

No unacceptable toxicological effects are expected when compounds, derivatives, salts, compositions etc., of the present invention are administered in accordance with the present invention. The compounds of this invention, which may have good bioavailability, may be tested in one of several biological assays to determine the concentration of a compound which is required to have a given pharmacological effect.

In another embodiment, there is provided a pharmaceutical or veterinary composition comprising one or more identified compounds and a pharmaceutically or veterinarily acceptable carrier. Other active materials may also be present, as may be considered appropriate or advisable for the disease or condition being treated or prevented.

The carrier, or, if more than one be present, each of the carriers, must be acceptable in the sense of being compatible with the other ingredients of the formulation and not deleterious to the recipient.

The compounds identified by the methods herein would be suitable for use in a variety of drug delivery systems described above. Additionally, in order to enhance the in vivo serum half-life of the administered compound, the compounds may be encapsulated, introduced into the lumen of liposomes, prepared as a colloid, or other conventional techniques may be employed which provide an extended serum half-life of the compounds. A variety of methods are available for preparing liposomes, as described in, e.g., Szoka, et al., U.S. Pat. Nos. 4,235,871, 4,501,728 and 4,837,028 each of which is incorporated herein by reference. Furthermore, one may administer the drug in a targeted drug delivery system, for example, in a liposome coated with a tissue-specific antibody. The liposomes will be targeted to and taken up selectively by the organ.

The formulations include those suitable for rectal, nasal, topical (including buccal and sublingual), vaginal or parenteral (including subcutaneous, intramuscular, intravenous and intradermal) administration, or the formulation is an orally administered formulation. The formulations may conveniently be presented in unit dosage form, e.g. tablets and sustained release capsules, and may be prepared by any methods well known in the art of pharmacy.

Such methods include the step of bringing into association the above defined active agent with the carrier. In general, the formulations are prepared by uniformly and intimately bringing into association the active agent with liquid carriers or finely divided solid carriers or both, and then if necessary shaping the product.

The compound identified using these methods can be formulated according to known methods to prepare pharmaceutically useful compositions, whereby the compound is combined in admixture with a pharmaceutically acceptable carrier vehicle. Therapeutic formulations are prepared for storage by mixing the active ingredient having the desired degree of purity with optional physiologically acceptable carriers, excipients or stabilizers (Remington's Pharmaceutical Sciences 16th edition, Osol, A. Ed. (1980)), in the form of lyophilized formulations or aqueous solutions. Acceptable carriers, excipients or stabilizers are nontoxic to recipients at the dosages and concentrations employed, and include buffers such as phosphate, citrate and other organic acids; antioxidants including ascorbic acid; low molecular weight (less than about 10 residues) polypeptides; proteins, such as serum albumin, gelatin or immunoglobulins; hydrophilic polymers such as polyvinylpyrrolidone, amino acids such as glycine, glutamine, asparagine, arginine or lysine; monosaccharides, disaccharides and other carbohydrates including glucose, mannose, or dextrins; chelating agents such as EDTA; sugar alcohols such as mannitol or sorbitol; salt-forming counterions such as sodium; and/or nonionic surfactants such as TWEEN™. (ICI Americas Inc., Bridgewater, N.J.), PLURONICS™. (BASF Corporation, Mount Olive, N.J.) or PEG.

The formulations to be used for in vivo administration must be sterile and pyrogen free. This is readily accomplished by filtration through sterile filtration membranes, prior to or following lyophilization and reconstitution.

Dosages and desired drug concentrations of pharmaceutical compositions of the present invention may vary depending on the particular use envisioned. The determination of the appropriate dosage or route of administration is well within the skill of an ordinary physician. Animal experiments provide reliable guidance for the determination of effective doses for human therapy. Interspecies scaling of effective doses can be performed following the principles laid down by Mordenti, J. and Chappell, W. "The use of interspecies scaling in toxicokinetics" In Toxicokinetics and New Drug Development, Yacobi et al., Eds., Pergamon Press, New York 1989, pp. 42-96.

Formulations for oral administration in the present invention may be presented as: discrete units such as capsules, cachets or tablets each containing a predetermined amount of the active agent; as a powder or granules; as a solution or a suspension of the active agent in an aqueous liquid or a non-aqueous liquid; or as an oil-in-water liquid emulsion or a water in oil liquid emulsion; or as a bolus etc.

For compositions for oral administration (e.g. tablets and capsules), the term "acceptable carrier" includes vehicles such as common excipients e.g. binding agents, for example syrup, acacia, gelatin, sorbitol, tragacanth, polyvinylpyrrolidone (Povidone), methylcellulose, ethylcellulose, sodium carboxymethylcellulose, hydroxypropylmethylcellulose, sucrose and starch; fillers and carriers, for example corn starch, gelatin, lactose, sucrose, microcrystalline cellulose, kaolin, mannitol, dicalcium phosphate, sodium chloride and alginic acid; and lubricants such as magnesium stearate, sodium stearate and other metallic stearates, glycerol stearate stearic acid, silicone fluid, talc waxes, oils and colloidal silica. Flavoring agents such as peppermint, oil of wintergreen, cherry flavoring and the like can also be used. It may be desirable to add a coloring agent to make the dosage form readily identifiable. Tablets may also be coated by methods well known in the art.

A tablet may be made by compression or molding, optionally with one or more accessory ingredients. Compressed tablets may be prepared by compressing in a suitable machine the active agent in a free flowing form such as a powder or granules, optionally mixed with a binder, lubricant, inert diluent, preservative, surface-active or dispersing agent. Molded tablets may be made by molding in a suitable machine a mixture of the powdered compound moistened with an inert liquid diluent. The tablets may be optionally be coated or scored and may be formulated so as to provide slow or controlled release of the active agent.

Other formulations suitable for oral administration include lozenges comprising the active agent in a flavored base, usually sucrose and acacia or tragacanth; pastilles comprising the active agent in an inert base such as gelatin and glycerin, or sucrose and acacia; and mouthwashes comprising the active agent in a suitable liquid carrier.

Parenteral formulations will generally be sterile.

Dose: An effective dose of a composition of the presently disclosed subject matter is administered to a subject in need thereof. A "therapeutically effective amount" or a "therapeutic amount" is an amount of a therapeutic composition sufficient to produce a measurable response (e.g., a biologically or clinically relevant response in a subject being treated). The response can be measured in many ways, as discussed above, e.g. cytokine profiles, cell types, cell surface molecules, etc. Actual dosage levels of active ingredients in the compositions of the presently disclosed subject matter can be varied so as to administer an amount of the active compound(s) that is effective to achieve the desired therapeutic response for a particular subject. The selected dosage level will depend upon the activity of the therapeutic composition, the route of administration, combination with other drugs or treatments, the severity of the condition being treated, and the condition and prior medical history of the subject being treated. However, it is within the skill of the art to start doses of the compound at levels lower than required to achieve the desired therapeutic effect and to gradually increase the dosage until the desired effect is achieved. The potency of a composition can vary, and therefore a "treatment effective amount" can vary. However, using the assay methods described herein, one skilled in the art can readily assess the potency and efficacy of a candidate compound of the presently disclosed subject matter and adjust the therapeutic regimen accordingly.

The invention has been described in detail with reference to certain embodiments thereof. However, it will be appreciated that those skilled in the art, upon consideration of this disclosure, may make modifications and improvements within the spirit and scope of the invention.

All documents mentioned herein are incorporated herein by reference. All publications and patent documents cited in this application are incorporated by reference for all purposes to the same extent as if each individual publication or patent document were so individually denoted. By their citation of various references in this document, Applicants do not admit any particular reference is "prior art" to their invention.

EXAMPLES

Example 1: Variants in BAG3 Predict a Worse Outcome in African Americans with Cardiomyopathy To investigate the association between BAG3 genetic variants and DCM in subjects of African ancestry, BAG3 was sequenced from DNA obtained from subjects who were enrolled in one of three clinical trials. The results demonstrated for the first time that a group of functional BAG3 variants found with rare exception in individuals of African ancestry are associated with poor outcomes in patients with IDC and may provide a precise target for therapeutic intervention.

Methods

Patients: Genomic DNA was obtained from 509 African Americans with DCM enrolled in three U.S. clinical trials and whose DNA was banked: 342 patients from the Genetic Risk Assessment of African Americans with Heart Failure (GRAHF) trial, (cohort A);[22-25] 109 patients from the Intervention in Myocarditis and Acute Cardiomyopathy Trial-2 (IMAC-2; cohort B);[26] and 58 patients from the Genetic Risk Assessment of Cardiac Events (GRACE) study (cohort C).[27,28] DNA was also acquired from the left ventricular (LV) myocardium of subjects of African ancestry who underwent heart transplantation at the University of Colorado (cohort D) or at the University of Pittsburgh (cohort E). Non-failing human heart tissue that could not be used for transplant served as non-failing controls.[29] Informed consent was obtained from all patients who contributed DNA or tissue to the aforementioned study repositories and the protocols were approved by the IRB at each of the participating institutions.

Three reference populations were used. First, DNA was sequenced from individuals of African ancestry with ischemic cardiomyopathy who were enrolled in the studies that populated cohorts A-C. Second, BAG3 sequence data was obtained from a cohort of individuals of European ancestry with both familial and sporadic DCM collected at the Brigham and Women's Hospital, Boston from individuals of European ancestry collected from HF clinics throughout the U.S.[30] Third, population genetic data were taken from gnomAD (accessible online) comprising data from 123,136 exome sequences and 15,496 whole-genome sequences from unrelated individuals. Of these, 7,509 whole genomes and 55,860 exomes are from individuals of Non-Finnish European ancestry and 4,368 whole genomes and 7,652 exomes sequences are from individuals of African ancestry.[21]

DNA Sequencing and Analyses: DNA from the GRAHF trial was sequenced in the Genetics Resources Core Facility, the McKusick-Nathans Institute of Genetic Medicine, at The Johns Hopkins University School of Medicine. In brief, genomic DNA from each GRAHF cohort patient was PCR amplified and then sequenced using the fluorescent dideoxy terminator method of cycle sequencing. Sequence data was analyzed using Sequencher Software, version 5.4.6 (Gene Codes, Ann Arbor, MI). SNVs were identified using the software's "Call Secondary Peaks" function and all data was manually inspected.

Targeted genotyping was performed to confirm the results of the GRAHF cohort and identify SNVs in each of the subsequent cohorts using real-time PCR and SNP-specific reagents. SNVs were chosen for confirmatory genotyping and functional analysis if they: 1) had an allele frequency of >0.005 in GRAHF; 2) were non-synonymous; and 3) were more common in subjects of African ancestry than in those of European ancestry. To determine whether two BAG3 SNVs in the same sample were arranged in cis, the BAG3 locus was amplified, cloned into a plasmid and subjected to Sanger sequencing.

Western Blot Analysis of Human Heart Tissue: Western blot analysis was performed as described previously.[31] In brief, frozen tissue was homogenized in buffer, centrifuged and the resulting pellets were re-suspended in buffer. After measuring the protein concentration using the method of Bradford, protein was fractionated by SDS-polyacrylamide gel electrophoresis and transferred onto nitrocellulose membrane. Membranes were then incubated with antibody and imaged. Signal intensity was normalized to GAPDH. qPCR was used to quantify the mRNA specific for each of the BAG3 variants.

Measurement of Autophagy Flux and Apoptosis: The methods are described in detail previously.[18,32] In brief, wild type BAG3 was inserted into a plasmid under a CMV promoter and each of the SNVs of interest were then generated. The p.160Aladup variant was synthesized by GenScript (Piscataway Township, NJ). Transformed human ventricular cells (AC16)[33] were cultured at 37° C. with 5% $CO_2$ in Dulbecco's modified eagle medium with 5% FBS until 60-70% confluent. The cells were then transfected with plasmids containing c.null, c.BAG3, c.187C>G+c.1138C>T (p.P63Ala+P380S), c.249C>A, (p.H83Q) c.474_476dupGGC, (p.A160dup) or c.1436C>T (p.A479V) and co-transfected with the autophagy reporter construct adenovirus-red fluorescent protein-green fluorescent protein-LC3 (Adv-RFP-GFP-LC3). Each transfection was carried out for 36 hours after which cells were subjected to 4 hours of hypoxia (5% $CO_2$/1% $N_2O_2$) followed by 2 hours of re-oxygenation or normoxia (5% $CO_2$:21% $O_2$). The cells were imaged with confocal microscopy and the number of LC3 puncta were counted as we previously described.[34] Expression levels of each plasmid were assessed by western blot and were equivalent.

In a second group of experiments, cells were transfected in the same manner for 36 hours, exposed to hypoxia for 12 hours and then to 2 hours of re-oxygenation. The cells were stained with Annexin-V and propidium iodide for 30 minutes and imaged with confocal microscopy. Annexin-V positive cells (apoptosis) appear green whereas propidium iodide positive cells (late apoptosis and necrosis) appear red. At least 20 cells per field and 10 fields per condition were counted. The investigator was blinded to the experimental group.

Statistical Analysis: Statistical analyses were conducted based on stratification/partitioning by BAG3 SNV (SNV versus no SNV), ischemia (ischemic versus non-ischemic), and the concomitant interaction. Continuous variables were assessed using the Student's t-test or ANOVA, as appropriate, and categorical variables were assessed using Chi-square or Fisher's Exact tests. For the time-to-event analyses, an event was defined as death, transplant, or HF-related hospitalization. Survival was assessed using Kaplan-Meier method; the resulting curves were assessed using the log-rank test. Hazard ratios were estimated using Cox proportional-hazards models. All statistical analyses were conducted using SAS® 9.4 (SAS Institute). Statistical significance was defined as p<0.05. All reported p-values are two-sided where applicable and have not been adjusted for multiple comparisons unless otherwise noted.

Results

Study Subjects: Genomic DNA from a total of 509 African Americans with DCM was accrued from three independent studies: 342 patients from GRAHF (cohort A);[23,24] 109 patients from GRACE (cohort B);[27,28] and 58 patients from IMAC-2 (cohort C). 26 Patients were excluded from analysis if they had acute myocarditis, peri-partum cardiomyopathy or any potentially reversible cause for DCM.[26] Patients in GRAHF and IMAC-2 were followed to an endpoint of freedom from death or HF hospitalization. Subjects in GRACE were followed to the endpoint of heart transplantation or death.

BAG3 Genetic Variants:

Sanger sequencing of the GRAHF cohort revealed 18 variants (Table 1), eight of which were synonymous. Four SNVs met the criteria for inclusion in this study: p.Pro63Ala (10:121429369 C/G; rs133031999); p.His83Gln (10: 151331972; rs151331972); Pro380Ser (W:121436204 C/T; rs144692954); and Ala479Val (10:121436502 C/T, rs34656239). A 3 nucleotide in-frame insertion that added an alanine to the protein at position 160 (p.Ala160dup; 10:121429647 A/AGCG), was also identified The Sanger results were confirmed by targeted sequencing. Every individual who harbored the p.Pro63Ala variant also carried the p.Pro380Ser variant and the corresponding allele frequencies for these two SNVs in gnomAD were almost identical providing evidence that the two SNVs were linked in cis. This was confirmed by Sanger sequencing. The characteristics of HF patients of African ancestry with and without the 4 identified BAG3 variants are shown in Table 1. The linked SNVs are designated as p.Pro63Ala+Pro380Ser. As seen in FIG. 1, the residues (His83, Ala160, Pro380 and Ala479) affected in the BAG3 variants are highly conserved across mammals.

The prevalence of the four BAG3 variants in the 402 patients with IDC in cohorts A, B, and C (42 of 402 subjects; 10.45%) was greater than the prevalence of the four variants in patients with ischemic HF (9 of 107 subjects; 8.41%) when adjusted for multiple alleles; however, the difference was not statistically significant. (Table 2) Similarly, the proportion of patients in cohorts A, B and C with IDC and one of the four BAG3 variants was not significantly different than the proportion of subjects with a BAG3 variant in the sum of the corresponding gnomAD dataset for each variant (9.06%). By contrast, the proportion of subjects in the three cohorts who harbored a BAG3 variant (10.02%) was significantly (p<0.0001) higher than the prevalence of the four BAG3 variants among over 60,000 subjects of European ancestry in the gnomAD European data set (0.020%; p<0.0001) and was significantly greater than in a reference population of 359 individuals with European ancestry and IDC that had no BAG3 variants. (Boston cohort; 0.000% BAG3 variants; p<0.0001).

Figure 2A:
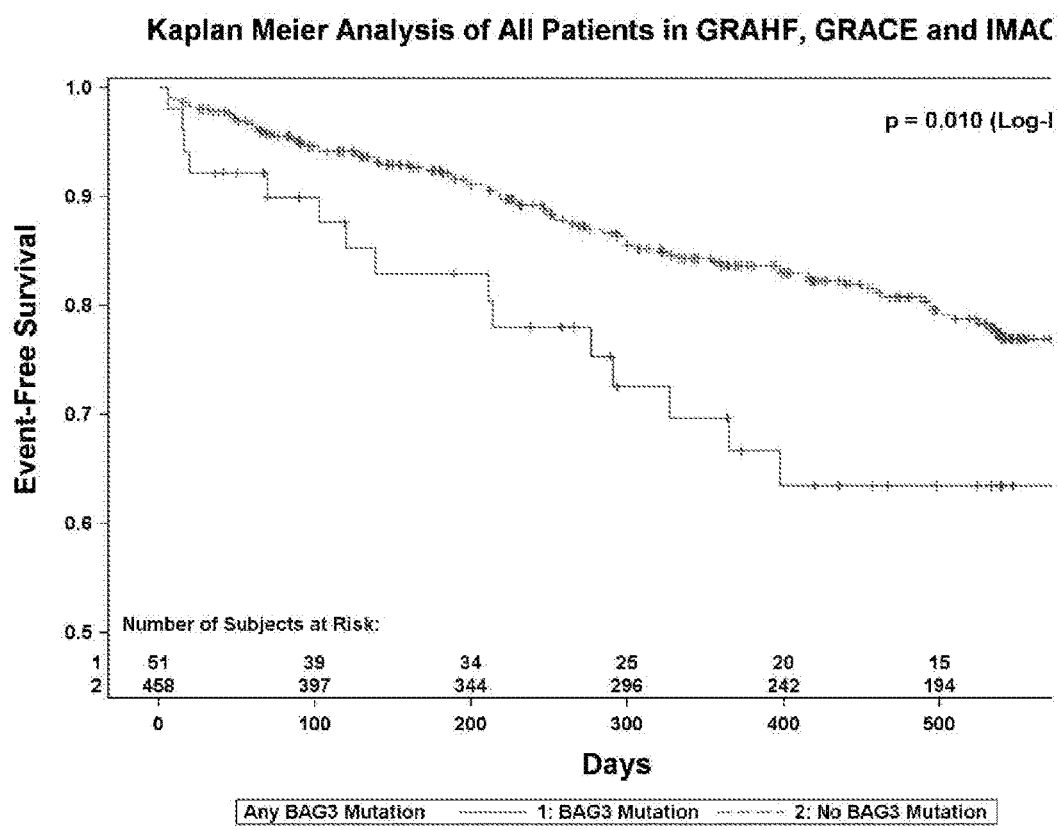
FIGS. 2A-2C are Kaplan-Meier curves showing event-free survival in patients with or without a BAG3 genetic variant.
Figure 2B:
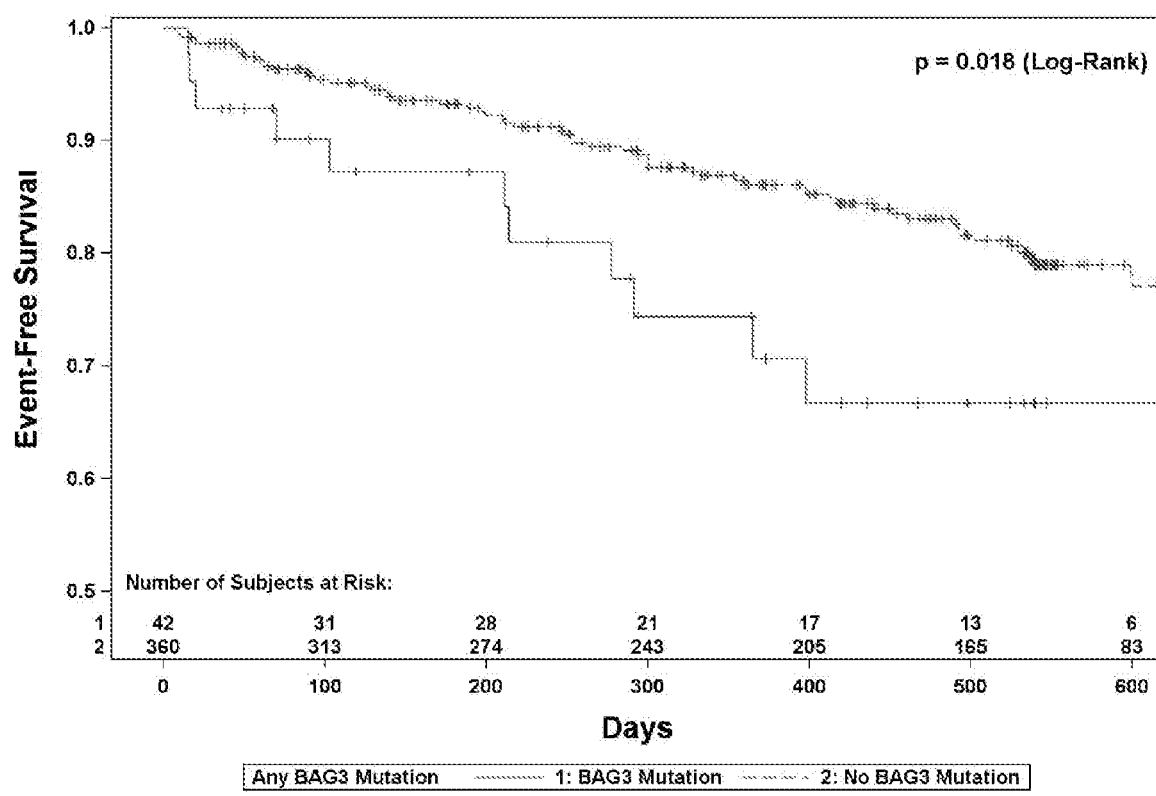
Figure 2C:
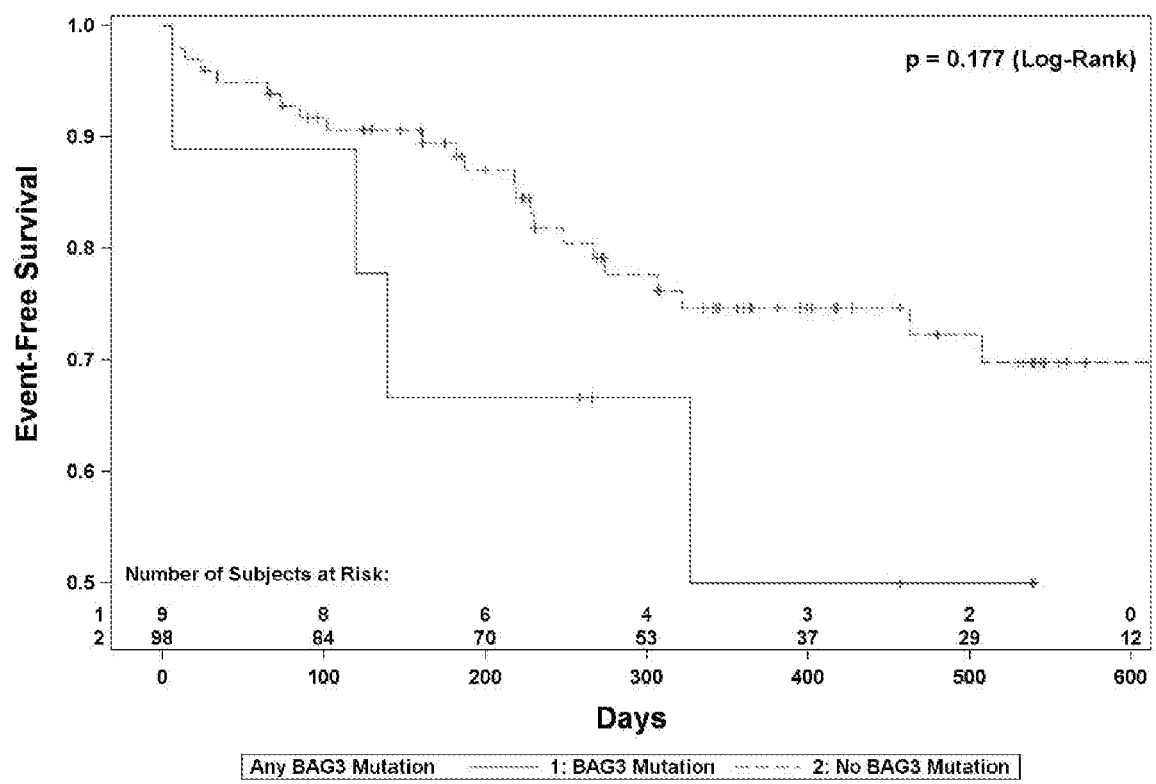

Effects of BAG3 Variants on Heart Failure Outcomes: It was next sought to determine whether the presence of any one of the four BAG3 variants was associated with a worse outcome as reflected by the combined outcome variable of a heart failure hospitalization, heart transplantation or death. As seen in FIG. 2A, when compared with HF subjects with both ischemic and non-ischemic disease who did not carry one of the four BAG3 variants, subjects having a BAG3 variant had a significantly (p=0.010) higher incidence of an adverse event. Similarly, individuals with non-ischemic HF who carried a BAG3 variant had a worse outcome when compared with non-ischemic patients who did not have a BAG3 variant. (FIG. 2B; p=0.018) In subjects with ischemic HF and a BAG3 SNV, there was a trend towards a worse outcome; however, the difference was not statistically significant. (FIG. 2C, p=0.177) Using the Cox proportional hazard analysis, we determined that the risk of a carrier of one of the four BAG3 variants having an adverse event was 1.906 times higher than for an individual with HF who did not have a BAG3 variant (95% CL: 1.157-3.141, p=0.011).

Figure 3A:
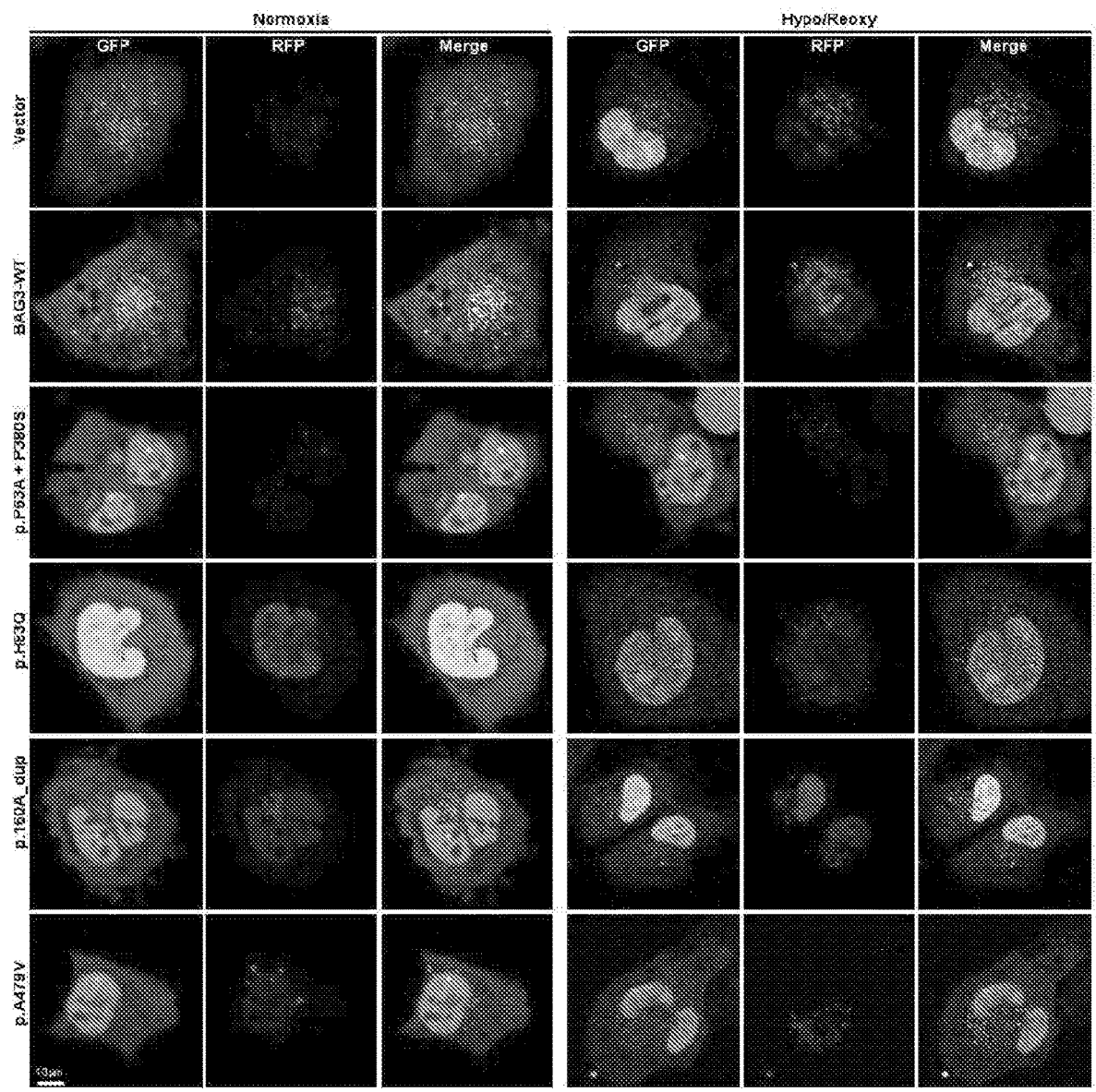
FIG. 3A shows representative confocal images from AC16 cells that were transfected with an empty plasmid or a plasmid containing wild-type BAG3 or c.187C>G+ c.1138C>T (p.Pro63Ala+p.Pro380Ser), c.249C>A (p.His83Gln), c.474_476dupGGC (p.Ala160dup), or c.1436C>T (p.Ala479Val) and co-transfected with Adv-RFP-GFP-LC3. The red puncta represent increased LC3 in autophagolysosomes in which the GFP has been quenched by the increased acidity after lysosomal-autophagasome fusion.
Figure 3B:
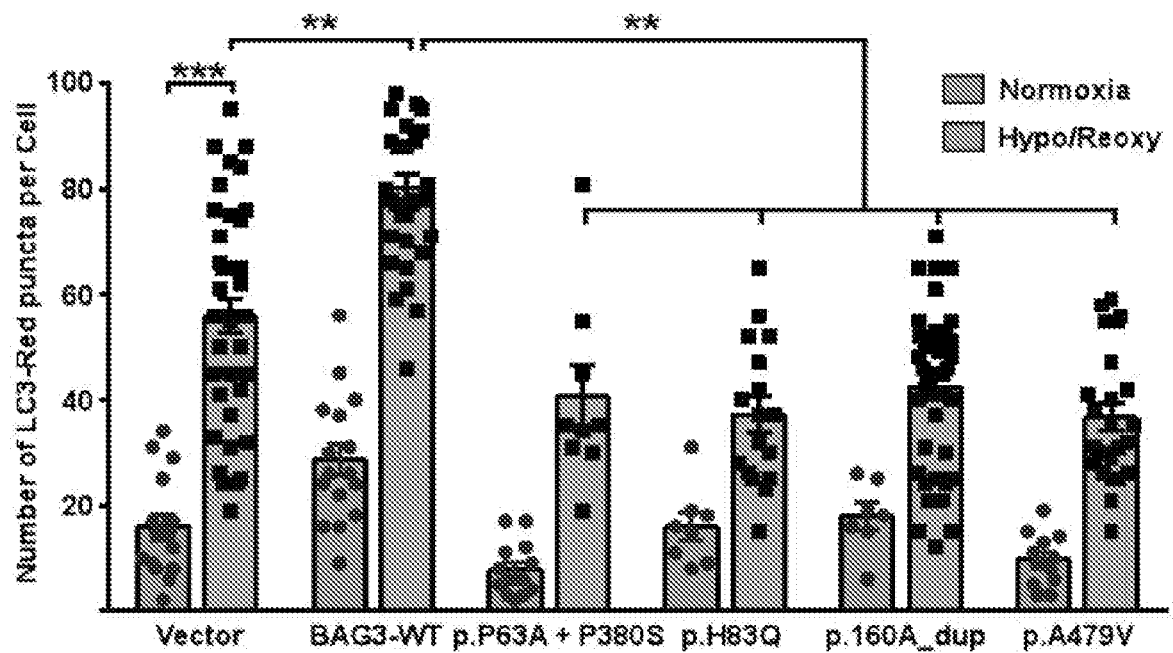
FIG. 3B is the quantification of images from between 8 and 42 cells per condition.
Figure 3C:
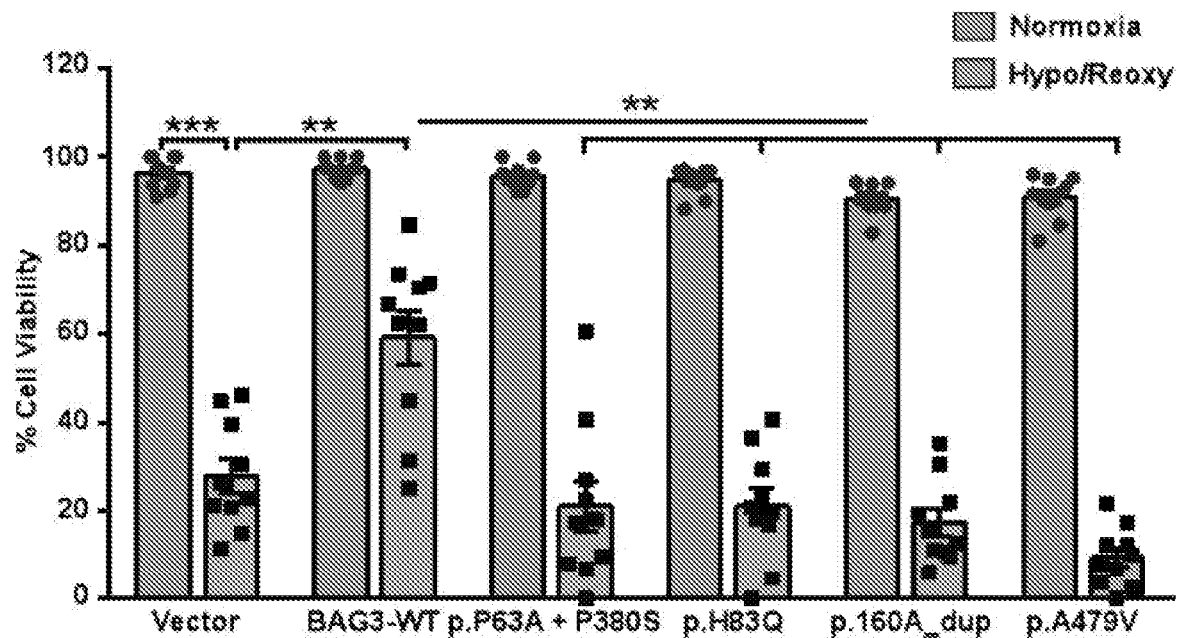
FIG. 3C is a representative confocal image of AC16 cells that were stained with Annexin-V (green) and propidium iodide (red) in order to distinguish viable cells from apoptotic cells. Apoptotic cells appear green, late apoptotic and/or necrotic cells appear red, and non-viable cells appear both green and red.
Figure 3C:
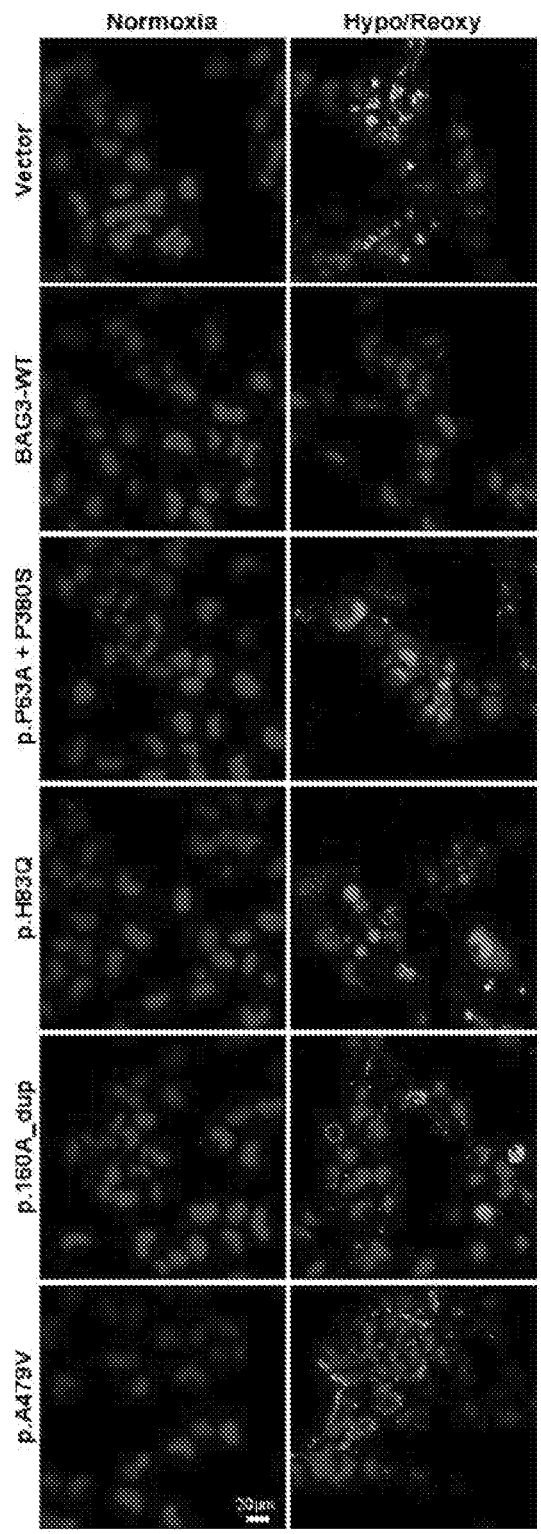

Pathogenicity of BAG3 Variants: The effects of BAG3 variants on the two primary actions of BAG3 in the cell: autophagy and apoptosis, was assessed. As seen in FIG. 3A, AC16 cells were transfected with either an empty plasmid, or with a plasma containing wild-type BAG3, c.187C>G+ c.1138C>T (p.Pro63Ala+p.Pro380Ser), c.249C>A (p.His83Gln), c.474_476dupGGC (p.Ala160dup), or c.1436C>T (p.Ala479Val) and co-transfected with Adv-RFP-GFP-LC3. When the cells were stressed with hypoxia-reoxygenation, there was a significant increase in LC3 in cells that had been transfected with either the empty plasmid or with wild-type BAG3; however, the autophagy response to hypoxia-reoxygenation was significantly diminished in AC16 cells over-expressing each of the four BAG3 variants as there was no significant increase in LC3. (FIGS. 3A and 3B) In addition, after hypoxia-reoxygenation, cells transfected with BAG3 variants showed significantly more Annexin-V positive cells than did cells transfected with a plasmid expressing wild-type BAG3. (FIGS. 3C and 3D) Thus, by contrast with wild-type BAG3, the BAG3 variants were unable to impede hypoxia-induced apoptosis.

Figure 4A:
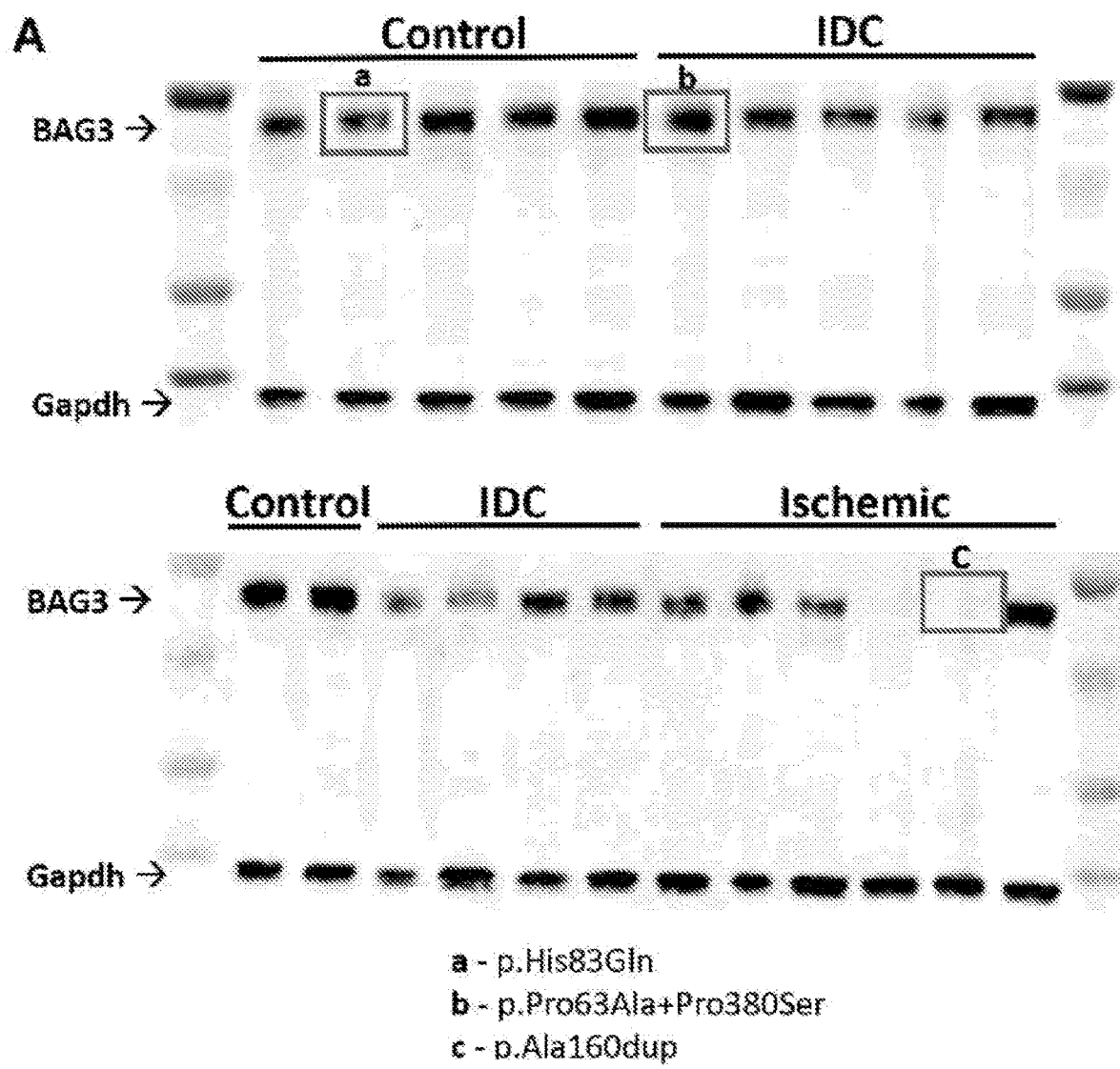
FIG. 4A is a representative western blot of protein isolated from human hearts with severe left ventricular dysfunction secondary to idiopathic dilated cardiomyopathy (n=23) or ischemic heart disease (n=16) or non-failing controls (n=4). Samples obtained from hearts that were found to carry a BAG3 variant are indicated by the red squares which are numbered a thru c.
Figure 4B:
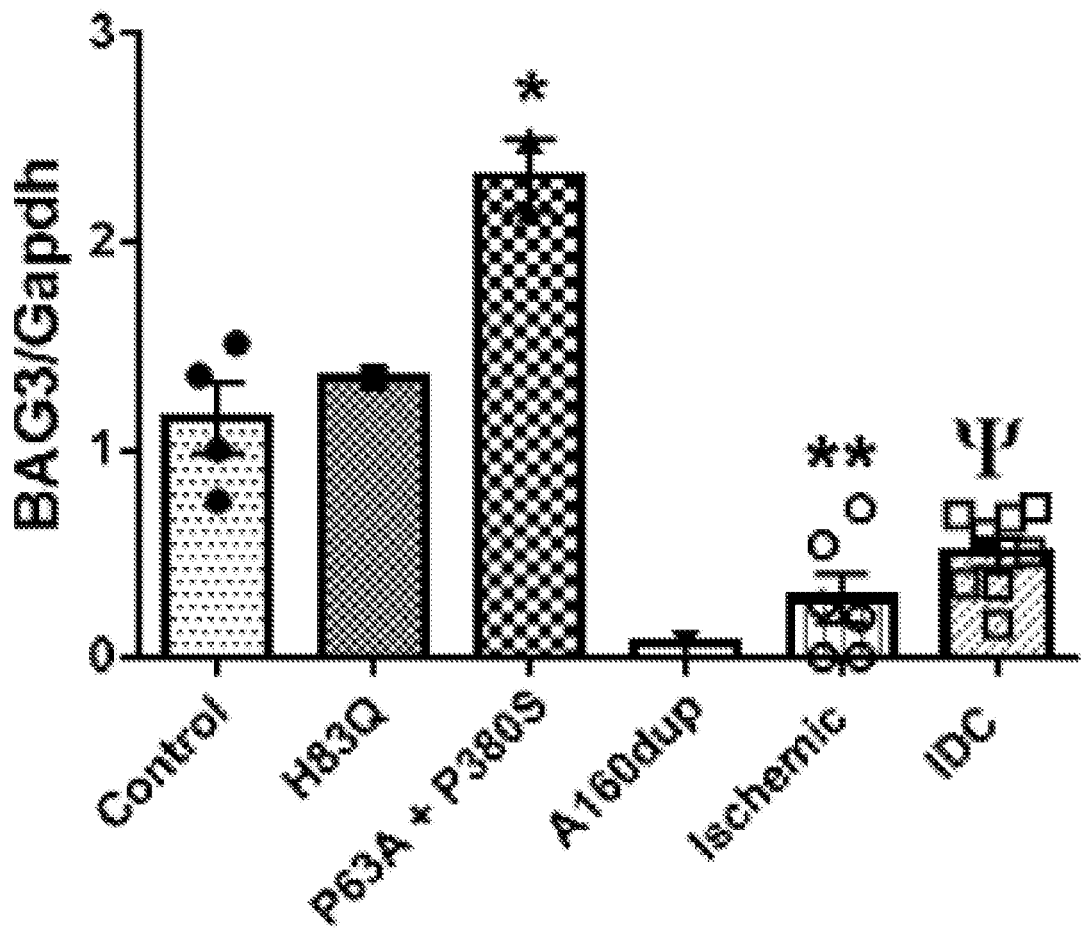
FIG. 4B shows the quantification of multiple western blots.
Figure 4C:
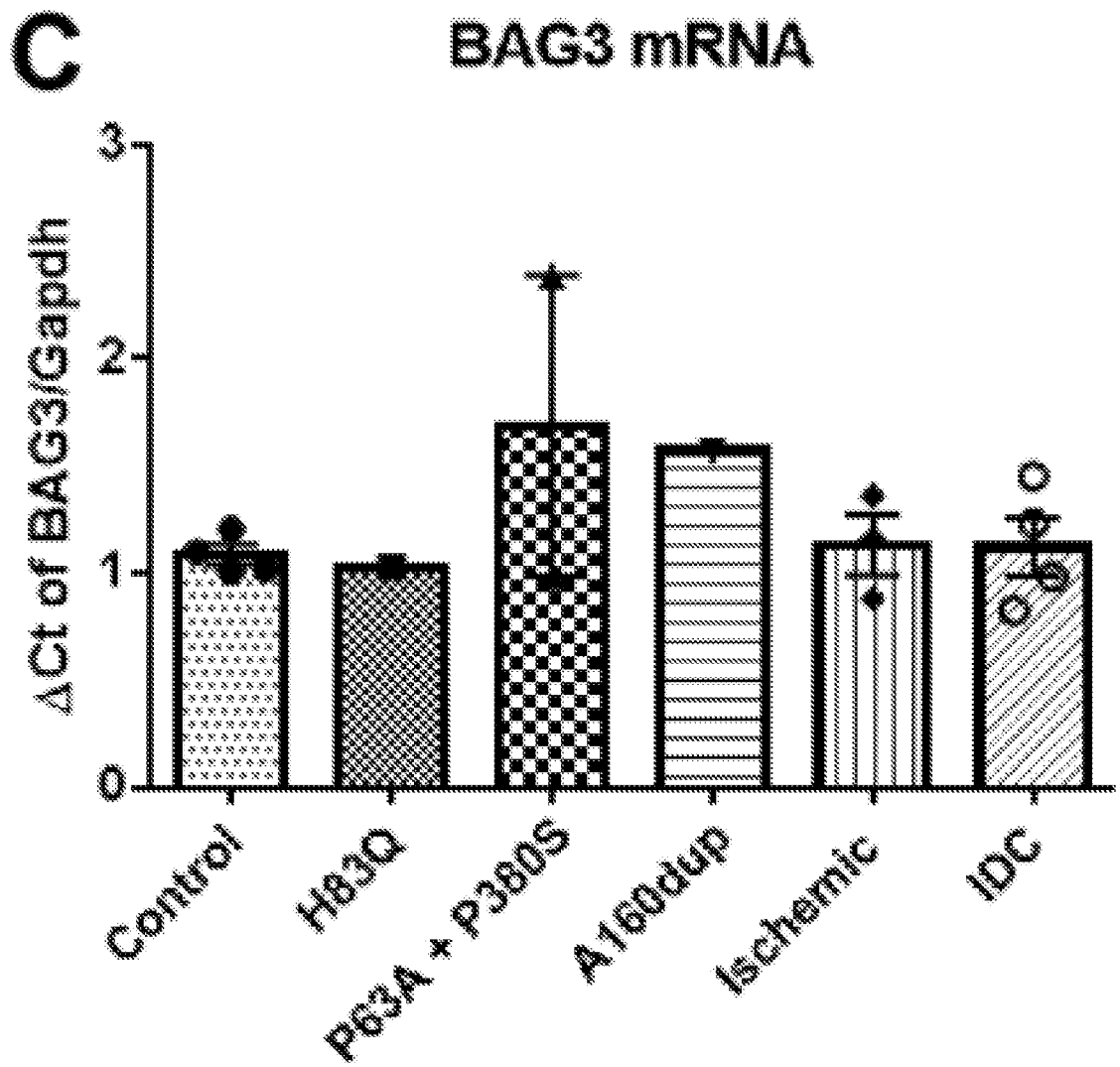
FIG. 4C shows quantification of qPCR for BAG3 in the failing ischemic dilated cardiomyopathy (n=13), IDC (n=18) and non-failing human hearts (n=4) with GAPDH as internal control.
Figure 7A:
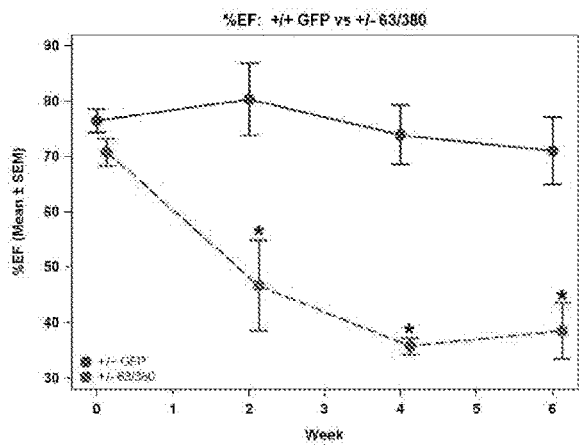
FIGS. 7A, 7B are graphs showing cardiac function with p.Pro63Ala+Pro380Ser expression. To evaluate the functional effects of the common p.Pro63Ala+Pro380Ser genetic variant mice were infected with AAV9-BAG3-WT or AAV9-BAG3-63/380.
Figure 7B:
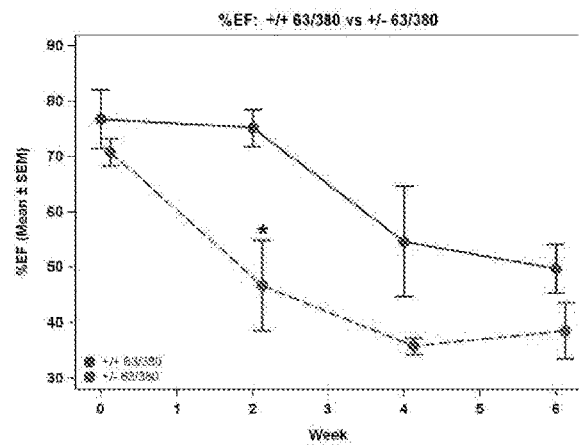
Figure 8A:
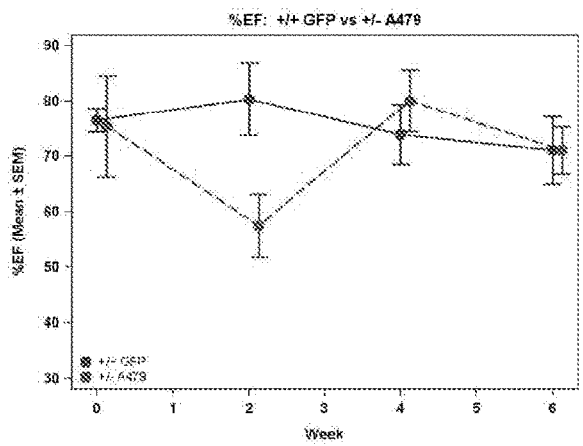
FIGS. 8A, 8B are graphs showing cardiac function with p.Ala479Val expression. To evaluate the functional effects of Ala479Val, the retro-orbital space was injected with the AAV9-BAG3-Ala479Val.
Figure 8B:
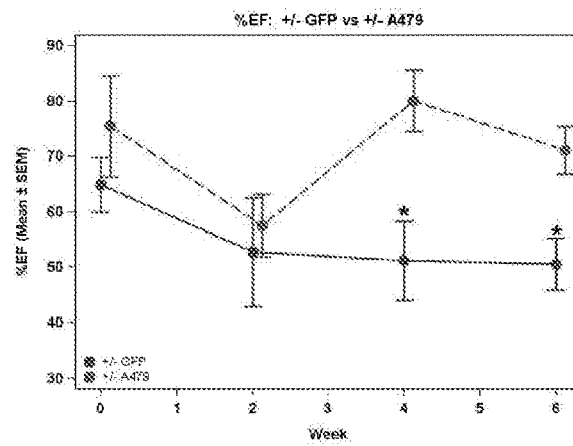

BAG3 Levels in Failing Human Heart: Western blot analysis of BAG3 levels and qPCR was performed to quantify BAG3 mRNA in failing human hearts and non-failing control hearts from subjects of African ancestry (Cohorts D and E). As seen in FIGS. 4A-4C, BAG3 levels were significantly reduced in hearts extracted from transplant recipients who had IDC (p=0.0001, n=23) or ischemic HF (p<0.0001, n=16) when compared with non-failing controls (n=4). BAG3 mRNA levels from IDC hearts (n=18) and from DCM hearts with ischemic DCM (n=13) were not different from BAG3 mRNA levels in controls (n=4). Targeted sequence analysis found that one heart harbored the p.His83Gln variant, two harbored the p.Pro63Ala+Pro380Ser variant, and one harbored the p.Ala160dup insertion. BAG3 levels were supra-normal in the two p.Pro63Ala+Pro380 hearts providing evidence that expression of the BAG3 variant over-came the inherent regulatory mechanism governing BAG3 expression. By contrast, BAG3 levels were unchanged in the p.His83Gln heart and could not be appreciated in a heart harboring the p.Ala160dup making them potential targets for gene therapy.

TABLE 1

Characteristics of Subjects based on Presence or Absence of BAG3 SNV

| Parameter | BAG3 SNV (N = 51) | No BAG3 SNV (N = 458) | p-Value |
|---|---|---|---|
| Age | 55.6 ± 13.4 | 54.5 ± 13.6 | 0.578 |
| Sex (% Male) | 58.8 | 61.1 | 0.748 |
| Heart Rate | 72.4 ± 12.9 | 75.5 ± 13.3 | 0.119 |
| Systolic BP | 126.6 ± 15.3 | 124.1 ± 18.5 | 0.348 |
| Diastolic BP | 76.8 ± 10.9 | 76.7 ± 11.2 | 0.930 |
| EF at Baseline | 30.6 ± 9.5 | 30.4 ± 10.2 | 0.918 |
| Change in EF at 6 Months | 4.6 ± 9.8 | 4.3 ± 10.2 | 0.851 |
| LVEDD at Baseline | 6.3 ± 1.3 | 6.4 ± 1.2 | 0.594 |
| Change in LVEDD at 6 Months | −0.2 ± 1.1 | −0.2 ± 1.0 | 0.897 |
| NYHA III or IV (%) | 80.4 | 80.3 | 0.983 |
| ICD (%) | 35.7 | 34.0 | 0.896 |
| Diabetes (%) | 24.4 | 37.5 | 0.083 |
| Medications: | | | |
| Beta Blockers (%) | 88.2 | 82.3 | 0.287 |
| ACE Inhibitors or ARBs (%) | 98.0 | 92.8 | 0.234 |
| Aldosterone Antagonists (%) | 33.3 | 35.4 | 0.773 |
| Hydralazine and Isosorbide Dinitrate (%) | 54.1 | 44.9 | 0.292 |

TABLE 2A

BAG3 Mutation Frequency by Pathology and Data Source

| Study and Pathology | | 63/380 | Ala160du | His83Gln | A479V | Unadjusted Prevalence | Adjusted for Multiple Alleles |
|---|---|---|---|---|---|---|---|
| GRAFH | Non-Ischemic | 4/255 or 1.57% | 18/249 or 7.23% | 9/246 or 3.66% | 4/255 or 1.57% | 14.02% | 13.78% |
| | Ischemic | 0/87 or 0.00% | 6/87 or 6.90% | 2/87 or 2.30% | 0/87 or 0.00% | 9.20% | 9.03% |
| GRACE | Non-Ischemic | 1/88 or 1.14% | 5/89 or 5.62% | 0/89 or 0.00% | 1/88 or 1.14% | 7.89% | 7.75% |
| | Ischemic | 0/20 or 0.00% | 0/20 or 0.00% | 1/20 or 5.00% | 0/19 or 0.00% | 5.00% | 4.91% |
| IMAC2 | Non-Ischemic | 0/58 or 0.00% | 3/58 or 5.17% | 2/58 or 3.45% | 1/58 or 1.72% | 10.34% | 10.16% |

TABLE 2A-continued

BAG3 Mutation Frequency by Pathology and Data Source

| | | 63/380 | Ala160du | His83Gln | A479V | Unadjusted Prevalence | Adjusted for Multiple Alleles |
|---|---|---|---|---|---|---|---|
| All Studies Combined | Non-Ischemic | 5/401 or 1.25% | 26/396 or 6.57% | 11/393 or 2.80% | 6/401 or 1.50% | 12.11% | 11.90% |
| | Ischemic | 0/107 or 0.00% | 6/107 or 5.61% | 3/107 or 2.80% | 0/106 or 0.00% | 8.41% | 8.26% |
| European Reference Data gnomAD Population Data | Non-Ischemic | 0/359 or 0.00% | 0/359 or 0.00% | 0/359 or 0.00% | 0/359 or 0.00% | 0.00% | 0.00% |
| gnomAD African Ancestry | | 263/12015 or 2.19% | 627/11682 or 5.37% | 250/12015 or 2.08% | 76/12019 or 0.63% | 10.27% | 10.09% |
| gnomAD European Ancestry | | 9/63271 or 0.01% | 0/62112 or 0.00% | 5/63345 or 0.01% | 0/63354 or 0.00% | 0.022% | 0.022% |

TABLE 2B

Analysis of Black and European Patients versus BAG3 Mutations (All with Non-Ischemic HF)

| Attribute | Any BAG3 Mutation | No BAG3 Mutation | Total | p-Value | Test Method |
|---|---|---|---|---|---|
| Any BAG3 Mutation by Group, n (%) | | | | <.0001 | Fisher's Exact |
| GRAHF, GRACE, and IMAC2 Patients | 42 (10.4%) | 360 (89.6%) | 402 (100.0%) | | |
| European Reference Patients | 0 (0.0%) | 359 (100%) | 359 (100.0%) | | |
| Total | 42 (5.5%) | 719 (94.5%) | 761 (100.0%) | | |

Discussion

BAG3 regulates important cellular functions including protein quality control, apoptosis and excitation/contraction coupling.[17] The levels of BAG3 are reduced in human end-stage HF and in animal models of LV dysfunction. The functional significance of BAG3 insufficiency was demonstrated by knockdown of BAG3 by siRNA impairs excitation-contraction coupling and that mice with BAG3 haploinsufficiency manifest significant LV dysfunction, decreased autophagy and increased apoptosis by 10 weeks of age.[32,35] In the present study two common (>1%) non-synonymous SNVs were identified, a common double heterozygote variant and a 3 nucleotide in-frame insertion in subjects of African descent with DCM that were not seen in appreciable levels in individuals of European ancestry with DCM (0.00%). The results of the present study differ from earlier studies in that both diminution of critical BAG3 function as well as African American exclusivity is shown.

The four BAG3 variants were annotated by ClinVar[40] as being either benign (p.Pro63Ala), benign/likely benign (p.Ala160dup; p.Pro380Ser) or there were "conflicting interpretations of pathogenicity" (p.His83Gln and p.Ala479Val). Statistical analyses of in silico pathogenicity prediction algorithms, enhanced software, and computational predictions have been unreliable for annotation.[41] Therefore, pathogenicity was based on the finding that: 1) they are found in highly conserved regions of BAG3; 2) their function is lost in vitro; 3) they localize to domains that match the functional consequences of the variant; and 4) the four SNVs in aggregate significantly alter outcome in patients with DCM. Nonetheless, evidence supporting pathogenicity of these SNVs would be strengthened by familial recurrence and segregation analysis.[42,43]

The variants identified in the present study have not been recognized previously in cohorts of probands with familial DCM. For example, in four studies that identified BAG3 variants in independent index cases with familial IDC, fewer than 16 subjects were identified as of African ancestry.[21,44-46] In a large exome-wide array-based association study, investigators identified a BAG3 locus (c.451T>C, p.Cys151Arg) that conferred a reduced risk of DCM; however, the variant is common in both Europeans (0.2163 allele frequency) and African ancestry (0.03 allele frequency) and therefore did not meet the criteria for inclusion in the present analysis.[30]

Earlier studies in individuals of European ancestry support the results of the present study. BAG3 variants were most common in cohorts of probands that were ethnically or geographically isolated: 15% in index cases recruited from an isolated population in the Gaspesie region in Quebec;[20] 6.7% in a single center Polish study,[19] 3.5% in a European population[44] and 2.25% (7/311) in a large U.S. study.[45]

The results herein provide evidence of unique variants in BAG3 found almost exclusively in individuals of African descent negatively influence the outcomes of patients with IDC and possibly those with ischemic DCM. This study of genetic variations in BAG3 that are selective for African Americans points to the importance of considering biological differences as one of several factors in causing phenotypic differences seen across diverse patient populations.

REFERENCES

1. Benjamin E J, Blaha M J, Chiuve S E, et al. Heart Disease and Stroke Statistics-2017 Update: A Report From the American Heart Association. *Circulation.* 2017; 135 (10): e146-e603.
2. Yancy C W. Heart failure in African Americans: a cardiovascular engima. *J Card Fail.* 2000; 6(3):183-186.
3. Loehr L R, Rosamond W D, Chang P P, Folsom A R, Chambless L E. Heart failure incidence and survival (from the Atherosclerosis Risk in Communities study). *Am J Cardiol* 2008; 101(7):1016-1022.
4. Echols M R, Felker G M, Thomas K L, et al. Racial differences in the characteristics of patients admitted for acute decompensated heart failure and their relation to outcomes: results from the OPTIME-CHF trial. *J Card Fail.* 2006; 12(9):684-688.
5. Bahrami H, Kronmal R, Bluemke D A, et al. Differences in the incidence of congestive heart failure by ethnicity: the multi-ethnic study of atherosclerosis. *Arch Int Med.* 2008; 168(19):2138-2145.
6. Dries D L, Exner D V, Gersh B J, Cooper H A, Carson P E, Domanski M J. Racial differences in the outcome of left ventricular dysfunction. *N Engl J Med.* 1999; 340(8): 609-616.
7. Yeboah J, Rodriguez C J, Stacey B, et al. Prognosis of individuals with asymptomatic left ventricular systolic dysfunction in the multi-ethnic study of atherosclerosis (MESA). *Circulation.* 2012; 126(23):2713-2719.
8. Sliwa K, Wilkinson D, Hansen C, et al. Spectrum of heart disease and risk factors in a black urban population in South Africa (the Heart of Soweto Study): a cohort study. *Lancet.* 2008; 371(9616):915-922.
9. Bibbins-Domingo K, Pletcher M J, Lin F, et al. Racial differences in incident heart failure among young adults. *N Engl J Med.* 19 2009; 360(12):1179-1190.
10. Rosamond W, Johnson A. Is Home Where the Heart Is? The Role of Neighborhood in Heart Failure Risk. *Circ Cardiovasc Qual Outcomes.* 2018; 11(1):e004455.
11. Carnethon M R, Pu J, Howard G, et al. Cardiovascular Health in African Americans: A Scientific Statement From the American Heart Association. *Circulation.* 2017; 136 (21):e393-e423.
12. Damasceno A, Mayosi B M, Sani M, et al. The causes, treatment, and outcome of acute heart failure in 1006 Africans from 9 countries. *Arch Int Med.* 2012; 172(18): 1386-1394.
13. Ntusi N B, Mayosi B M. Epidemiology of heart failure in sub-Saharan Africa.
*Expert Rev Cardiovasc Ther.* 2009; 7(2):169-180.
14. Herman D S, Lam L, Taylor M R, et al. Truncations of titin causing dilated cardiomyopathy. *N Engl J Med.* 2012; 366(7):619-628.
15. Ware J S, Seidman J G, Arany Z. Shared Genetic Predisposition in Peripartum and Dilated Cardiomyopathies. *N Engl J Med.* 2016; 374(26):2601-2602.
16. Behl C. Breaking BAG: The Co-Chaperone BAG3 in Health and Disease. *Trends Pharmacol Sci.* May 6 2016.
17. Knezevic T, Myers V D, Gordon J, et al. BAG3: a new player in the heart failure paradigm. *Heart Fail Rev.* 2015; 20(4):423-434.
18. Myers V D, Tomar D, Madesh M, et al. Haplo-insufficiency of Bcl2-associated Athanogene 3 in Mice Results in Progressive Left Ventricular Dysfunction, beta-Adrenergic Insensitivity and Increased Apoptosis. *J Cell Physiol.* 2018, 10.1002/jcp.26482.
19. Franaszczyk M, Bilinska Z T, Sobieszczanska-Malek M, et al. The BAG3 gene variants in Polish patients with dilated cardiomyopathy: four novel mutations and a genotype-phenotype correlation. *J Transl Med.* 2014; 12:192.
20. Chami N, Tadros R, Lemarbre F, et al. Nonsense mutations in BAG3 are associated with early-onset dilated cardiomyopathy in French Canadians. *Can J Caridol.* 2014; 30(12):1655-1661.
21. Lek M, Karczewski K J, Minikel E V, et al. Analysis of protein-coding genetic variation in 60,706 humans. *Nature.* 2016; 536(7616):285-291.
22. Taylor A L, Ziesche S, Yancy C, et al. Combination of isosorbide dinitrate and hydralazine in blacks with heart failure. *N Engl J Med.* 2004; 351(20):2049-2057.
23. McNamara D M, Tam S W, Sabolinski M L, et al. Aldosterone synthase promoter polymorphism predicts outcome in African Americans with heart failure: results from the A-HeFT Trial. *J Amer Coll Cardiol.* 2006; 48(6):1277-1282.
24. McNamara D M, Tam S W, Sabolinski M L, et al. Endothelial nitric oxide synthase (NOS3) polymorphisms in African Americans with heart failure: results from the A-HeFT trial. *J Card Fail.* 2009; 15(3):191-198.
25. McNamara D M, Taylor A L, Tam S W, et al. G-protein beta-3 subunit genotype predicts enhanced benefit of fixed-dose isosorbide dinitrate and hydralazine: results of A-HeFT. *JACC Heart Fail.* 2014; 2(6):551-557.
26. McNamara D M, Starling R C, Cooper L T, et al. Clinical and demographic predictors of outcomes in recent onset dilated cardiomyopathy: results of the IMAC (Intervention in Myocarditis and Acute Cardiomyopathy)-2 study. *J Amer Coll Cardiol.* 2011; 58(11):1112-1118.
27. McNamara D M, Holubkov R, Janosko K, et al. Pharmacogenetic interactions between beta-blocker therapy and the angiotensin-converting enzyme deletion polymorphism in patients with congestive heart failure. *Circulation.* 2001; 103(12):1644-1648.
28. McNamara D M, Holubkov R, Postava L, et al. Pharmacogenetic interactions between angiotensin-converting enzyme inhibitor therapy and the angiotensin-converting enzyme deletion polymorphism in patients with congestive heart failure. *J Amer Coll Cardiol.* 2004; 44(10): 2019-2026.
29. Bristow M R, Minobe W A, Raynolds M V, et al. Reduced beta 1 receptor messenger RNA abundance in the failing human heart. *J Clin Invest.* 1993; 92(6):2737-2745.
30. Esslinger U, Gamier S, Korniat A, et al. Exome-wide association study reveals novel susceptibility genes to sporadic dilated cardiomyopathy. *PloS one.* 2017; 12(3): e0172995.
31. Feldman A M, Begay R L, Knezevic T, et al. Decreased levels of BAG3 in a family with a rare variant and in idiopathic dilated cardiomyopathy. *J Cell Physiol.* 2014; 229(11):1697-1702.
32. Su F, Myers V D, Knezevic T, et al. Bcl-2-associated athanogene 3 protects the heart from ischemia/reperfusion injury. *JCI Insight.* 2016; 1(19):e90931.
33. Davidson B, Shi W, Levine M. Uncoupling heart cell specification and migration in the simple chordate Ciona intestinalis. *Development.* 2005; 132(21):4811-4818.
34. Tomar D, Dong Z, Shanmughapriya S, et al. MCUR1 Is a Scaffold Factor for the MCU Complex Function and Promotes Mitochondrial Bioenergetics. *Cell Rep* 2016; 15(8):1673-1685.

35. Feldman A M, Gordon J, Wang J, et al. BAG3 regulates contractility and Ca homeostasis in adult mouse ventricular myocytes. *J Mol Cell Cardiol.* 2016. 92: 10-20.
36. Fang X, Bogomolovas J, Wu T, et al. Loss-of-function mutations in co-chaperone BAG3 destabilize small HSPs and cause cardiomyopathy. *J Clin Invest.* 2017; 127(8): 3189-3200.
37. Liggett S B, Mialet-Perez J, Thaneemit-Chen S, et al. A polymorphism within a conserved beta(1)-adrenergic receptor motif alters cardiac function and beta-blocker response in human heart failure. *Proc Natl Acad Sci U S.* 2006; 103(30):11288-11293.
38. O'Connor C M, Fiuzat M, Carson P E, et al. Combinatorial pharmacogenetic interactions of bucindolol and beta1, alpha2C adrenergic receptor polymorphisms. *PloS one.* 2012; 7(10):e44324.
39. Aleong R G, Sauer W H, Robertson A D, Liggett S B, Bristow M R. Adrenergic receptor polymorphisms and prevention of ventricular arrhythmias with bucindolol in patients with chronic heart failure. *Circ Arrhythm and electrophysiol.* 2013; 6(1):137-143.
40. Landrum M J, Lee J M, Riley G R, et al. ClinVar: public archive of relationships among sequence variation and human phenotype. *Nucleic Acids Res.* 2014; 42(Database issue):D980-985.
41. Mueller S C, Backes C, Haas J, et al. Pathogenicity prediction of non-synonymous single nucleotide variants in dilated cardiomyopathy. *Brief Bioinform.* 2015; 16(5): 769-779.
42. Campuzano O, Allegue C, Fernandez A, Iglesias A, Brugada R. Determining the pathogenicity of genetic variants associated with cardiac channelopathies. *Sci Rep.* 2015; 5:7953.
43. Boycott K M, Vanstone M R, Bulman D E, MacKenzie A E. Rare-disease genetics in the era of next-generation sequencing: discovery to translation. *Nat Rev Genet.* 2013; 14(10):681-691.
44. Villard E, Perret C, Gary F, et al. A genome-wide association study identifies two loci associated with heart failure due to dilated cardiomyopathy. *Eur Heart J.* 2011; 32(9):1065-1076.
45. Norton N, Li D, Rieder M J, et al. Genome-wide studies of copy number variation and exome sequencing identify rare variants in BAG3 as a cause of dilated cardiomyopathy. *Am J Hum Genet.* 2011; 88(3):273-282.
46. Franceschelli S, Rosati A, Lerose R, De Nicola S, Turco M C, Pascale M. Bag3 gene expression is regulated by heat shock factor 1. *J Cell Physiol.* 2008; 215(3):575-577.
47. Gerhard G S, Fisher, S F, Feldman A M. Genetic Testing for Inherited Cardiac Diseases in Underserved Populations of Non-European Ancestry: Double Disparity. *JAMA Cardiol.* 2018; published online Feb. 28, 2018.
48. Taylor A L. Racial differences and racial disparities: the distinction matters. *Circulation.* 2015; 131(10):848-850.
49. Landry L G, Rehm, H. L. Association of racial/ethnic categories with the ability of genetic tests to detect a cause of cardiomyopathy. *JAMA Cardiol.* 2018. doi:10.1001/jamacardio.2017.5333.
50. Dellefave-Castillo L M, Puckelwartz, M. J., McNally, E. M. Reducint racial/ethnic disparities in cardiovascular genetic testing. *JAMA Cardiol.* 2018; Published on line Frebruary 28, 2018.

EQUIVALENTS

Those skilled in the art will recognize, or be able to ascertain using no more than routine experimentation, many equivalents to the specific embodiments of the invention described herein. Such equivalents are intended to be encompassed by the following claims.

What is claimed:

1. A method of diagnosing and treating a patient having cardiac disease, comprising: identifying in a patient sample, at least one Bcl2-associated anthanogene 3 (BAG3) genetic variant as compared to a control BAG3 nucleic acid sequence, wherein the BAG 3 genetic variant comprises a 3 nucleotide insertion that adds an alanine at position 160 (p.Ala160dup, 10:121429647 A/AGCG; rs139438727) or a single nucleotide variant (SNV) in-frame insertion comprising: p.Pro63Ala (10:121429369 C/G; rs133031999); p.His83Gln (10:151331972; rs151331972); Ala479Val (10:121436502 C/T; rs34656239) or combinations thereof, wherein detection of the BAG 3 genetic variant is predictive of whether an increase in BAG3 levels is therapeutic for the patient, and, administering to the patient identified as having such a genetic variant, a therapeutically effective amount of a BAG3 protein or biologically active fragment thereof or expression vector for expression of a BAG3 protein or biologically active fragment thereof.

2. The method of claim 1, wherein the 3 nucleotide insertion adds an alanine at position 160 (p.Ala160dup, 10:121429647 A/AGCG; rs139438727).

3. The method of claim 1, wherein the genetic variant comprises: p.Pro63Ala (10:121429369 C/G; rs133031999); p.His83Gln (10:151331972; rs151331972); Ala479Val (10:121436502 C/T; rs34656239) or combinations thereof.

4. The method of claim 1, wherein the expression vector comprises a viral vector, cardiotropic vector, plasmid, or a yeast vector.

5. The method of claim 4, wherein the cardiotropic vector comprises an adenovirus vector, an adeno-associated virus vector (AAV), a coxsackie virus vector, cytomegalovirus vector, Epstein-Barr virus vector, parvovirus vector, or hepatitis virus vectors.

6. The method of claim 5, wherein the expression vector is a cardiotropic pseudotyped viral vector.

7. The method of claim 1, wherein the cardiac disease is heart failure.

8. The method of claim 1, wherein the BAG3 polypeptide or fragment thereof is linked to another polypeptide.

9. A method of treating a patient having cardiac disease, wherein said patient has at least one Bcl2-associated anthanogene 3 (BAG3) nucleotide variant (NV) in-frame insertion as compared to a control BAG3 nucleic acid sequence, wherein the nucleotide variant comprises a 3 nucleotide insertion that adds an alanine at position 160 (p.Ala160dup, 10:121429647 A/AGCG; rs139438727) or a single nucleotide variant (SNV) in-frame insertion comprising: p.Pro63Ala (10:121429369 C/G; rs133031999); p.His83Gln (10:151331972; rs151331972); Ala479Val (10:121436502 C/T; rs34656239) or combinations thereof, comprising administering to said patient a therapeutically effective amount of a BAG3 protein or biologically active fragment thereof or expression vector for expression of a BAG3 protein or biologically active fragment thereof.

10. The method of claim 9, wherein the 3 nucleotide insertion adds an alanine at position 160 (p.Ala160dup, 10:121429647 A/AGCG; rs139438727).

11. The method of claim 9, wherein the BAG3 polypeptide or fragment thereof is linked to another polypeptide.

12. A method of identifying and treating a heart disease patient having a worse prognosis, comprising: screening a patient sample for the presence of a Bcl2-associated anthanogene 3 (BAG3) nucleotide variant (NV) in-frame insertion as compared to a control BAG3 nucleic acid sequence, wherein the BAG3 NV in-frame insertion comprises a 3 nucleotide insertion that adds an alanine at position 160 (p.Ala160dup, 10:121429647 A/AGCG; rs139438727) or a single nucleotide variant (SNV) in-frame insertion comprising: p.Pro63Ala (10:121429369 C/G; rs133031999); p.His83Gln (10:151331972; rs151331972); Ala479Val (10:121436502 C/T; rs34656239) or combinations thereof, wherein detection of the BAG3 NV in-frame insertion identifies the heart disease patient as having a worse prognosis compared to a nonischemic patient who does not have a same BAG3 NV in-frame insertion, and administering to the patient identified as having a worse prognosis a therapeutically effective amount of a BAG3 protein or biologically active fragment thereof or expression vector for expression of a BAG3 protein or biologically active fragment thereof.

13. A method of identifying and treating a patient at risk of heart disease, comprising: screening a patient sample for the presence of a Bcl2-associated anthanogene 3 (BAG3) nucleotide variant (NV) in-frame insertion as compared to a control BAG3 nucleic acid sequence, wherein the BAG3 NV variant in-frame insertion comprises a 3 nucleotide insertion that adds an alanine at position 160 (p.Ala160dup, 10:121429647 A/AGCG; rs139438727) or a single nucleotide variant (SNV) in-frame insertion comprising: p.Pro63Ala (10:121429369 C/G; rs133031999); p.His83Gln (10:151331972; rs151331972); Ala479Val (10:121436502 C/T; rs34656239) or combinations thereof, wherein detection of the BAG3 NV in-frame insertion identifies the patient as being at risk of heart disease, and administering to the patient identified as at risk of heart disease a therapeutically effective amount of a BAG3 protein or biologically active fragment thereof or expression vector for expression of a BAG3 protein or biologically active fragment thereof.

14. A method of treating a subject at risk of or suffering from heart failure comprising: administering to the subject a pharmaceutical composition comprising a therapeutically effective amount of a BAG3 protein or biologically active fragment thereof or expression vector for expression of a BAG3 protein or biologically active fragment thereof, wherein the subject has at least one BAG3 genetic variant as compared to a control BAG3 nucleic acid sequence, wherein the genetic variant comprises a 3 nucleotide insertion that adds an alanine at position 160 (p.Ala160dup, 10:121429647 A/AGCG; rs139438727) or a single nucleotide variant (SNV) in-frame insertion comprising: p.Pro63Ala (10:121429369 C/G; rs133031999); p.His83Gln (10:151331972; rs151331972); Ala479Val (10:121436502 C/T; rs34656239) or combinations thereof.

15. The method of claim 14, wherein the BAG3 polypeptide or fragment thereof is linked to another polypeptide.

* * * * *